(12) United States Patent
Rizzolo et al.

(10) Patent No.: US 7,899,756 B2
(45) Date of Patent: Mar. 1, 2011

(54) CRITICAL PARAMETER/REQUIREMENTS MANAGEMENT PROCESS AND ENVIRONMENT

(75) Inventors: Charles D. Rizzolo, Fairport, NY (US);
Ronald E. Stokes, Fairport, NY (US);
Louis F. LaVallee, Webster, NY (US);
Charles M. Gardiner, Fairport, NY (US); William R. Smith, Webster, NY (US); Kathy Cupo, Pittsford, NY (US);
Richard S. Pagano, Webster, NY (US);
Joel S. Cornell, Pittsford, NY (US);
Barry P. Mandel, Fairport, NY (US);
Ralph E. Simpson, Rochester, NY (US);
John T. Potter, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 981 days.

(21) Appl. No.: 11/001,260

(22) Filed: Dec. 1, 2004

(65) Prior Publication Data
US 2006/0117012 A1 Jun. 1, 2006

(51) Int. Cl.
*G06Q 10/00* (2006.01)
(52) U.S. Cl. .............. 705/300; 705/301; 705/317; 707/802; 707/803; 707/804
(58) Field of Classification Search .............. 700/97
See application file for complete search history.

(56) References Cited

U.S. PATENT DOCUMENTS

| | | | |
|---|---|---|---|
| 5,208,765 A * | 5/1993 | Turnbull | .............. 702/84 |
| 5,355,317 A | 10/1994 | Talbott et al. | |
| 5,357,440 A | 10/1994 | Talbott et al. | |
| 5,359,523 A | 10/1994 | Talbott et al. | |
| 5,500,800 A | 3/1996 | Talbott | |
| 5,671,415 A | 9/1997 | Hossain | |
| 5,864,480 A | 1/1999 | Ladd | |
| 6,138,104 A | 10/2000 | Marchak et al. | |
| 6,151,582 A * | 11/2000 | Huang et al. | .............. 705/8 |
| 6,226,784 B1 | 5/2001 | Holmes et al. | |
| 6,327,551 B1 | 12/2001 | Peterson et al. | |
| 6,405,364 B1 | 6/2002 | Bowman-Amuah | |
| 6,415,193 B1 * | 7/2002 | Betawar et al. | .............. 700/97 |
| 6,493,693 B1 | 12/2002 | Hill | |
| 6,535,775 B1 * | 3/2003 | Bagepalli et al. | .......... 700/109 |
| 6,591,278 B1 * | 7/2003 | Ernst | ................ 707/104.1 |
| 6,662,357 B1 | 12/2003 | Bowman-Amuah | |

(Continued)

*Primary Examiner*—Mohammad Ali
*Assistant Examiner*—Angelica Ruiz
(74) *Attorney, Agent, or Firm*—Fay Sharpe LLP

(57) ABSTRACT

A critical parameter/requirements management process model for managing a development program for a product and an associated product structure-driven critical parameter/requirements management tool and environment is provided. In one embodiment, the process includes a product structure classification scheme, a parameter/requirements classification scheme, a parameter/requirements process and maturity model, and in-process and requirements conformance views. In one embodiment, the tool includes a user interface layer, a business layer, a data layer, and a database. The user interface layer may include a product structure feature group, an add/edit/link feature group, a manage maturity feature group, and a manage conformance feature group. The tool may be implemented as a web server accessible to user workstations operating as thin clients. The tool may be integrated with one or more other product development tools, such as a document-driven requirements management, configuration management, manufacturing/production control system, problem management, and phased product delivery process tools.

122 Claims, 50 Drawing Sheets

U.S. PATENT DOCUMENTS

| | | | |
|---|---|---|---|
| 6,725,183 B1 | 4/2004 | Cawse | |
| 6,741,901 B2 | 5/2004 | Lu et al. | |
| 6,901,372 B1 * | 5/2005 | Helzerman | 705/7 |
| 6,996,578 B2 * | 2/2006 | Okada et al. | 707/104.1 |
| 7,043,486 B2 * | 5/2006 | Cope | 707/100 |
| 7,299,202 B2 * | 11/2007 | Swanson | 705/27 |
| 2001/0032092 A1 * | 10/2001 | Calver | 705/1 |
| 2001/0052108 A1 | 12/2001 | Bowman-Amuah | |
| 2002/0087387 A1 * | 7/2002 | Calver et al. | 705/10 |
| 2002/0087432 A1 * | 7/2002 | Muniz | 705/27 |
| 2002/0133250 A1 | 9/2002 | Kopcha | |
| 2003/0106039 A1 | 6/2003 | Rosnow et al. | |
| 2003/0158769 A1 * | 8/2003 | Uno et al. | 705/8 |
| 2004/0044555 A1 | 3/2004 | Bangs et al. | |
| 2004/0073886 A1 | 4/2004 | Irani | |
| 2004/0073888 A1 | 4/2004 | Brown | |
| 2004/0098154 A1 | 5/2004 | McCarthy | |
| 2004/0143811 A1 | 7/2004 | Kaelicke et al. | |

\* cited by examiner

FIG. 7

User - Edit Product Structure

Product: Tigris Configuration:DC-ST Owner: Brent Williams Object: 40.000 DEVELOPMENT

| SS#/Object Name | Part No | Rev | Object Type | Integ Type | Cons | PE | Plat | QRSP | HT Stat | M/B Code | Supplier | Owner | MRT |
|---|---|---|---|---|---|---|---|---|---|---|---|---|---|
| 40 DEVELOPMENT | 000026360 | | Mat | | | | | | | | | Williams, Brent | |
| 40 AAA DEVELOPER | 000026360 | | Mat | | | | | | | | | Williams, Brent | |
| 40 DEVELOPER ASS | 802K61350 | | Mat | | | | | | | | | Williams, Brent | |
| 40 DEVELOPER AS | 802K55320 | | Mat | | | x | | Q | | | | Williams, Brent | |
| 40 Guard ASSY-B | 055K34250 | | Mat | | | | | | | | | Williams, Brent | |
| 40 CAP-DONOR IB | 093E03430 | | Mat | | | | | | | | | Williams, Brent | |
| 40 CAP-DONOR OB | 093E03440 | | Mat | | | | | | | | | Williams, Brent | |
| 40 COVER-HIGH V | 802E52411 | | Mat | | | | | | | | | Williams, Brent | |
| 40 SCREW-MACH_H | 113W40763 | | Mat | | | | | | | | | Williams, Brent | |
| 40 SCERW-MACH_H | 113W41163 | | Mat | | | | | | | | | Williams, Brent | |
| 40 ROLL ASSY-UP | 059K35120 | | Mat | | | | | | | | | Williams, Brent | |
| 40 ROLL ASSY-LO | 059K35130 | | Mat | | | | | | | | | Williams, Brent | |

BASIC OBJECT ORIENTED PARAMETER/REQUIREMENTS SCHEME

| PARAMETER/REQUIREMENT TYPE | FEEDER EXAMPLES |
|---|---|
| INPUT (I): ANY ACTION, PHYSICAL OBJECT, ENERGY, OR INFORMATION THAT NEEDS TO BE SUPPLIED FOR THE OBJECT TO PERFORM ITS INTENDED FUNCTION. | 24V POWER FEED SIGNAL |
| OUTPUT (O): THE MEASURABLE QUALITY CHARACTERISTIC(S) OF THE OBJECT INTENDED FOR DELIVERY TO OTHER OBJECTS OR THE SYSTEM. "OUTPUTS ARE ALL THE REQUIREMENTS AN OBJECT MUST CONFORM TO". | PAPER SKEW SHEET ARRIVAL TIME |
| CONSTRAINTS (C): BUDGET OR STANDARDS REQUIREMENTS ALLOCATED TO THE OBJECT. CONSTRAINTS ARE ALLOCATED TO MODULES AS INPUTS OR OUTPUTS COMING FROM BUDGET AND STANDARDS INTEGRATION OBJECTS/FITs. | UMC SHUT DOWN RATE |
| CRITICAL PARAMETERS (CP): THE MEASURABLE DESIGN VARIABLES SPECIFIED BY THE OBJECT OWNER THAT DIRECTLY AFFECTS THE PERFORMANCE OF THE OBJECT OUTPUT(S). | NIP FORCE RETARD FORCE |
| CRITICAL SPECIFICATIONS (CS): THE MEASURABLE QUALITY CHARACTERISTICS SPECIFIED BY THE OBJECT OWNER RESULTING FROM A SPECIFIC DESIGN EMBODIMENT THAT DIRECTLY ENABLE OBJECT CPs AND/OR OUTPUTS. | NIP SPRING RATE NIP SPRING PRELOAD |

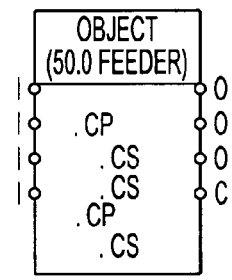

PARAMETER-TO-PARAMETER LINKS

- INTERFACE LINKS
  1. INPUTS TO OUTPUTS BETWEEN OBJECTS
- INTERNAL-TO-OBJECT LINKS
  2. CS TO PARENT CP
  3. INPUT TO CP/CS TO OUTPUT
- LINKS TO EXTERNAL SOURCES
  4. PARAMETERS TO URL SOURCE
  4. PARAMETERS TO REQUESITEPRO DB eCPM

| Home | Admin | Part Structure | Add/Edit/Link | Manage Maturity | Manage Conformance | Reports | Resources | Help | Logout

Add/Edit Additional Links

Product: Venezia (Gray Bal)    Configuration: Venezia (Gray Bal)    Owner: Kenneth Mihalyov    Object: 00.600 Image Quality

[Change Object]

Show All

[Save] [Back]

Inputs   Outputs   Critical Parameters    Sort By: [ ]

| ID | Interface Links | | Name | Qty/Txt | Specification | | | | | Tgt Cpk | Text Spec | Internal Links | Other Links | |
| | From | To | | | Nom | Min | Max | Units | | | | | URL | RP |
|---|---|---|---|---|---|---|---|---|---|---|---|---|---|---|
| 12077 | 43 | 0.6 | Base m/c color accur | Max | 0 | | 3 | dEp-p | 1 | | | | | |
| 12080 | 43 | 0.6 | Base w/in m/c color | Max | 0 | | 1 | dEp-p | 1 | | | | | |
| 12082 | 46.1 | 0.6 | LCLED Sensor Absolut | Max | 0 | | 1 | dEp-p 95 | 1 | | | | | |
| 12320 | 46.1 | 0.6 | LCLED Sensor Differe | Max | | | 0.5 | dE | | | | | | |
| 12364 | 46.1 | 0.6 | LCLED Sensor Drift, | Max | 0 | | 0.75 | dEp-p 95 | 1 | | | | | |
| 12079 | 46.1 | 0.6 | LCLED Sensor Short-t | Max | | | | dEp-p 95 | | | | | | |
| 12365 | 46.1 | 0.6 | LCLED Sensor-to-Sens | Max | | | 1 | dEp-p | | | | | | |
| 12081 | 76.5 | 0.6 | DFE absolute color a | Max | 0 | | 0.25 | dEp-p | 1 | | | | | |
| 12078 | 76.5 | 0.6 | DFE color repeatabil | Max | | | | | | | | | | |
| 12237 | 76.5 | 0.6 | White Reference Surf | Max | | | | | | | | | | |

FIG. 16 eCPM VERSIONING

• PARAMETER VERSIONING
  ▷ SNAPSHOT OF PARAMETER DATA FOR OBJECT TIED TO A CONFIGURATION/BUILD
  ▷ USER GIVES NAME AND DESCRIPTION, eCPM TRACKS SEQUENCE
  ▷ FROZEN/UNEDITABLE, CHANGES REQUIRE A NW VERSION

• AUDIT VERSIONING
  ▷ MUST BE ASSOCIATED WITH AN EXISTING PARAMETER VERSION
  ▷ CAN CREATE MORE THAN ONE AUDIT VERSION FOR SINGLE PARAMETER VERSION
  ▷ AUDIT VERSIONS REMAIN EDITABLE

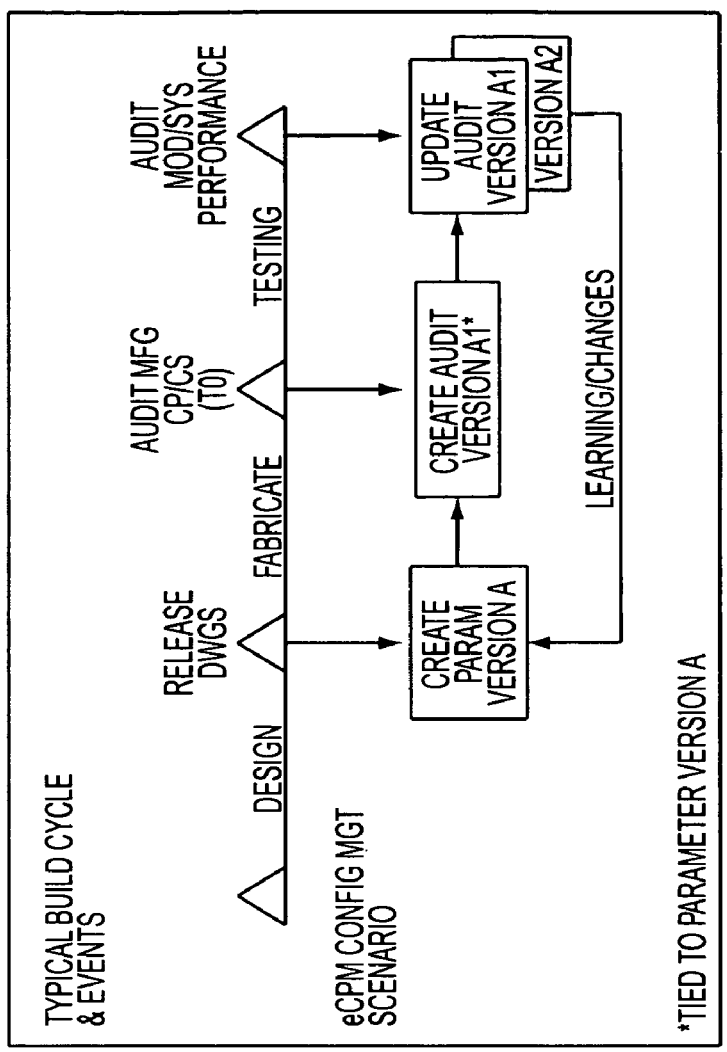

FIG. 19

FIG. 20 eCPM

Parameter Report

CRITICAL PARAMETERS

| ID | Name | Qty/Txt | Specification | | | | Unit | Tgt CpK | Text Spec | Comparison | |
| --- | --- | --- | --- | --- | --- | --- | --- | --- | --- | --- | --- |
| | | | Nom | Min | Max | | | | | IOT PIDS Audit | b6A & 6B Iot |
| 6490 | Parallelism Teler-PRDrive Rolls in p | Full | 0 | -5 | 5 | mrad | 1.33 | | | x |
| 6491 | Parallelism Teler-PR Drive Rolls per | Full | 0 | -5 | 5 | mrad | 1.33 | | x | x |
| 6492 | Parallelism PR Drive-Fuser Rolls in | Full | 0 | -3 | 3 | mrad | 1.33 | | x | x |
| 6493 | Parallelism PR Drive-Fuser Roll per | Full | 0 | -7.4 | 7.4 | mrad | 1.33 | | x | x |
| 6494 | PR Drive Roll orientation wrt Lft Doc | Full | 0 | -2 | 2 | mrad | 1.33 | | x | x |
| 6495 | PR Drive Roll orientation perp to pap | Full | 0 | -2.4 | 2.4 | mrad | 1.33 | | x | x |
| 6496 | Relative X-dist Teler Drive Roll Axis | Full | 91.7 | 90.45 | 92.95 | mm | 1.33 | | x | x |
| 6497 | Relative Y-dist Teler Drive Roll Axis | Full | 25.9 | 24.47 | 27.33 | mm | 1.33 | | x | x |
| 6518 | Detack shield to PR spacing-OB | Full | 5 | 4 | 6 | mm | 1.33 | | | x |
| 6519 | BTACS spacing above PR surface ( | Full | 21.9 | 19.9 | 23.9.9 | mm | 1.33 | | x | x |
| 6520 | Preclean Corotron-PR Gap-IB | Full | 8 | 7.5 | 8.12 | mm | 1.33 | | x | x |
| 6520 | Preclean Corotron-PR Gap-IB | Full | 8 | 7 | 9 | mm | 1.33 | | | x |
| 6521 | Preclean Corotron-PR Gap-Ctr | Full | 8 | 7 | 9 | mm | 1.33 | | x | x |
| 6522 | Preclean Corotron-PR Gap-OB | Full | 8 | 7.5 | 8.12 | mm | 1.33 | | x | x |
| 6522 | Preclean Corotron-PR Gap-OB | Full | 8 | 7 | 9 | mm | 1.33 | | | x |
| 6523 | ESV probe spacing above PR | Full | 3 | 1.5 | 4.5 | mm | 1.33 | | | |
| 6524 | Dev Gap at Center-Roll 1 | Full | 414.02 | 363.22 | 464.82 | microns | 1.33 | | x | x |
| 6530 | Condition/Erase Aperture to PR Belt | Full | 3.75 | 3 | 6 | mm | 1.33 | | x | |
| 6530 | Condition/Erase Aperture to PR Belt | Full | 3.75 | 3.25 | 4.25 | mm | 1.33 | | | x |
| 6531 | Condition/Erase Aperture to PR Belt | Full | 3.75 | 3 | 6 | mm | 1.33 | | x | |
| 6531 | Condition/Erase Aperture to PR Belt | Full | 3.75 | 3.25 | 4.25 | mm | 1.33 | | | x |
| 6532 | Condition/Erase Aperture to PR Belt | Full | 3.75 | 3 | 6 | mm | 1.33 | | | |
| 6532 | Condition/Erase Aperture to PR Belt | Full | 3.75 | 3.25 | 4.25 | mm | 1.33 | | | x |
| 6533 | Pretransfer Corotron Interference w | Full | 5.54 | 1.04 | 10.04 | mm | 1.33 | | x | x |
| 6537 | Charge Scorotron Interference with | Full | -11.26 | -12.26 | -10.26 | mm | 1.33 | | | x |
| 6537 | Charge Scorotron Interference with | Full | -11.05 | -12.05 | -10.05 | mm | 1.33 | | | |

FIG. 21

| MATURITY LEVEL | INPUT / OUTPUT | CP | CONSTRAINTS | TTM PHASE |
|---|---|---|---|---|
| LEVEL 1 | PROPOSED | IDENTIFIED | ALLOCATED | 3.1 |
| LEVEL 2 | CONCURRED NOMINALS OPTIMIZED | OPTIMIZED | CONCURRED - DESIGN CONFORMANCE PROJECTED (OR RISK ACCEPTED) | 3.1, 3.2 |
| LEVEL 3 | OUTPUT LATITUDE DEMONSTRATED | OUTPUT LATITUDE DEMONSTRATED | | 3.2 |
| LEVEL 4 | DESIGN DEMONSTRATED | DESIGN DEMONSTRATED | CONFORMANCE DESIGN DEMONSTRATED (INTERNAL AGENCY) | 3.3 |
| LEVEL 5 | PROCESS CERTIFIED | PROCESS CERTIFIED | CONFORMANCE DESIGN DEMONSTRATED (EXTERNAL AGENCY) | 3.3, 3.4 |
| LEVEL 6 | ON-LINE QC | ON-LINE QC | | 3.4, 3.5 |

Add/Edit Serial No. -- Web Page Dialog

ID/Serial #

[Add]

| Action | ID/Serial # |
|---|---|
| Del | |
| ☐ | FRMB5-01 |
| ☐ | FRMB5-02 |
| ☐ | FRMB5-03 |
| ☐ | FRMB5-04 |
| ☐ | FRMB5-05 |
| ☐ | FRMB5-06 |
| ☐ | FRMB5-07 |
| ☐ | FRMB5-08 |
| ☐ | FRMB5-09 |
| ☐ | FRMB5-10 |
| ☐ | FRMB5-11 |
| ☐ | FRMB5-12 |
| ☐ | FRMB5-13 |
| ☐ | FRMB5-14 |

[Save] [Cancel]

FIG. 29

FIG. 30 eCPM

| Home | Admin | Part Structure | Add/Edit/Link | Manage Maturity | Manage Conformance | Reports | Resources | Help | Logout

Audit Data Capture

Product Family: Rivers
Product: Tigris
Configuration: DC-ST
Build: PID B4
Object:

| Select | | Type | Part Number | Owner |
|---|---|---|---|---|
| ○ | 00.000 System | Mat | | Henry Meyer |
| ○ | 00.010 FINAL ASSEMBLY | Mat | | Henry Meyer |
| ○ | 00.020 FINAL CALIBRATION VERIFICATION | Mat | | Henry Meyer |
| ○ | 00.050 ELECTRICAL INTER | Mat | | Henry Meyer |
| ○ | 00.060 BIG PICTURE | Mat | | Henry Meyer |
| ○ | 00.100 MECHANICAL INTEGRATION | Mat | | Henry Meyer |
| ○ | 00.200 IOT INTEGRATION | Mat | | Henry Meyer |
| ⊙ | 00.400 XEROGRAPHIC DEBUG | Mat | | Tom Race |
| ○ | 13.000 RASTER OUTPUT [ROS] | Mat | | Wayne Hulbert |
| ○ | 31.000 FRAMES - IOT | Mat | | Erwin Ruiz |
| ○ | 31.200 XERO DWR | Mat | | Wayne Hulbert |
| ○ | 31.300 MISC FRAME PARTS | Mat | | Henry Meyer |
| ○ | 32.000 COVERS | Mat | | Henry Meyer |

Param Version: 4 -- 10/4/2002 2:43:54 PM
Audit Version: 1 - B4 new

Create New Audit Version

Continue

FIG. 31 eCPM

| Home | Admin | Part Structure | Add/Edit/Link | Manage Maturity | Manage Conformance | Reports | Resources | Help | Logout

Audit Data Capture

Product: Tigris Configuration: DC-ST  Build: PID B4  Param Version:  4  Owner: Tom Race  Object: 13.000 RASTER OUTPUT [ROS]

Audit Version: 1 - B4 new

Show All

| Save | | Create New Audit Version | | Edit Audit Data-Table View | | Create Excel Template | | Import Excel Template | | Change Object |

⊞ Inputs  Outputs  Critical Parameters  Sort By: [ ▼ ]  ☐ Show Group Apply Fields ⊟ Outputs  Inputs  Critical Parameters  Sort By: [ Parent/Child ▼ ]  ☐ Show Group Apply Fields

| Action | ID | Interface Links | | Specification | | 95% Cpk LCL | Manual Entry? | Edit Audit Data | Data URL | Quality Indices | | Sample Information | | | Sample Statistics | | | |
|---|---|---|---|---|---|---|---|---|---|---|---|---|---|---|---|---|---|---|
| | | From | To | Name | | | | | | % Pass | Sample Cpk | % Tgt Units | N | n | Min | Max | Mean | SDev |
| | 3121 | 13 | 0.6 | Jitter @ 585.6 | | 0.75 | | ⊞ | | 100 | 1.03 | 100 | 16 | 32 | 6.59 | 14.87 | 11.11 | 2.2265 |
| | 3116 | 13 | 0.6 | Laser Diode Dro | | | | ⊞ | | | | | | | | | | |
| | 3136 | 13 | 70.1 | Laser Ready Tim | | | | ⊞ | | | | | | | | | | |
| | 3108 | 13 | 45.1 | Laser Wavelengt | | | | ⊞ | | | | | | | | | | |
| | 3102 | 13 | 0.61 | Lateral Registr | | 1.33 | | ⊞ | | 100 | 1.78 | 100 | 16 | 32 | -0.4 | 0.22 | -0.02 | 0.1837 |
| | 3100 | 13 | 0.61 | Lead Edge Regis | | 2.28 | | ⊞ | | 100 | 3.04 | 100 | 16 | 32 | -0.29 | 0.18 | -0.01 | 0.109 |
| | 3138 | 13 | 70.1 | MPA Spin Down T | | | | | | | | | | | | | | |

⊞ Critical Parameters  Inputs  Outputs  Sort By: [ ▼ ] Edit

| | Specification | | Quality Indices | Sample Infromation | Sample Statistics |

Shop Floor Import View

Product: Tigris Configuration: DC-ST Owner: Michael Soures Object: 45.000 PHOTORECEPTOR MODULE Do you want to import the following Shop Floor data? Yes No

| Subsys # | Serial #/ID | Param ID | Param Description | Audit Date/Time | Audit Value | Qualifier 1 | Qualifier 2 | Audit Location |
|---|---|---|---|---|---|---|---|---|
| 45.000 | 064K01426031600010IU | 2034 | BOB Brush #1 Bias | 6/16/2003 10:11:10 AM | 2.93316 | BOB Brush #2 Voltage | | supplier |
| 45.000 | 064K01426031600010IU | 2034 | BOB Brush #1 Bias | 6/16/2003 10:11:10 AM | 2.97119 | BOB Brush #1 Voltage | | supplier |
| 45.000 | 064K01426031600010IU | 2034 | BOB Brush #1 Bias | 6/17/2003 7:48:18 AM | 2.95898 | BOB Brush #1 Voltage | | supplier |
| 45.000 | 064K01426031600010IU | 2034 | BOB Brush #1 Bias | 6/19/2003 11:22:31 AM | 2.99072 | BOB Brush #2 Voltage | | supplier |
| 45.000 | 064K01426031600010IU | 2034 | BOB Brush #1 Bias | 6/19/2003 11:22:31 AM | 2.97607 | BOB Brush #1 Voltage | | supplier |
| 45.000 | 064K01426031600010IU | 2251 | Dev Gap CE-IB (Upper Bar) | 6/16/2003 10:11:10 AM | 2.96387 | Dev Gap CE-IB (Upper Bar) | | supplier |
| 45.000 | 064K01426031600010IU | 2251 | Dev Gap CE-IB (Upper Bar) | 6/16/2003 10:11:10 AM | -2 | Dev Gap CE-OB (Upper Bar) | | supplier |
| 45.000 | 064K01426031600010IU | 2251 | Dev Gap CE-IB (Upper Bar) | 6/17/2003 7:18:10 AM | 7 | Dev Gap CE-IB (Upper Bar) | | supplier |
| 45.000 | 064K01426031600010IU | 2251 | Dev Gap CE-IB (Upper Bar) | 6/17/2003 7:48:18 AM | 17.5 | Dev Gap CE-OB (Upper Bar) | | supplier |
| 45.000 | 064K01426031600010IU | 2251 | Dev Gap CE-IB (Upper Bar) | 6/19/2003 11:22:31 AM | 12.5 | Dev Gap CE-IB (Upper Bar) | | supplier |
| 45.000 | 064K01426031600010IU | 2251 | Dev Gap CE-IB (Upper Bar) | 6/19/2003 11:22:31 AM | 10.5 | Dev Gap CE-IB (Upper Bar) | | supplier |

FIG. 40

| | | |
|---|---|---|
| ⌊◈ 042K02010,A,7 | CLEANER ASSY | ASSEN |
| ├ USES PARTS (USES) | | |
| │ ├ ◈014E46060,A,4 | SEPARATOR | COMP |
| │ ├ ◈014E46770,A,4 | BLOCK LWR REAR | COMP |
| │ ├ ◈014E46780,A,4 | BLOCK LWR FRT M | COMP |
| │ ├ ◈019E51470,A,1 | TINEMANCLIPS | COMP |
| │ ├ ◈025E05770,A,1 | FLICKER BAR | COMP |
| │ ├ ◈028E14690,A,3 | WASHER-CONDUC | COMP |
| │ ├ ◈033K03520,A,2 | SPOTS BLADE ASS | ASSEN |
| │ │ ├ USES PARTS (USES) | | |
| │ │ │ ├ ◈029E38130,A,4 | PIN-BLADE LOCATC | COMP |
| │ │ │ ├ ◈033E04580,A,4 | SPOTS BLADE | COMP |
| │ │ │ ⌊ ◈830E75020,A,4 | BRK-SPOTS BLADE | COMP |
| │ ├ ◈042K01980,A,2 | BRUSH | ASSEN |
| │ ├ ◈052E22610,A,4 | FLEX HOSE | COMP |
| │ ├ ◈054K24650,A,4 | MANIFOLD ASSY | ASSEN |
| │ │ ├ USES PARTS (USES) | | |
| │ │ │ ├ ◈005E20880,A,4 | FLANGE-GASKET | COMP |
| │ │ │ ├ ◈016E16320,A,4 | ADAPOR-Y | COMP |
| │ │ │ ├ ◈035E60970,A,4 | MANIFOLD SEAL | COMP |
| │ │ │ ├ ◈052E23140,A,4 | ELBOW-UPPER | COMP |
| │ │ │ ⌊ ◈052E23150,A,4 | ELBOW-LOWER | COMP |
| │ ├ ◈127K40690,A,4 | CLEANER MOTOR | ASSEN |
| │ ├ ◈152K00001,A,1 | BIAS HARNESS | ASSEN |
| │ ├ ◈152K00004,A,1 | MOTOR HARNESS | ASSEN |
| │ ├ ◈802E40590,A,4 | HOUSING, EXTRA-R | COMP |
| │ ├ ◈802E40600,A,5 | HOUSING, EXTRA-LE | COMP |
| │ ├ ◈802K38260,A,4 | FRONT END PLATE | ASSEN |
| │ ├ ◈802K38280,A,4 | REAR END PLATE, | ASSEN |

PRODUCT A SYSTEM PARAMETER AUDIT
BUILD: B0   LOCATION: SYSTEM AUDIT
SPECIFICATION
AUDIT INFORMATION

| | | PARAMETER DATA | | | | AUDIT DATA | | | | |
|---|---|---|---|---|---|---|---|---|---|---|
| REC# | FROM | NOM/MIN/MAX (TEXT) | NOM | MIN | MAX | UNITS | MIN | MAX | AVERAGE | SDEV | CPK |
| | 3323 | SKEW INBOARD SIDE | +2.0 mm | -2 | 2 | mm | mm/200mm | -1.834 | 1.355 | 0.057 | 0.56 |
| | 3342 | PRINT: SLEEP/ OFF MODE - PRINTER | 70 MAX | 70 | 70 | WATTS | 56.5 | 6.36 | 0.71 | | 2.66 |
| | 3422 | PRINT: MARGIN | 2.54 min | 2.54 | | mm | | | | | |
| | 3419 | PRINT: PRINT RATE | REF: STEFAN LORENZ PROCEDURE | 20 | 20 | ppm | 19.9336 | 20.8449 | 19.4285877 | 0.34 | - 0.57 |

FIG. 50

CRITICAL PARAMETER/REQUIREMENTS MANAGEMENT PROCESS AND ENVIRONMENT

BACKGROUND

The embodiments disclosed herein relate to a critical parameter/requirements management process and an environment associated therewith having one or more tools to implement the process for management of parameter/requirements during a product development program. It finds particular application in conjunction with end-to-end requirements management from planned development to manufacturing and production. However, it is to be appreciated that the embodiments disclosed herein are also amenable to other like applications.

Problems in current critical parameter management process models and associated tools can be grouped into four areas: a) process model and workflow, b) information technology, c) requirements management capabilities, and d) integration of requirements management with other key tools.

The process model and workflow in existing tools is either missing one or more of the key elements, have weaker implementations of one or more of the elements, or are overly complex. Most existing requirements management tools have the ability to add custom parameter/requirement attributes, but lack of any specific or simple workflow and process rules around managing object interfaces. This is a significant shortcoming.

In regard to information technology, existing requirements management tools typically require client software versions for full functionality—web versions are highly de-featured or do not exist. Where existing tools offer web versions, limitations in the user interface (UI) and workflow concepts and designs, users must purchase client versions to perform more advanced authoring or other functions. Ongoing maintenance costs to deploy and support existing tools are therefore higher.

Typically, existing requirements management tool capabilities are optimized for a document-driven workflow most commonly used in the software development discipline (e.g., import, parse, tag and manage requirements from a Microsoft Word document). Hardware domain users require a product structure-driven workflow where the master source of structure is the product decomposition where object interface and internal requirements can be specifically identified and managed along with the ability for integration areas to manage requirements flow across two or more subsystems to achieve a system requirement. This preferred workflow for the hardware domain requires tight integration with the master source of product structure (e.g., assembly structures and bill of materials from computer-aided design systems).

Regarding integration of requirements management tools with other tools, existing tools have emphasized application interface capabilities aimed at the document-driven workflow and links to software tools rather than those required for the product structure-driven workflow. Existing tools allow hierarchical decompositions and have flexible access rights, but do not provide the necessary object classification, associated rules and web capable user interface design that enables simple, real-time interface management and views. Additionally, existing tools do not have a well-developed method for managing object reuse across multiple hardware configurations and products, nor an efficient integration with other master sources of structure.

Existing tools have not implemented a parameter/requirements classification scheme, associated rules, and interfaces to other product development tools that allow both real-time object-oriented interface management and flow-down/traceability management with a corresponding workflow/UI in a web application. Moreover, existing tools have not embedded a set of process requirements within a maturity model where both the target maturity level and status can be adjusted and viewed by parameter. Existing requirements management tools have not provided a framework for managing process rigor and generating associated in-process metrics.

BRIEF DESCRIPTION

In accordance with one aspect of the exemplary embodiments, a method of managing a development program for a product using a product structure-driven requirements management tool with a product structure feature group is provided. The method includes: a) designating a product-level user with rights to access and manage a hierarchical product structure of objects that define at least one configuration of the product, b) building and managing the objects of the hierarchical product structure, c) associating a first group of attributes with each object to facilitate display of views of the product structure or portions thereof arranged by one or more of product structure, object, attribute, and attribute group, d) designating one or more object-level users, wherein each object-level user is granted rights to access and manage one or more objects and corresponding subordinate levels in the hierarchical product structure, and e) defining the rights to access and manage the one or more objects such that the rights to access and manage each object are individually defined for each object-level user and each attribute associated with the corresponding object with respect to the object-level user's access to the attribute and the ability of the object-level user to manage the attribute.

In accordance with another aspect of the exemplary embodiments, a method of managing a development program for a product using a product structure-driven requirements management tool with an add/edit/link feature group is provided. The method includes: a) providing an object oriented product structure classification scheme with a hierarchical product structure of objects that define at least one configuration of the product, b) capturing requirements for the product, c) associating at least a portion of the captured requirements with one or more objects of the product structure, d) classifying the requirements associated with the objects into input requirements, critical requirements, and output requirements, e) linking at least one output requirement to at least one related input requirement, f linking at least one input requirement to at least one related critical requirement, wherein each linked input requirement and related critical requirement are associated with the same object, and g) linking at least one critical requirement to at least one related output requirement, where each linked critical requirement and related output requirement are associated with the same object.

In accordance with yet another aspect of the exemplary embodiments, a method of managing a development program for a product using a product structure-driven requirements management tool with a manage maturity feature group is provided. The method includes: a) providing an object oriented product structure classification scheme with a hierarchical product structure of objects that define at least one configuration of the product, b) providing a requirements classification scheme to: i) capture requirements for the product, ii) associate at least a portion of the requirements with objects of the product structure, iii) classify the at least a portion of the associated requirements into input, critical, and output requirements, and iv) define links between at least a portion of the classified requirements, c) establishing one or more maturity levels corresponding to phases of the development program from inception through production, d) identifying planned criteria for achievement of the maturity levels for at least a portion of the requirements associated with objects of the product structure, and e) establishing in-process measures to determine a status of achievement of one or more maturity levels for one or more requirements associated with one or more objects of the product structure with respect to the planned criteria for the corresponding requirement and maturity level.

In accordance with still another aspect of the exemplary embodiments, a method of managing a development program for a product using a product structure-driven requirements management tool with a manage conformance feature group is provided. The method includes: a) providing an object oriented product structure classification scheme with a hierarchical product structure of objects that define at least one configuration of the product, b) providing a requirements classification scheme to: i) capture requirements for the product, ii) associate at least a portion of the requirements with objects of the product structure, iii) classify the at least a portion of the associated requirements into input, critical, and output requirements, and iv) define links between at least a portion of the classified requirements, c) planning development and maturity of the product through one or more maturity levels associated with achievement of requirements associated with objects of the product structure, d) establishing in-process measures to determine a status of achievement of the planned development and maturity of the product, e) planning for one or more audits of conformance of one or more builds of one or more configurations of the product at one or more of the maturity levels to one or more requirements associated with one or more objects of the product structure, f) qualitatively assessing conformance of one or more requirements associated with one or more objects of the product structure for each of the one or more builds, g) quantitatively assessing conformance of one or more requirements associated with one or more objects of the product structure for each of the one or more builds, and h) utilizing the qualitative and quantitative assessments of conformance to identify, prioritize, and manage conformance risk during the development program as development of the objects of the product structure advance through the one or more maturity levels.

In accordance with another aspect of the exemplary embodiments, a product structure-driven requirements management system for managing a development program for a product is provided. The system includes: a database server with a database for storing information associated with a plurality of objects that define at least one configuration of the product and a plurality of requirements for the product, one or more user workstations with a web page browser, and a web application server in communication with the database server and the one or more user workstations, the web application server including a product structure-driven requirements management tool to provide interactive web pages to the one or more user workstations and control manipulation of the information stored in the database in response to user actions associated with the interactive web pages.

In accordance with yet another aspect of the exemplary embodiments, a method of managing a development program for a product is provided. The method includes: a) using a product structure classification scheme to build a hierarchical product structure of objects that define at least one configuration of the product, b) using a requirements classification scheme to associate interface requirements and internal requirements with the objects in the product structure and to establish links between interface and internal requirements that are associated with the same object, links between interface requirements associated with certain objects and one or more other objects, and links between interface requirements associated with certain objects and one or more external sources, c) using a maturity model to establish one or more maturity levels from inception to production of the product at which status of the requirements classification scheme for the development program is assessed, and d) using in-process maturity measures to establish plan and outlook dates for achievement of the interface and internal requirements, to track actual achievement of the interface and internal requirements, to assess development program risks, and to determine if corrective action should be taken.

BRIEF DESCRIPTION OF THE DRAWINGS

FIG. 7 is a view of an exemplary product structure;

FIG. 9 is a view of an exemplary product structure management for parts/bills of materials associated with a product structure;

FIG. 10 is a view of an exemplary object oriented configuration management process with an ability to map objects across multiple products and configurations;

FIG. 11 is a diagram showing an exemplary basic object oriented parameter/requirements classification scheme;

FIG. 12 is a view of an exemplary input/output requirement table in an add/edit/link (parameters/requirements) feature group;

FIG. 14 is a view of an exemplary a critical parameter/critical specification table in an add/edit/link (parameters/requirements) feature group;

FIG. 16 is a view of an exemplary add/edit additional links process in an add/edit/link (parameters/requirements) feature group;

FIG. 19 is a diagram of exemplary parameter and audit versioning configuration management mechanisms for a critical parameter/requirements management tool;

FIG. 20 is a view of exemplary mapping of active parameters by configuration;

FIG. 21 is a view of an exemplary parameter report with parameters versioned by configuration and comparisons of version differences;

FIG. 22 is an exemplary parameter/requirements maturity model aligned with an exemplary phased product delivery process;

FIG. 23 is a view of an exemplary manage maturity feature group screen where users can set target maturity levels and view progress toward maturity for parameters/requirements;

FIG. 25 is a view of an exemplary set of criteria for an exemplary level 1 in a manage maturity feature group;

FIG. 28 is a view of exemplary audit planning in a manage conformance feature group;

FIG. 29 is a view of exemplary capturing of unique serial numbers for objects by configuration in conjunction with audit planning in a manage conformance feature group;

FIG. 30 is a view of an exemplary qualitative conformance risk assessment in a manage conformance feature group;

FIG. 31 is a view of exemplary audit data capture where multiple audit versions are created for each parameter version for an object in a manage conformance feature group;

FIG. 32 is a view of exemplary audit data capture with summary statistics and links to multiple means for data audit capture in a manage conformance feature group;

FIG. 33 is a view of exemplary audit data capture where raw data may be directly entered by unit for individual parameters in a manage conformance feature group;

FIG. 34 is a view of exemplary audit data capture where raw data may be directly entered by unit for multiple parameter in a manage conformance feature group;

FIG. 35 is a view of an exemplary audit data report that serves as an exemplary export/import spreadsheet template for audit data capture by configuration in a manage conformance feature group;

FIG. 36 is a view of an exemplary unit audit report showing requirements conformance by unit/serial number in a manage conformance feature group;

FIG. 40 is a view of exemplary audit data imported into the critical parameter/requirements management tool from manufacturing test equipment via a manufacturing/production control system tool in a mange conformance feature group (e.g., data for a selected configuration may be presented and serial number and data load may be automated);

FIG. 42 is a view of an exemplary material product structure in a product structure feature group;

FIG. 43 is a view of an exemplary virtual integration object structure in a product structure feature group;

FIG. 45 is a diagram of exemplary authoring for requirements associated with a material and/or virtual integration object of a product structure in an add/edit/link feature group;

FIG. 50 is a view of exemplary audit data with parameter data and audit data in a manage conformance feature group.

DETAILED DESCRIPTION

Figure 1:
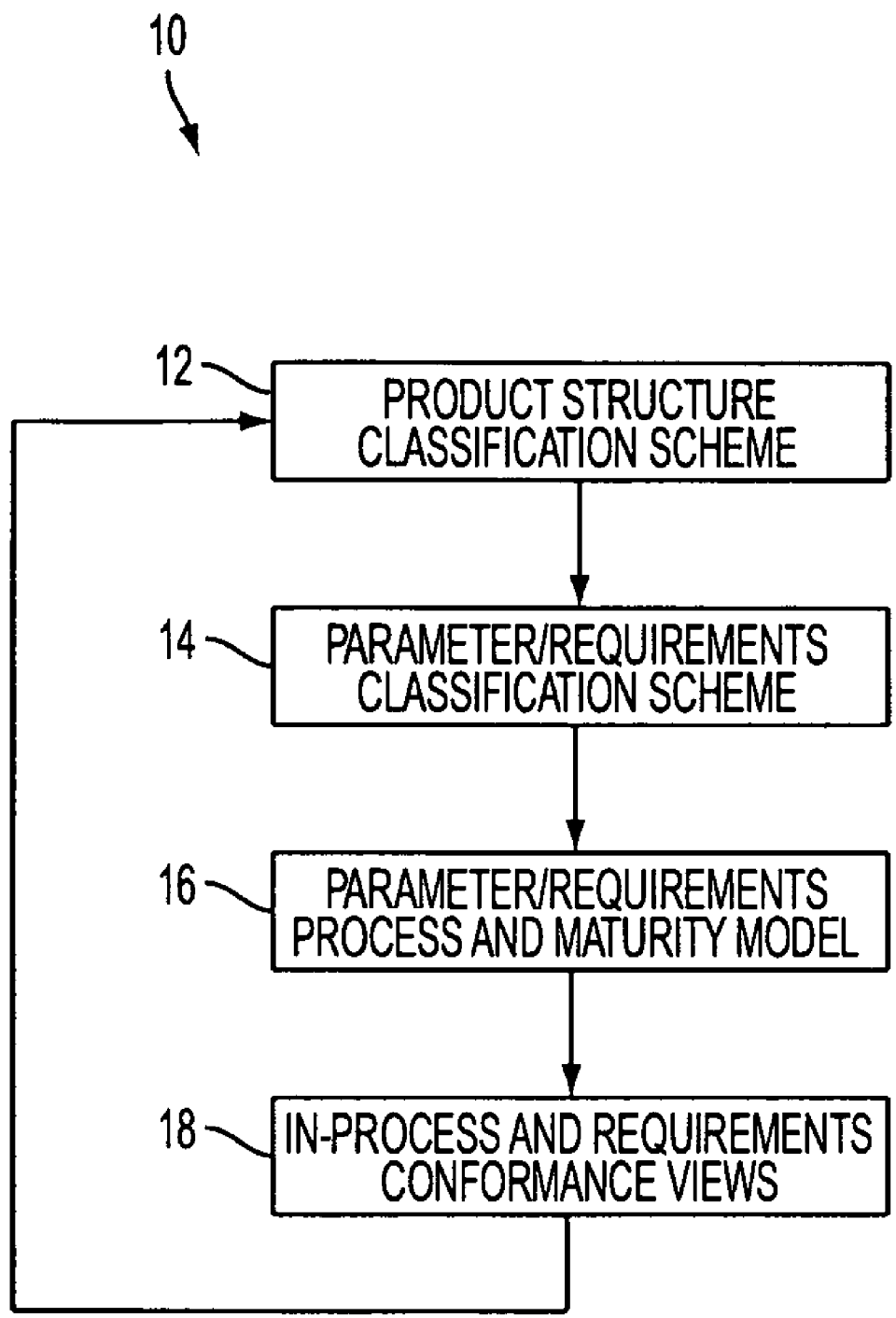
FIG. 1 is a flow chart of a critical parameter/requirements management process model.

Problems in current critical parameter management environments that are addressed by the various embodiments of the critical parameter/requirements management environment described herein can be grouped into four areas: a) process model and workflow, b) information technology, c) requirements management capabilities, and d) integration of requirements management with other key tools.

The critical parameter/requirements management process model and workflow includes a detailed product structure and requirement classification scheme that supports many best practices in hardware systems management, the ability to encode process requirements into the workflow which enables auto-generation of in-process risk metrics, and the ability to use data to quantitatively assess conformance gaps.

In regard to information technology, critical parameter/requirements management has full functionality in a true web front end through a user interface (UI) design without any need for client software. This provides a significant cost and accessibility advantage.

In regard to requirements management capabilities, adding configuration management functionality in critical parameter/requirements management results in a much more powerful application than current critical parameter, management environments.

In regard to integration of requirements management with other key tools, critical parameter/requirements management has addressed gaps between existing tools and a product structure-driven work flow with key initial integrations with, for example, various product structures and bill of materials from computer-aided design systems, problem management systems, manufacturing audit data systems, and the ability to link requirements in critical parameter/requirements management with other requirements captured, for example, in IBM/Rational's RequisitePro product and problems captured, for example, in IBM/Rational's ClearQuest product.

Critical parameter/requirements management is a requirements management solution that supports end-to-end requirements management from goals development to manufacturing and on-line quality control. Critical parameter/requirements management supports many best practices (including six sigma) that are not available in existing solutions in an easy-to-use workflow and web front end including integrations with other key product development tools. Critical parameter/requirements management implements a simple, but powerful workflow consisting of four primary feature groups that map to the basic systems engineering/product development process: 1) decompose product and identify interfaces (product structure), 2) define parameters/requirements and trace these parameters/requirements through the system (add/edit/link), 3) manage risk and process rigor using in-process measures (manage maturity), and 4) manage risk and prioritize effort using quantitative gaps to conformance (manage conformance).

The cumulative effect of applying critical parameter/requirements management is faster product time to market, more effective and efficient reuse of product information, lower ongoing maintenance costs, and increased accessibility to information. For individuals and teams, critical parameter/requirements management provides an easy-to-use workflow and user interface enabling users to define, trace, control, and manage their requirements over the full product life cycle including views of conformance gaps using actual audit data that directly support the key principles of "design for six sigma" and "lean six sigma" initiatives for managing by fact. For management personnel, critical parameter/requirements management provides a set of real-time in-process and quality summary views that allow much more proactive and fact-based risk management and effort prioritization to speed time to market and increase organizational capability.

In general, critical parameter/requirements management is related to modern systems engineering, quality maturity, technology readiness, and requirements management practices. Critical parameter/requirements management includes various high-level processes and can be implemented in various information technology architectures. In one embodiment, the process elements of critical parameter/requirements management are implemented in a web information system. Critical parameter/requirements management includes a number of enhancements to the basic critical parameter/requirements management process and parameter model. It also includes rules and various embodiments for implementing these principles to create the enhanced process and solution.

Critical Parameter/Requirements Management Process Model, Critical Parameter/Requirements Management Tool Architecture, And Critical Parameter/Requirements Management Workflow Critical Parameter/Requirements Management Process Model Architecture And Components Overview With reference to FIG. 1, an overall flow chart of an embodiment of a critical parameter/requirements management process model 10 is provided. Critical parameter/requirements management includes a comprehensive process model that may be implemented in an easy-to-use web-based information system. This enables significant improvements in supporting systems engineering best practices in the area of proactive requirements management, technology and design readiness assessment, quality maturity, and the operational application of six sigma principles. The critical parameter/requirements management process model 10 has four integrated architectural components: 1) a product structure classification scheme 12, 2) a parameter/requirements classification scheme 14, 3) a parameter/requirements process and maturity model 16, and 4) a set of in-process and requirements conformance views 18 (e.g., performance against requirements).

Product Structure Classification Scheme

The product structure classification scheme 12 is object oriented and spans both high-level structure (e.g., product family, product, and subsystems including virtual integration areas) and detailed assembly/part decompositions (e.g., bill of material decompositions). Additionally, the product structure classification scheme 12 provides alignment to systems configurations and builds during the development process. The critical parameter/requirements management process model 10, through, for example, the product structure classification scheme 12, implements object attributes, object types, and process rules that enable real-time interface management, integration management, improved systems requirements flow-down and management, configuration management, and structured knowledge reuse.

Parameter/Requirements Classification Scheme

The parameter/requirements classification scheme 14 is also object oriented and enables a host of views and rules to support best engineering and six sigma practices. At the highest level, the parameters/requirements classification scheme 14 includes inputs, outputs, critical parameters/critical specifications, and the process rules associated with them. Inputs and outputs are used to define and manage requirements at the interface to an object. This is to reduce product complexity and enable reuse of objects across multiple configurations or products. Critical parameters/critical specifications are requirements under the direct control of the object development team and are defined, optimized, and controlled in the design to convert inputs into outputs that conform to the required specifications. This input, output, and constraint (IOC) model is refined in the parameter/requirements classification scheme 14 and rules are applied in critical parameter/requirements management to more effectively enable the process and features. In addition to this basic IOC classification, the critical parameter/requirements management process model 10 may add a number of sub attributes and associated process rules that enable additional features.

Parameter/Requirements Process and Maturity Model

The parameter/requirements process and maturity model 16 is integrated with the other components of the critical parameter/requirements management process model 10 and allows teams to establish specific criteria and associate them to "levels" that correspond to an organization's maturity requirements at particular phases of its product development process. In one embodiment of critical parameter/requirements management, the parameter/requirements process and maturity model 16 includes a six level maturity'scale with criteria that covers the entire product life cycle from inception to production as shown in FIG. 22. The parameter/requirements process and maturity model 16 allows users to track maturity progress through the levels for each individual parameter or as summary metrics for managers to help manage risks during development. The exemplary six level maturity scale and associated processes and maturity views can be adapted to any criteria and number of levels desired.

In-Process and Requirements Conformance Views

Based on the parameter/requirements process and maturity model 16, the critical parameter/requirements management process model 10 enables users to enter plan and outlook dates against level achievement for each parameter/requirement. Through the in-process and requirements conformance views 18, users can track actual completion to generate detailed or summary views of growth over time which become valuable in-process measures for managers to assess program risk and take any corrective actions earlier in the development process. The in-process maturity measures may be used to assess and manage risk during a phased development process. The critical parameter/requirements management process model 10 also may integrate the ability to add actual quantitative conformance and performance data to parameters/requirements by configuration and provide users with detailed or summary views of conformance gaps to requirements. This directly supports the fact-based principles and views called for in design for six sigma and lean six sigma practices. In addition, the critical parameter/requirements management process model may include real-time integration with an existing problem management tool, such as IBM/Rational's ClearQuest, to enable linking problems to objects and parameters as an additional way to view and proactively manage conformance issues during development.

Figure 2:
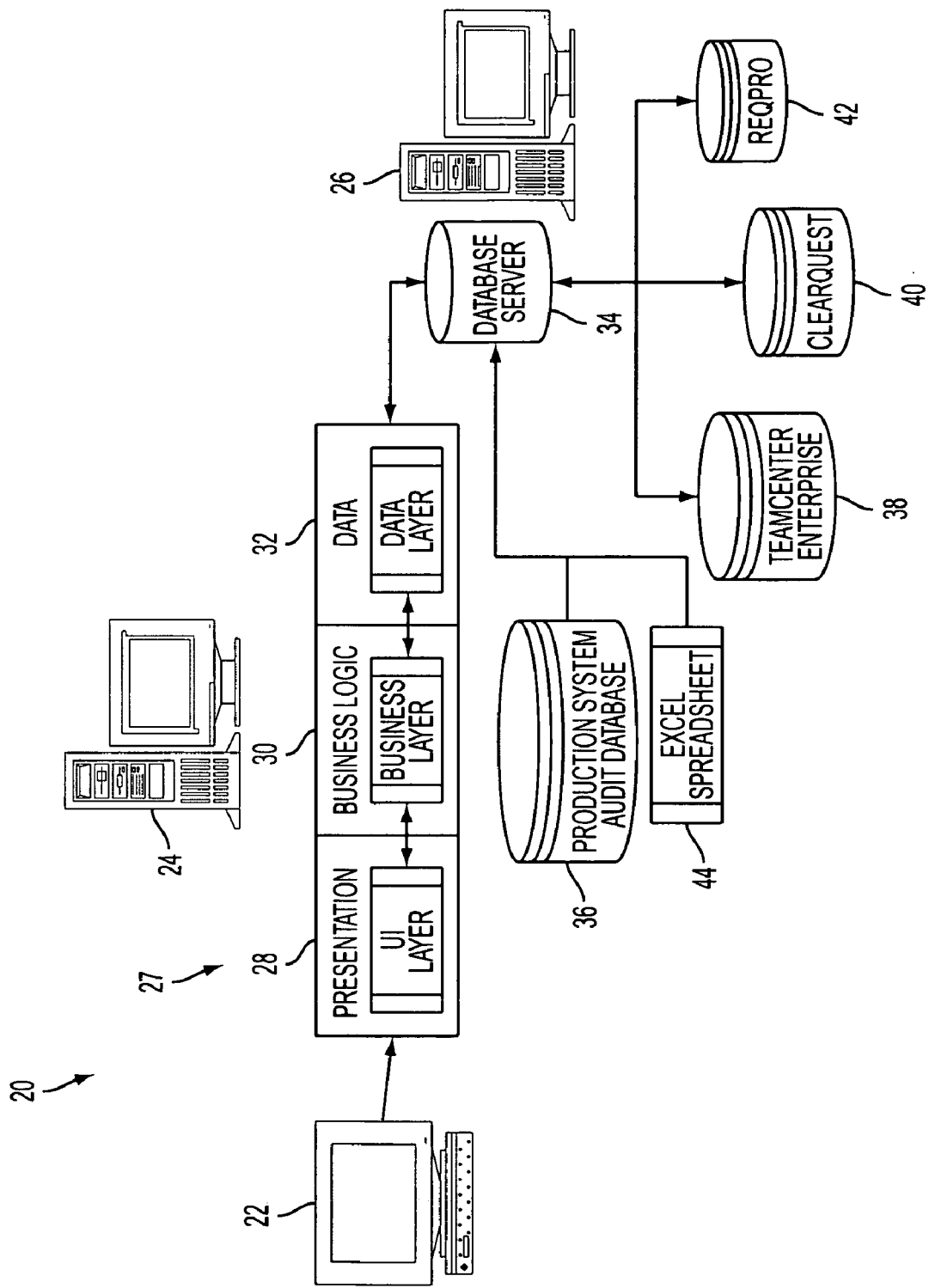
FIG. 2 is a block diagram of a critical parameter/requirements management system showing its information technology architecture.

Critical Parameter/Requirements Management Tool Architecture And Critical Parameter/Requirements Management Workflow Critical Parameter/Requirements Management Tool Architecture Overview With reference to FIG. 2, an overview of an exemplary information technology architecture used for an embodiment a critical parameter/requirements management system 20 includes a web user's workstation 22, a web application server 24, and a data repository 26. The web user's workstation 22 includes a thin-client web application or browser, such as Internet Explorer. The web application may be written in standard HTML, DHTML, JavaScript, and/or VBScript. As a true thin-client, the web application runs without a special critical parameter/requirements management client and does not require any user downloadable controls (e.g., Java applet downloads or ActiveX controls). With full functionality in a true thin-client web application, ongoing maintenance costs are lower and productivity is improved.

The web application server 24 includes a critical parameter/requirements management tool 27 with presentation software package 28, a business logic software package 30, and a data software package 32. The presentation software package 28 functions as a UI layer and interfaces with the web user's workstation 22. The business logic software package 30 is in communication with the presentation software package 28 and the data software package 32 and functions as a business layer. The data software package 32 functions as a data layers and interfaces with the data repository 26. The web application server 24 may include, for example, a Win2000 server running, for example, Microsoft's Internet Information Server (IIS). Software for the web application server may be written in active server pages, HTML, DHTML, VBScript, and/or JavaScript. The data software package 32 may include, for example, Microsoft's ActiveX Data Objects (ADO) as an interface to the data repository 26.

The data repository 26 includes a database server 34 for storing critical parameter/requirements management data. Access to the database server 34 is typically strictly controlled and performance is optimized. The database server 34 may include, for example, a Windows 2000 server and a standard query language (SQL) Server 2000. The data repository 26 may also include any combination of additional servers for coordination of data, for example, with a manufacturing/production control system tool 36, such as Xerox's Production System Audit Database, a configuration management (or product data management) tool 38, such as EDS's Teamcenter Enterprise, a problem management tool 40, such as IBM/Rational's ClearQuest, and/or a document-driven requirements management tool 42, such as IBM/Rational's RequisitePro. Alternatively, the database server 34 may include any combination of these related tools with the critical parameter/requirements management data. The database server 34 may also include spreadsheet templates and filters 44 compatible, for example, with Microsoft Excel for importing and exporting data between the database server 34 and the various tools.

Critical Parameter/Requirements Management Workflow Overview

Figure 3:
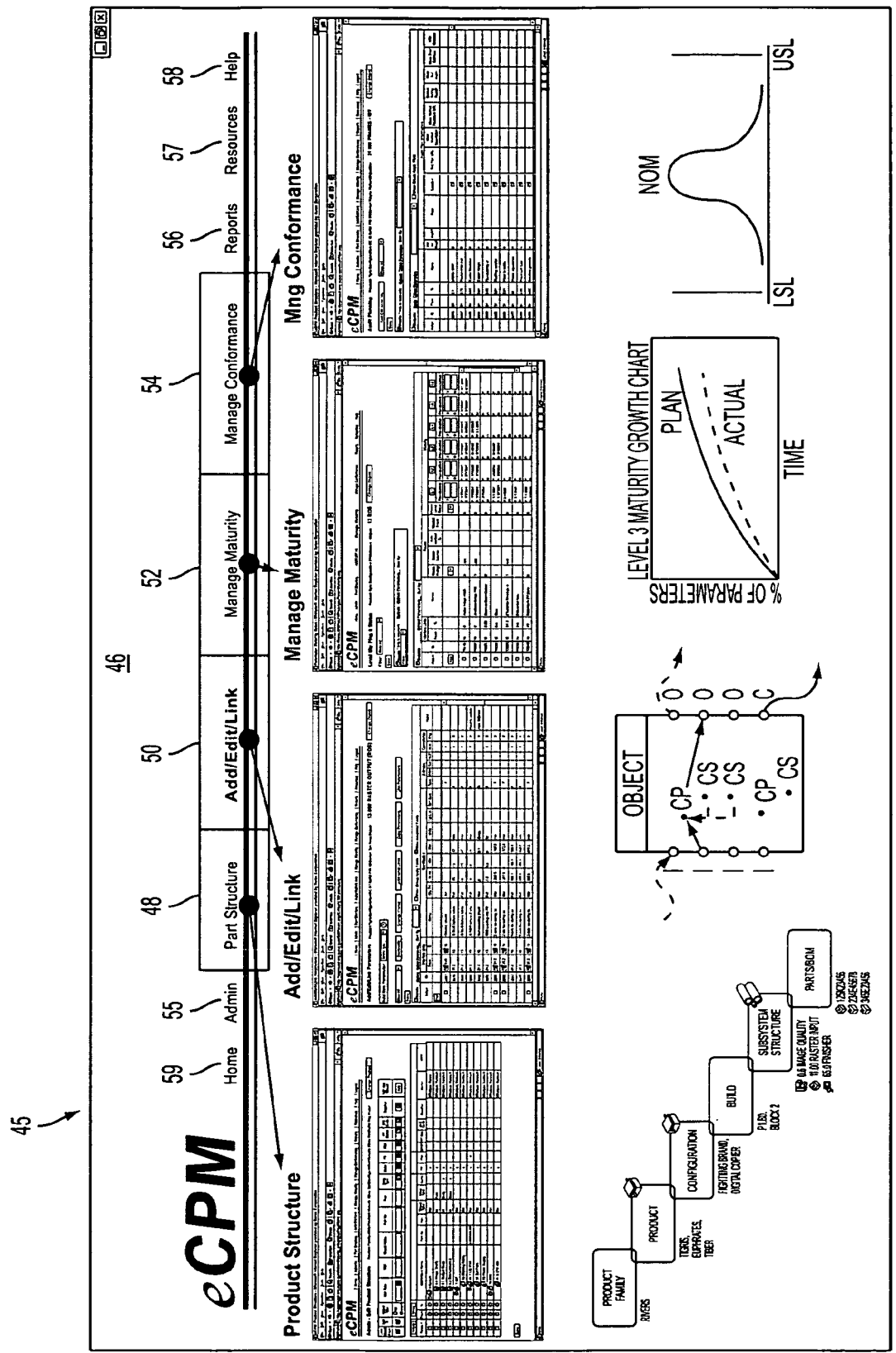
FIG. 3 is a diagram showing a workflow for a critical parameter/requirements management tool with a main menu and associated feature groups.

With reference to FIG. 3, a user interface (UI) 45 for the critical parameter/requirements management tool 27 includes a main menu 46 with four primary feature groups: 1) product structure 48, 2) add/edit/link 50, 3) manage maturity 52, and 4) manage conformance 54. These feature groups essentially align with the four components of the critical parameter/requirements management process model 10 (FIG. 1) and represent a simple, but very powerful, workflow enabling requirement definition and conformance and risk management over the product development life cycle. This simple, but comprehensive workflow is one of the key process and architectural advantages of critical parameter/requirements management. The main menu 46 also includes an admin feature group 55, a reports feature group 56, a resources feature group 57, a help system link 58, and a home link 59.

The product is decomposed with value chains through the product structure feature group 48. Interfaces between elements of the product are established through the product structure feature group 48. The add/edit/link feature group 50 allows users to define and link requirements to decomposed elements of the product. The flow of requirements through the system can be traced through add/edit/link feature group 50. The manage maturity feature group 52 allows users to manage quality and maturity by tracking "in-process" views of criteria and knowledge acquisition required at each level of the product structure. The manage conformance feature group 54 allows users to drive conformance to all requirements by tracking and prioritizing quantitative gaps in conformance over the life cycle.

Critical Parameter/Requirements Management User Interface (UI) Overview

Figure 4:
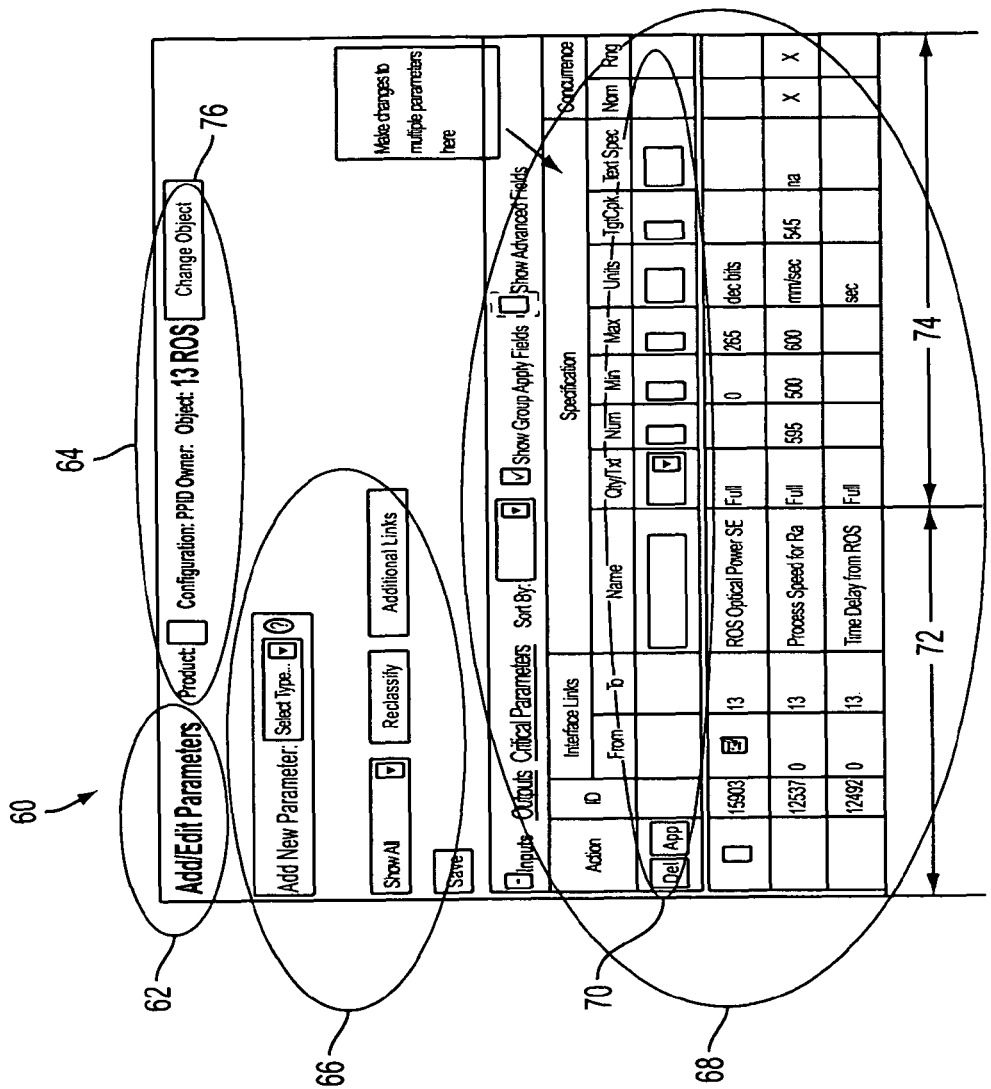
FIG. 4 is an exemplary user interface (UI) for a critical parameter/requirements management tool.

With reference to FIG. 4, the basic look and feel of the UI 45 is depicted in an exemplary screen display 60 with a screen title 62, object 64, action/filters 66, and parameter tables 68. The parameter tables 68 include a group apply line 70, a requirements portion 72, and an attributes portion 74. The basic design, look, and feel of the UI 45 provides value to the overall critical parameter/requirements management process model 10 and the critical parameter/requirements management system 20. Along with the overall workflow, the UI design enables full functionality in a true web front end.

The requirements portion 72 is on the left hand side of the screen and the attributes portion 74 is on the right hand side. Critical parameter/requirements management is an object-oriented approach to product development. Thus, by default the object 64 reflects the last object the user selected for authoring. The user may click on the change object button 76 any time to change the object for which information is to be displayed. The group apply line 70 allows users to make changes to multiple parameters. The UI 45 may implement any combination of special features in the screen displays, such as hover text, sort by columns, hypertext table jumping, expand/collapse levels of the product structure, and group apply and show advanced fields.

Figure 5:
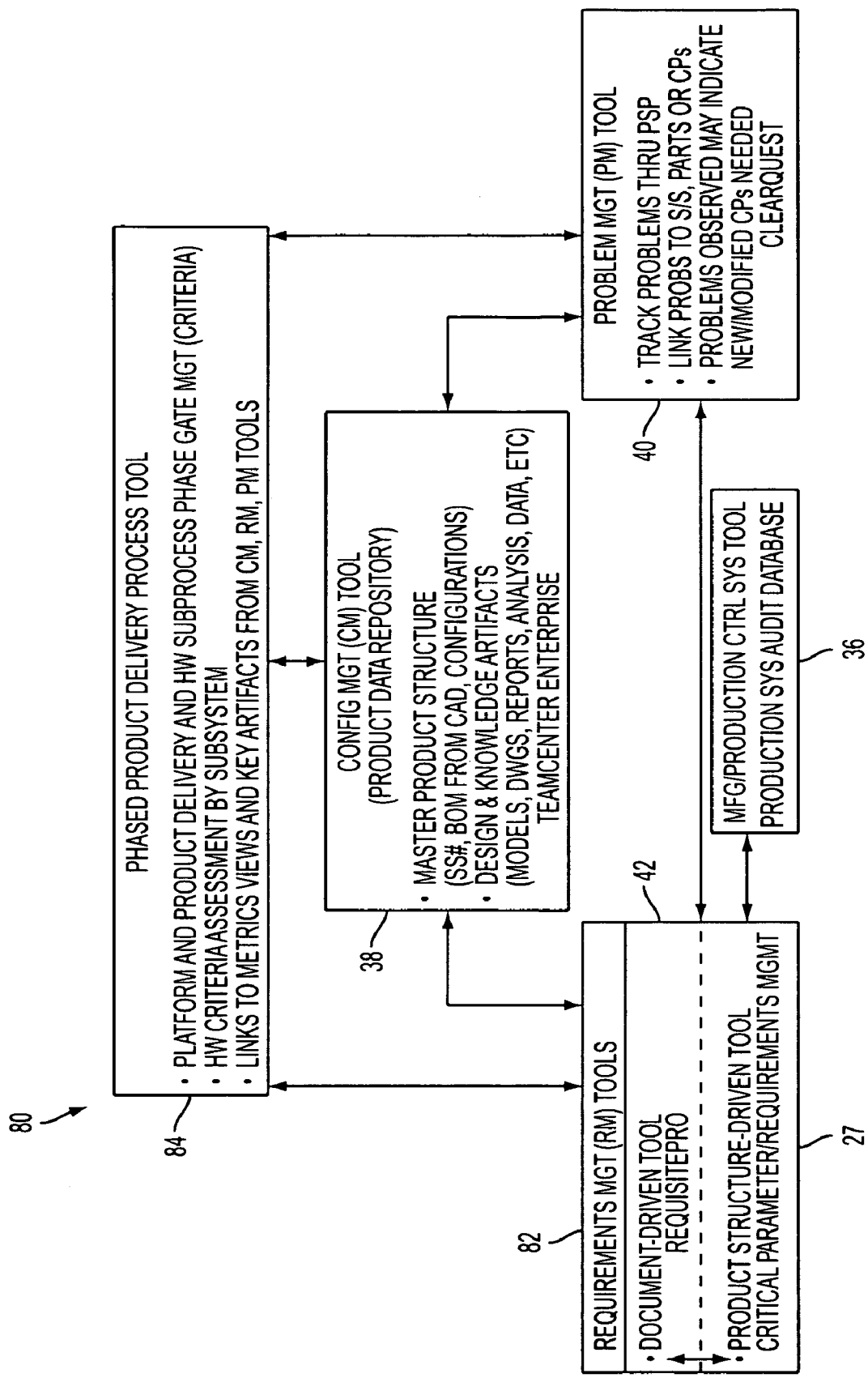
FIG. 5 is a flow chart of an exemplary systems engineering/product development environment with a critical parameter/requirements management tool integrated with other tools.
Figure 6:
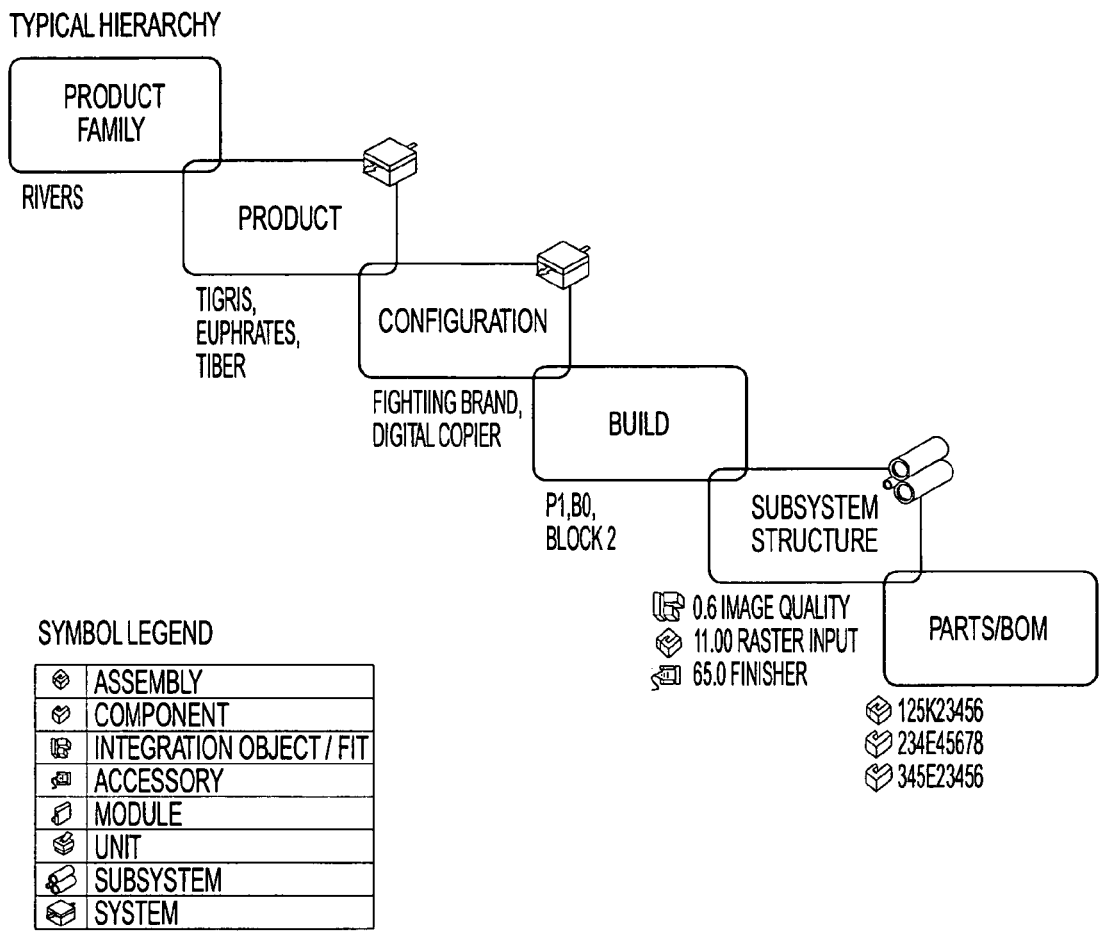
FIG. 6 is an exemplary embodiment of a product structure classification scheme.
Figure 8:
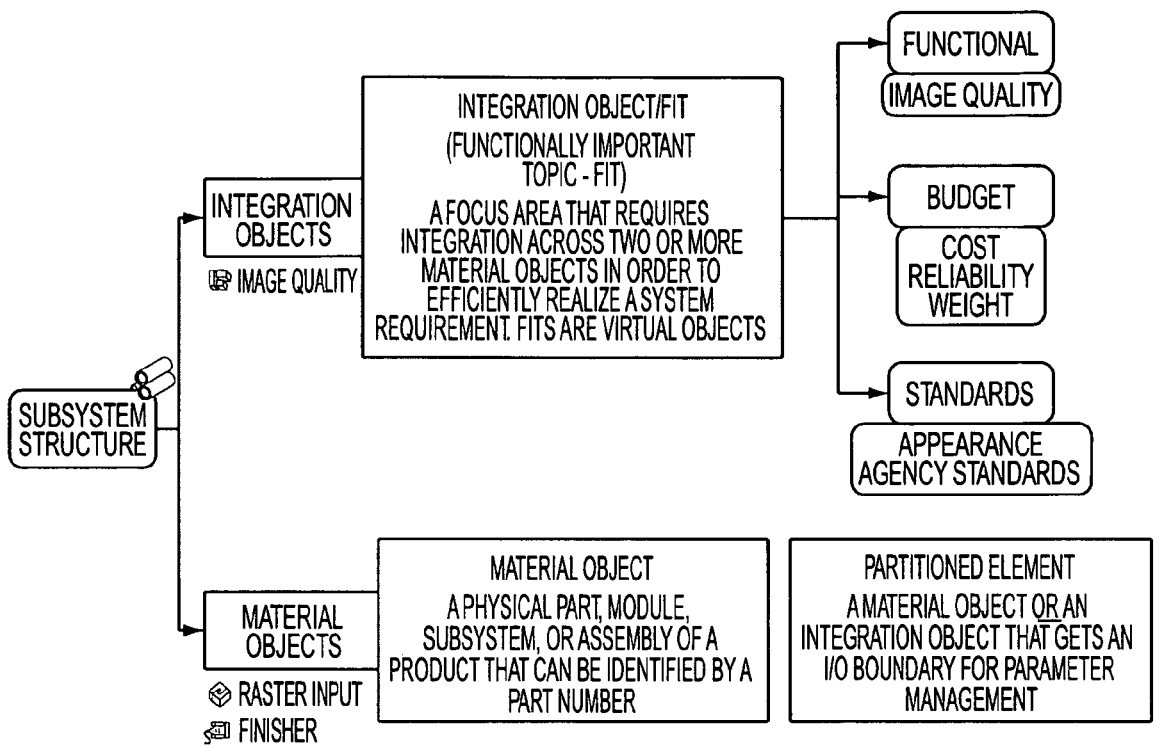
FIG. 8 is a hierarchical flow for an exemplary subsystem structure with virtual integration and material object types.

Critical Parameter/Requirements Management Tool Integration With Other Product Development Tools The critical parameter/requirements management tool 27 (FIG. 2) is a product structure-driven requirements management tool that can function as a stand-alone product. However, the critical parameter/requirements management tool 27 (FIG. 2) and the database server 34 (FIG. 2) can also be integrated with other product development tools for maximum productivity in end-to-end product development. FIG. 5 depicts the critical parameter/requirements management tool 27 within an overall systems engineering/product development environment 80 that includes the manufacturing/production control system tool 36, configuration management tool 38, problem management tool 40, requirements management tools 82, and a phased product delivery process tool 84.

The manufacturing/production control system tool 36 maintains manufacturing data associated with elements of the product structure. The manufacturing/production control system tool 36 may include an existing tool, such as Xerox's Production System Audit Database.

The configuration management tool 38 is a product information repository that may include a master product structure and design/knowledge artifacts. The master product structure may include system serial numbers (SS#), bills of materials from, for example, computer-aided design, and product configurations. The design and knowledge artifacts may include models, drawings, reports, analysis, data, and other information. The master product structure and design and knowledge artifacts may be maintained in a configuration management (or product data management) tool 38, such as EDS's Teamcenter Enterprise. The configuration management tool 38 may store the master product structure which may be based on master part structures (i.e., bills of materials) from computer-aided design. It may store knowledge artifacts by type and may maintain configurations and build authorization (BA). The configuration management tool 38 may receive special tag for quality, reliability, safety sensitive parts (QRSP) status from the critical parameter/requirements management tool 27 automatically.

The problem management tool 40 may track problems through a problem solving process (PSP). The tool may also link problems to subsystem (S/S), parts, or change proposals. Observed problems may be linked with parameters in the critical parameter/requirements management tool 27. The problems observed and maintained by the tool may indicate that new or modified change proposals are needed. The problem management tool 40 may include an existing tool, such as IBM/Rational's ClearQuest. The problem management tool 40 captures and manages the problem reporting and management process.

The product-structure critical parameter/requirements management tool 27 includes an interface to a document-driven requirements management tool 42, such as IBM/Rational's RequisitePro. The document-driven requirements management tool 42 can capture and manage text-driven requirements for software, systems, and standards. It can read in and parse requirements from text documents. The critical parameter/requirements management tool 27, in conjunction with the database server 34, is a product structure-driven requirements management tool that can capture hardware parameters/requirements associated with physical parts and assemblies as well as virtual integration objects. The critical parameter/requirements management tool 27 allows users to easily link hardware domain requirements to software requirements in the document-driven requirements management tool 42. This can be leveraged to alert users to changes across different domains on complex projects in real-time.

The critical parameter/requirements management tool 27 can also capture audit/conformance data and generate parameter maturity metrics.

The phased product delivery process tool 84 may provide platform and product maturity criteria, criteria for hardware sub-process phase gate reviews and management, an assessment of hardware criteria by subsystem, and links to metrics views and certain artifacts from the configuration management, requirements management, and problem management tools. Phase gate reviews are milestones established to review products prior to advancing to the next phase in the end-to-end product life cycle. The phased product delivery process tool 84 may link criteria to views in the critical parameter/requirements management tool 27 and to other artifacts in the configuration management tool 38.

As shown, the critical parameter/requirements management tool 27 is integrated with the configuration management tool 38, problem management tool 40, and phased product delivery process tool 84. Additionally, the configuration management tool 38 is integrated with the problem management tool 40 and phased product delivery process tool 84. Moreover, the problem management tool 40 is also integrated with the phased product delivery process tool 84. The critical parameter/requirements management tool 27 and associated database server 34 are integrated with the document-driven requirements management tool 42. The critical parameter/requirements management tool 27 and associated database server 34 are also integrated with the manufacturing/production control system tool 36 to link requirements with performance data from manufacturing. Requirements can also be linked to any uniform resource locator (url) through the web-based UI 45.

Critical Parameter/Requirements Management Tool Summary

In the admin and product structure feature groups 55, 48 of the main menu 46 of the UI 45, users/administrators can add projects and configurations and set flexible security and access rights to optimally align to value chain roles and responsibilities. Users/administrators may also use these feature groups to establish and manage full product structure definition and decomposition as objects from product family down to parts and assemblies. This includes the addition of a virtual integration object type to enable systems engineers/integrators to participate in the model and workflows. The admin and product structure feature groups 55,48 may also allow users/administrators to model real product configurations based on assignment of objects to configurations and parent/child relationships. These feature groups may also allow users/administrators to identify which objects in the product structure shall have an interface boundary. Users/administrators may also use these feature groups to set up system to auto-import product structure and configuration definition from another master source, such as a configuration management tool, a product data management tool, a mechanical computer aided design (MCAD) tool, an electronic computer aided design (ECAD) tool, or any tool or spreadsheet using structured hierarchical relationships for breakdown of parts within products.

In the add/edit/link feature group 50 of the main menu 46 of the UI 45, users can add, edit or view interface parameters/requirements or internally controlled parameters/requirements for any object in the product structure. Users may also use this feature group to apply the embedded parameter/requirement classification scheme that improves support for many best practices. The add/edit/link feature group 50 may also promote knowledge reuse by allowing users to "copy" from or "subscribe" to parameters/requirements from other projects. Users may also use this feature group to manage and view object requirements from multiple products/configurations. The add/edit/link feature group 50 may also be used to link multiple parameters/requirements together and to obtain views of requirements flow within an object or through an entire system. Requirements that are not associated with an element of the system (i.e., "orphans") may be highlighted to facilitate recognition by users for further actions. Users may also use this feature group to link parameters/requirements in critical parameter/requirements management to any source via url.

The add/edit/link feature group 50 may also be used to link parameters/requirements in critical parameter/requirements management to software requirements captured in a document-driven requirements management tool, such as IBM/Rational's RequisitePro. Users may also use this feature group to link parameters/requirements (e.g., critical parameters/critical specification (CP/CS)) to the parts and assemblies in a detailed bill of materials breakdown. The add/edit/link feature group 50 may also be used to view and manage concurrence to interface specification requirements in real-time, including auto-email notification if the specification requirement or concurrence status changes. Users may also use this feature group to capture expected failure modes by parameter/requirement. The add/edit/link feature group 50 may also be used to manage change and configuration control by creating parameter/requirement versions linked to an object and configuration.

In the manage maturity feature group 52, users and managers can view and manage parameter/requirement maturity via, for example, a six-level parameter maturity model that spans the full product life cycle. This feature group may also be used to establish criteria for each level and view specific criteria completion status by parameter. The manage maturity feature group 52 may also be used to enter plan and outlook dates and obtain snapshot and summary views of criteria and level completion as in-process measures of risk. This feature group may also be used to obtain summary views of parameter/requirement reuse levels by project and configuration.

In the manage conformance feature group 54, users and managers can tag specific parameters for audit from the overall set, identify location and responsible person for audit, and enter serial/identification numbers for objects. This feature group may also be used to track parameter/requirement measurement method availability and maturity. The manage conformance feature group 54 may also be used to conduct qualitative conformance risk assessments and obtain summary views. This is useful when actual audit data is not yet available. This feature group may also be used to create multiple audit data versions and associate them to a controlled parameter version. The manage conformance feature group 54 may also be used to capture parameter/requirement audit data for each serial number or summary statistics. This feature group may also be used to export parameter/requirement specifications into, for example, a Microsoft Excel template for remote audit data capture and auto upload the captured data into critical parameter/requirements management.

The manage conformance feature group 54 may also be used to download parameters/requirements from critical parameter/requirements management into, for example, the manufacturing/production control system tool (e.g., Xerox's Production System Audit Database) and upload results into critical parameter/requirements management from, for example, production test equipment. This feature group may also be used to obtain detailed and summary views of requirement conformance by unit (e.g., units passing or failing conformance tests associated with specific requirements). The mange conformance feature group 54 may also be used to obtain detailed and summary views of requirement conformance process capabilities (e.g., statistical conformance trends across multiple units), including new views of quality that normalize audit data across multiple or all requirements to create an aggregate quality "picture" for any object. This feature group may also be used to view and access problems that have been linked to objects and/or parameters from the problem management tool, such as IBM/Rational's ClearQuest.

Critical Parameter/Requirements Management Process Model, Critical Parameter/Requirements Management Tool Architecture, And Critical Parameter/Requirements Management Workflow Summary The critical parameter/requirements management process model 10, critical parameter/requirements management system 20, critical parameter/requirements management tool 27, and UI 45 integrates product structure and associated configuration management, requirements management, in-process maturity and associated risk management, and requirements conformance management into a workflow that can be implemented through a web-based tool. The UI 45 and workflow are designed for full functionality in a thin-client web application that does not require a client version for additional functionality.

The critical parameter/requirements management tool 27 and corresponding architecture includes optional interfaces to other product development tools, such as manufacturing/production control system tools 36, configuration management tools 38, problem management tools 40, document-driven requirements management tools 42, and phased product delivery process tools 84. The critical parameter/requirements management tool 27 and corresponding architecture also includes optional spreadsheet templates, filters, and reports for importing and exporting data between the critical parameter/requirements management tool 27, other product development tools, and other product development information. For example, the spreadsheet template, filters, and reports may be compatible with Microsoft Excel.

The critical parameter/requirements management workflow may improve productivity and provide ongoing cost advantages over other solutions that do not include the four elements of the critical parameter/requirements management process model 10 in an integrated fashion. The critical parameter/requirements management workflow may provide similar advantages over other solutions that have weak implementations for the web. The full functionality of the critical parameter/requirements management workflow over the web via the UI 45 may provide an advantage for ongoing support and maintenance costs relative to existing applications that require client versions for full functionality of web versions. Typically, such client versions of existing applications are highly de-featured due to UI design or other conceptual/technical limitations.

Applying the components of the critical parameter/requirements management process model 10 may result in faster product time to market, more effective and efficient reuse of product information, and lower ongoing maintenance costs. Use of the UI 45 may increase accessibility to information via the fully web-enabled solution. For individuals and teams, the critical parameter/requirements management process model 10 provides a workflow and UI enabling users to define, trace, control and manage requirements over the full product life cycle. The critical parameter/requirements management tool 27 has also integrated the ability to add actual quantitative conformance and performance data to parameters/requirements by configuration and provide users with detailed or summary views of conformance gaps to requirements. This may directly support the fact-based principles and views called for in design for six sigma and lean six sigma practices. For management, the critical parameter/requirements management tool 27 provides a set of real-time in-process and quality summary views that may allow much more proactive and fact-based risk management and effort prioritization to speed time to market and increase organizational capability and reuse of product knowledge.

Detailed Descriptions by Feature Group

Product Structure Feature Group Overview

The product structure feature group 48 may allow product development teams to manage hierarchical and object-oriented product structures by configuration per the basic decomposition scheme using the UI 45. Structures and object attributes may be built and managed directly via the product structure feature group 48 or imported and synchronized with another master source, such as a configuration management or product data management tool. The product structure feature group 48 may be used to establish an object-oriented and hierarchical product structure by configuration to assign clear responsibility for requirements at product interfaces and to enable object reuse in other configurations or products.

Product Structure Feature Group Summary

Figure 7:
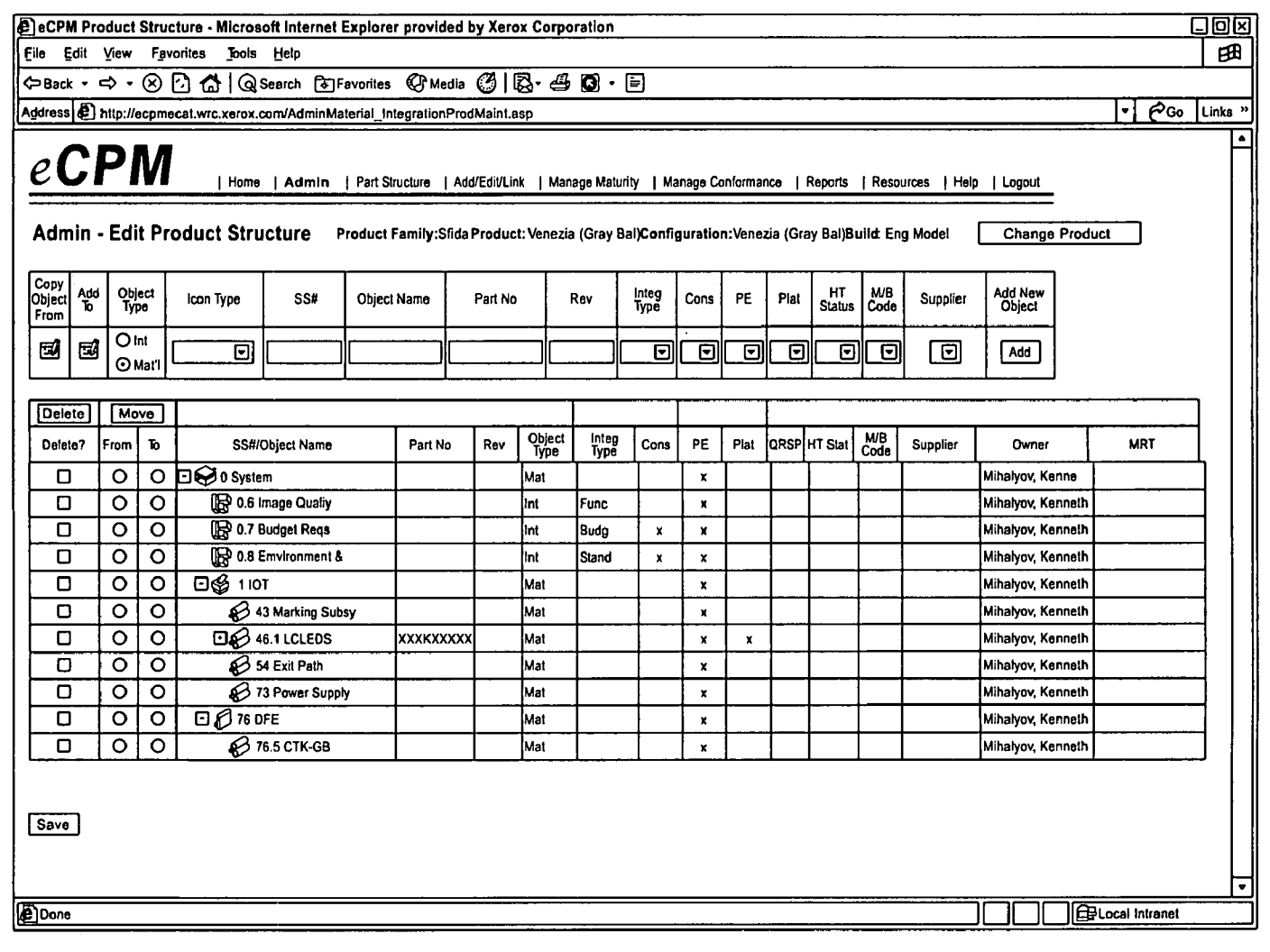
Figure 10:
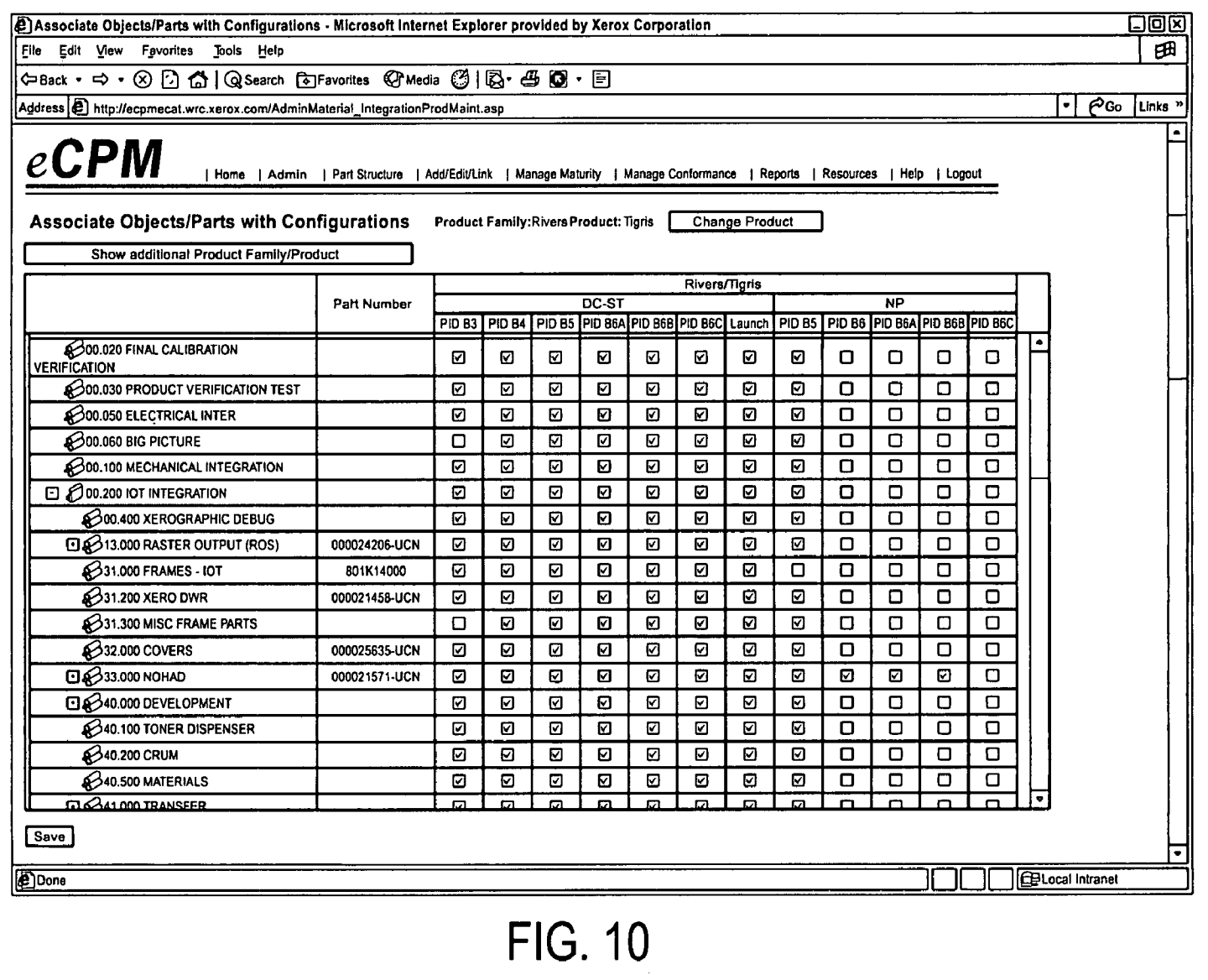

The product structure feature group 48 may provide the ability to build or import hierarchical object relationships for multiple products and configurations (see FIGS. 6-10). This feature group may also provide the ability to tag which objects in the hierarchy get a requirement interface boundary (FIG. 7). These tagged objects may be called partitioned elements. The product structure feature group 48 may also allow addition of an virtual integration object-type (and associated sub-types and rules) to enable collections of requirements to be managed as a virtual object, supporting clear ownership and participation of systems engineers or integrators in the requirements management process (see FIGS. 6-8). This feature group may also provide the ability to assign and manage object reuse across multiple products and configurations (see FIG. 10).

The product structure feature group 48 may provide a host of object attributes by object type that enables valuable views for users and managers during the entire development process (see FIG. 7). This feature group may also provide the ability to have a designated user manage the entire product structure while allowing object owners to manage detailed part decompositions (see FIGS. 7 and 9). This is consistent with the natural division of knowledge/labor in a typical product development program.

The entire product structure may be built and managed directly in the critical parameter/requirements management tool 27 using the product structure feature group 48. Alternatively, the product structure or portions thereof may be imported from a configuration management tool 38, such as EDS's Teamcenter Enterprise. The integration between the critical parameter/requirements management tool 27 and the configuration management tool 38 may permit the master product structures and object attributes to be managed by configuration (see FIGS. 7 and 9). The product structure classification scheme 12, associated rules, and flexibility in setting access rights to objects and parameters/requirements down to individual fields may allow optimal alignment to the desired team or value chain roles and responsibilities (see FIGS. 6-10). The workflow and UI for the critical parameter/ requirements management tool 27 may provide the ability to manage product structures via the web without the need for a client version.

The product structure classification scheme 12 may allow a high level of flexibility in aligning the product structure and requirements management process with roles and responsibilities of the entire team or value chain. This scheme may also enable implementation of many requirements management features and best practices. The product structure classification scheme 12 may provide the ability to manage object reuse across multiple configurations and products. This enables visualizing, improving, and managing reuse across products. This is particularly useful in competitive commercial product environments. This scheme may also enable integration of requirements management with other enterprise product development tools (see FIG. 5). The workflow and UI providing the product structure classification scheme 12 and product structure feature group 48 may be web-enabled. This provides an ongoing cost advantage over systems requiring a client version for the same or similar functionality.

Add/Edit/Link Feature Group Overview

Figure 12:
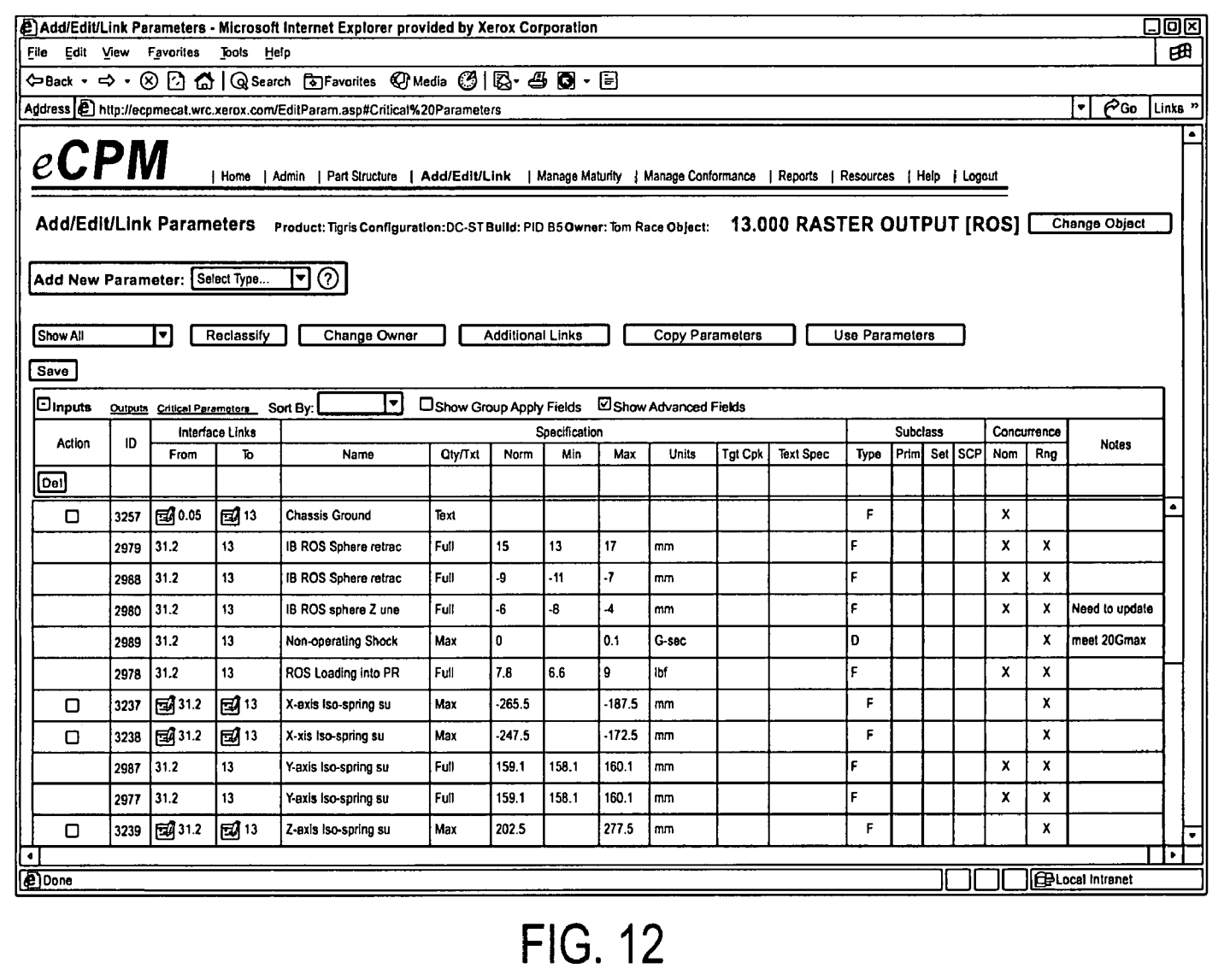
Figure 13:
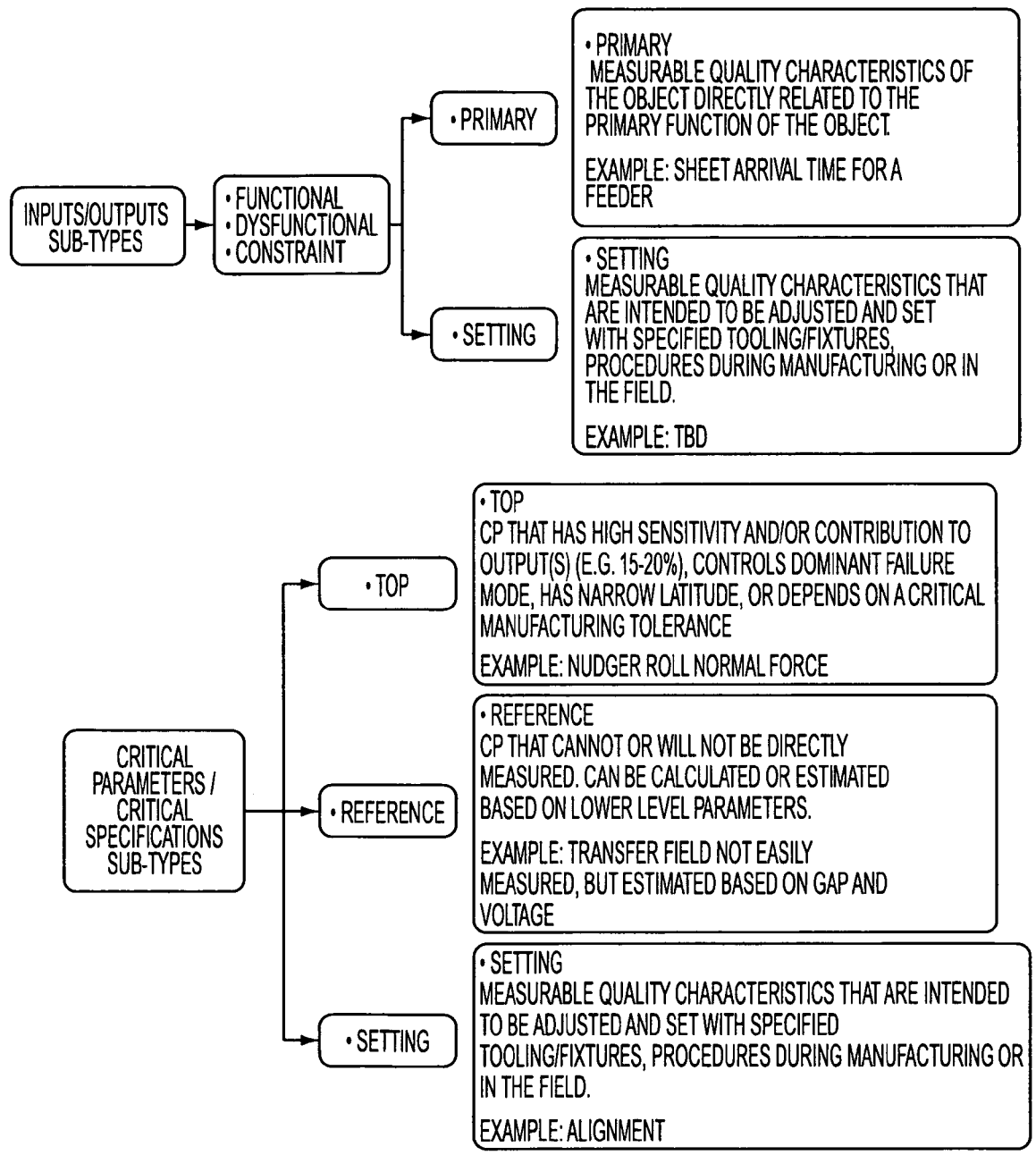
FIG. 13 is a hierarchical flow for an exemplary parameter/requirements classification, including input and output sub-types and critical parameter and critical specification classification sub-types.

With the product structure and relationships built or imported using the product structure feature group 48, the add/edit/link feature group 50 may allow product development teams to capture, organize and attach parameters/requirements to any object in the structure, and link parameters/ requirements using the parameter/requirements classification scheme 14 and behavioral rules (see FIGS. 11-13). By capturing, classifying and linking the parameters within and between objects in the structure using the parameter/requirements classification scheme 14 and rules, product development teams may proactively manage requirements and associated risks to conformance from both an object and system view over the entire product development cycle using the add/edit/link feature group 50.

Add/Edit/Link Feature Group Summary

The parameter/requirement classification scheme 12 and behavior rules may enable parameter traces and qualitative transfer functions, real-time interface definition and management, risk prioritization, and a host of other views or best practices. This classification scheme may also provide a web-enabled user interface and workflow to capture and link specifications to each other, parts/objects, and to external sources (e.g., url or another requirements management database), and keeps requirements under configuration control (see FIG. 3).

Figure 14:
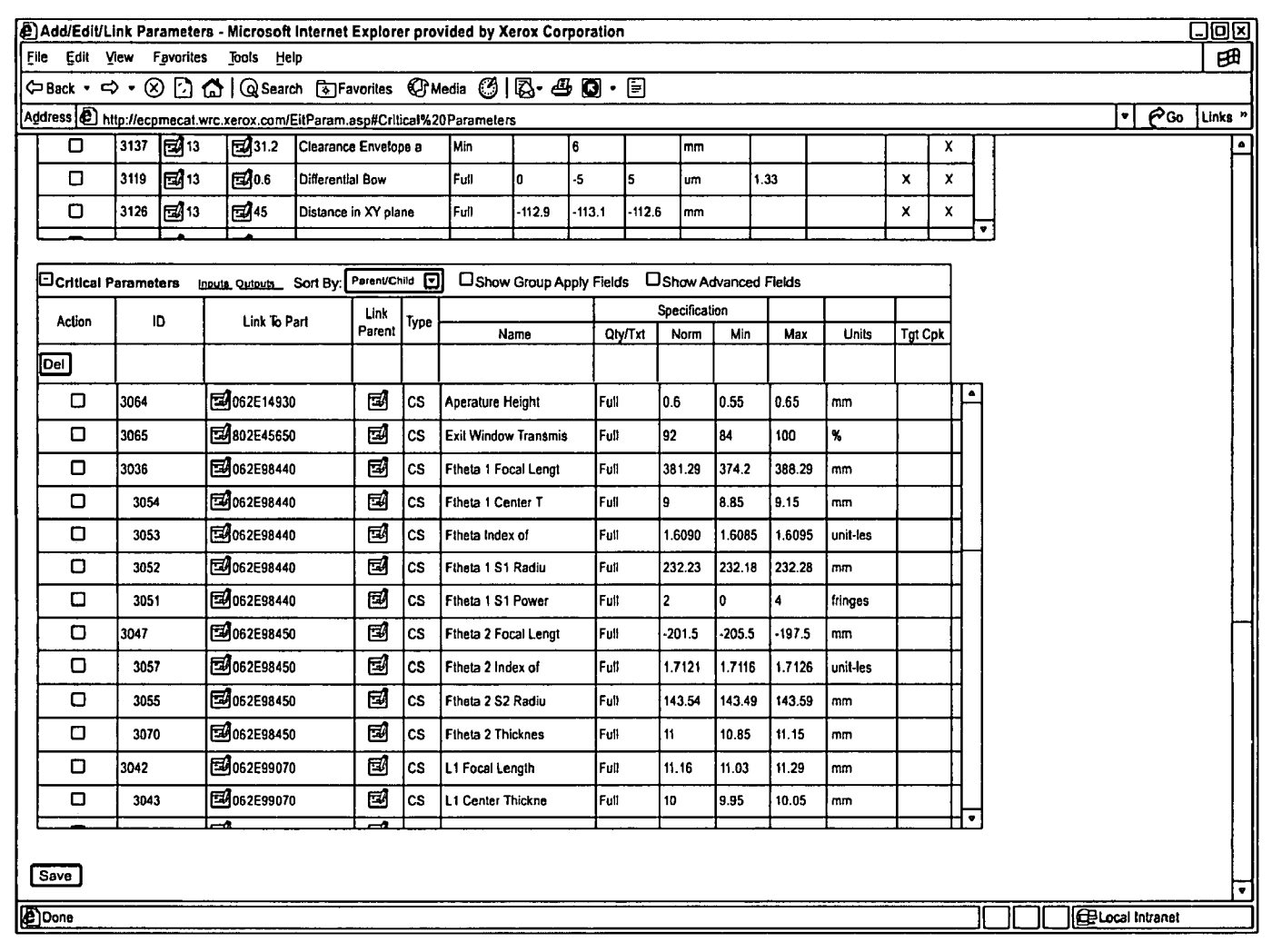

The add/edit/link feature group 50 may provide the ability to add, edit, or delete parameters to objects in a table view (versus a form view) once the objects are initially added (see FIGS. 12 and 14). This feature group may also provide the ability to copy from and "subscribe" to parameters from other objects/configurations. Subscribing keeps the requesting user from changing the specification parameters/requirements unless the originator of the parameter/requirement approves of the change or some other change control process is followed (see FIGS. 12 and 14).

Figure 20:
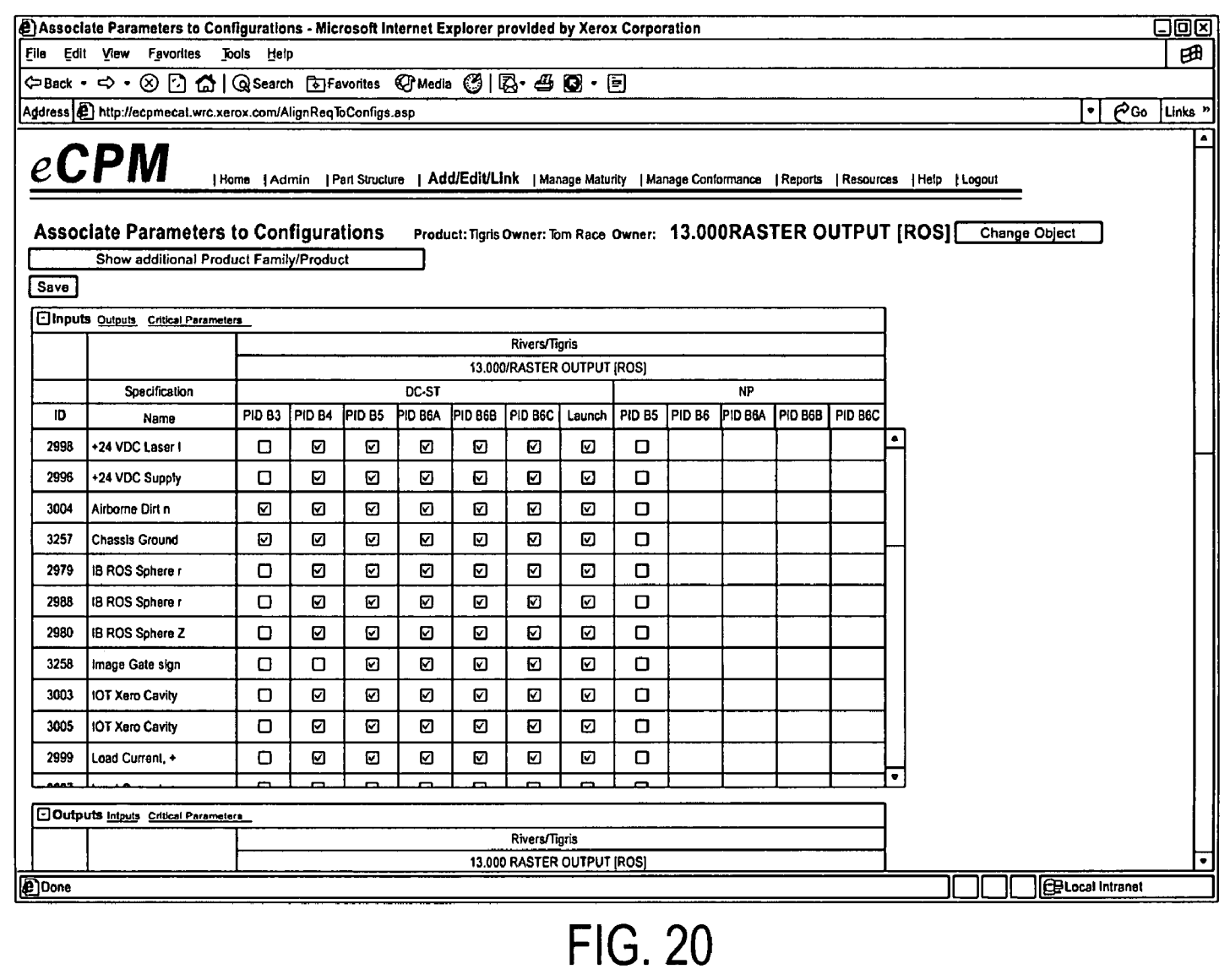

The add/edit/link feature group 50 may provide the ability to map and visualize requirements for an object that are derived from usage in multiple configurations or products (see FIG. 20). This feature group may also provide the ability to create and view un-editable sequential versions of parameters/requirements tied to a configuration/build by object. The add/edit/link feature group 50 may also provide the ability to report differences between parameter versions (see FIG. 21).

The add/edit/link feature group 50 may provide the ability to have systems requirements assigned to virtual integration objects where owners can allocate and manage requirements at subsystem interfaces or across modules in order to satisfy a system requirement. This feature group may also provide the ability to allow any user to create an input or output to their owned object and have the other party view and edit concurrence fields. A color-coded convergence field and associated reports may be used to make concurrence status and risks more visible (see FIG. 12). An auto-email notification service that, for example, goes into effect after first full concurrence may also be used.

The add/edit/link feature group 50 may provide the ability to link outputs to more than one object and may also provide the ability of an object to receive inputs from existing outputs to create multiple views of parameter flow using a single parameter record (see FIG. 12). This feature group may also provide the ability to filter I/O of parent/child objects such that if the child has I/O links that extend outside the parent boundary, they may not be reported on the parent I/O view. Moreover, if the child I/O does not extend outside the parent boundary, they may not be reported on the parent I/O view. This supports object-oriented views of requirements.

Figure 15:
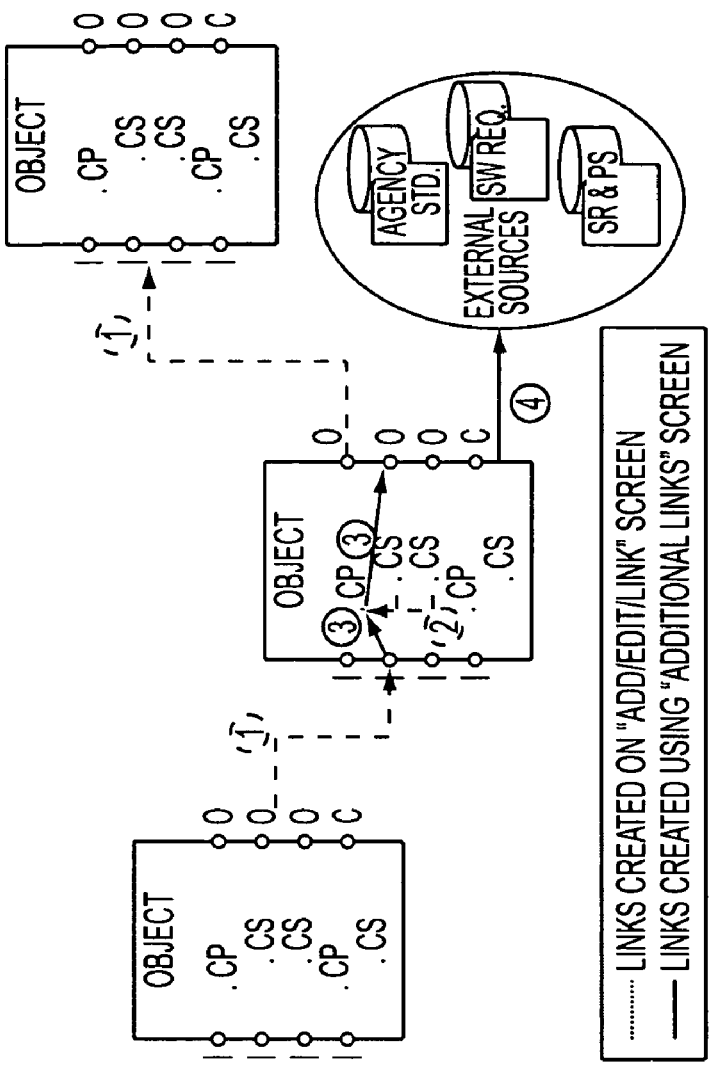
FIG. 15 is a diagram of exemplary parameter/requirements linking for material objects.
Figure 17:
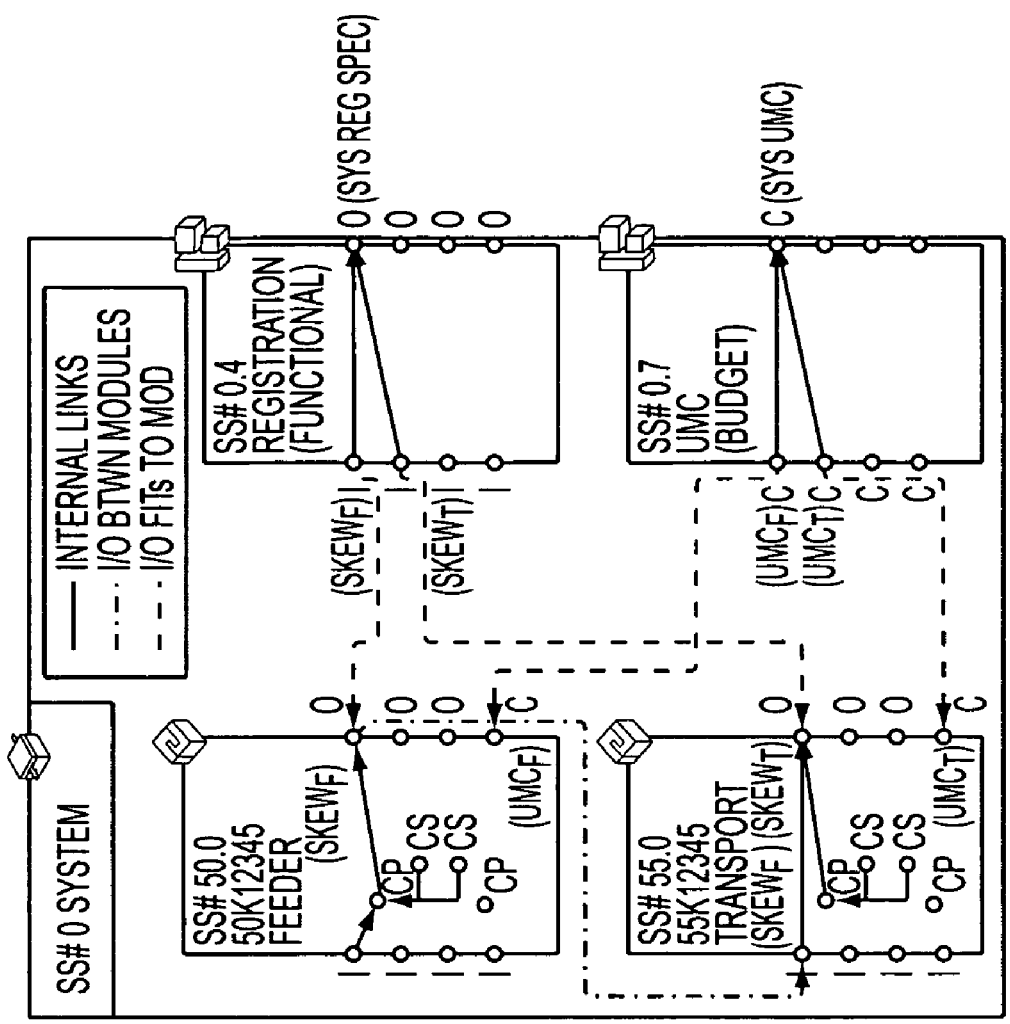
FIG. 17 is a diagram of exemplary parameter/requirements linking for virtual integration objects.
Figure 18:
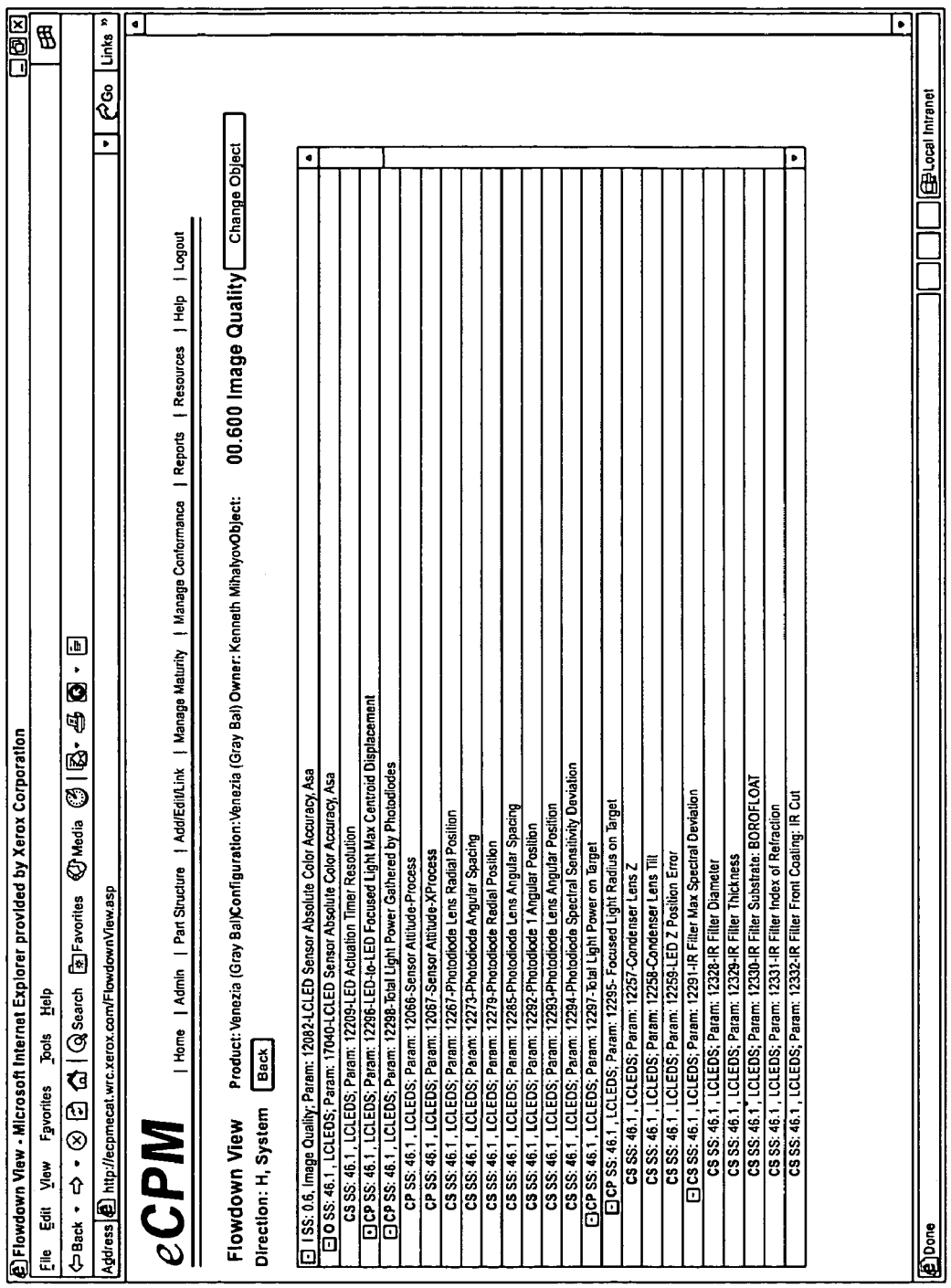
FIG. 18 is a flow-down view of exemplary requirements traces by parameter or object in an add/edit/link (parameters/requirements) feature group.

The add/edit/link feature group 50 may provide the ability to establish parent/child relationships between critical parameters (CPs) and critical specifications (CSs) and view resulting relationships in the table (see FIG. 14). This feature group may also provide the ability to generate a qualitative set of object transfer functions or flow-downs by connecting inputs to CP/CS and CP/CS to outputs and viewing these relationships all at once or a parameter at a time within the object or full system (see FIG. 18). The add/edit/link feature group 50 may also provide the ability to link parameters/requirements to parts/assemblies in a bill of materials or similar decomposition and create views of critical parameters by part number (see FIG. 15). This feature group may also provide the ability to link parameter/requirements to a url or other requirements in a document-driven requirements management tool 42, such as IBM/Rational's RequisitePro (see FIG. 16).

The add/edit/link feature group 50 may provide the ability to capture upper and lower expected failure modes (i.e., local and system failure modes) by parameter for a selected object.

The parameter/requirements classification scheme 14 and corresponding rules may support best practices for improved productivity and knowledge reuse, including six sigma principles. This classification scheme may also address interface definition and convergence management to enable reductions in time for phased product deliveries and lowering of risks. The add/edit/link feature group 50 may be implemented using a web application which lowers the ongoing costs of deploying this functionality and enables more of the value chain to benefit from visibility of the requirements by configuration.

Manage Maturity Feature Group Overview

The manage maturity feature group 52 may implement a six-level maturity model for parameters/requirements that effectively encodes key elements of the product development process that are associated with parameter/requirement understanding and demonstration through the product life cycle. Levels 1 through 3 of the maturity model may map to the activities and knowledge desired for latitude demonstration of the technology prior to investments in production designs. Levels 4 through 6 of the maturity model may map to the activities and data associated with the process capability of achieving the parameters in manufacturing/production. The manage maturity feature group 52 may also implement means to identify explicit criteria for each level, means to customize the desired maturity level by parameter and visualize the status of achievement via color coding, and means to enter plan, outlook and level achievement dates.

Manage Maturity Feature Group Summary

The parameter/requirements process and maturity model 16, critical parameter/requirements management workflow, and UI 45 may enable views of maturity by parameter as well as summary views of in-process measures. The manage maturity feature group 52 may provide the ability to select target maturity level uniquely for each parameter and have the available levels adjust accordingly (see FIG. 23). This feature group may also provide the ability to input plan and outlook dates for level achievement and automatically calculate actual dates for level achievement once criteria is satisfied. The manage maturity feature group 52 may also provide "temperature chart" visualization of status with color-coding to quickly see maturity status and gaps via the UI 45 (see FIG. 23).

The manage maturity feature group 52 may provide the ability to encode a level With desired process or task criteria and access the level pages directly from the UI 45. Level criteria may include: 1) data elements required by tools, 2) checkboxes signifying completion, and 3) links required to artifacts supporting completion. The manage maturity feature group 52 may also provide the ability to allow users to author tool-related criteria directly from the criteria page (see FIG. 25). This feature group may also provide an option to use a summary approval checkbox by the owner and/or subject matter expert associated with the parameter/requirement to grant level achievement (see FIG. 25).

Figure 23:
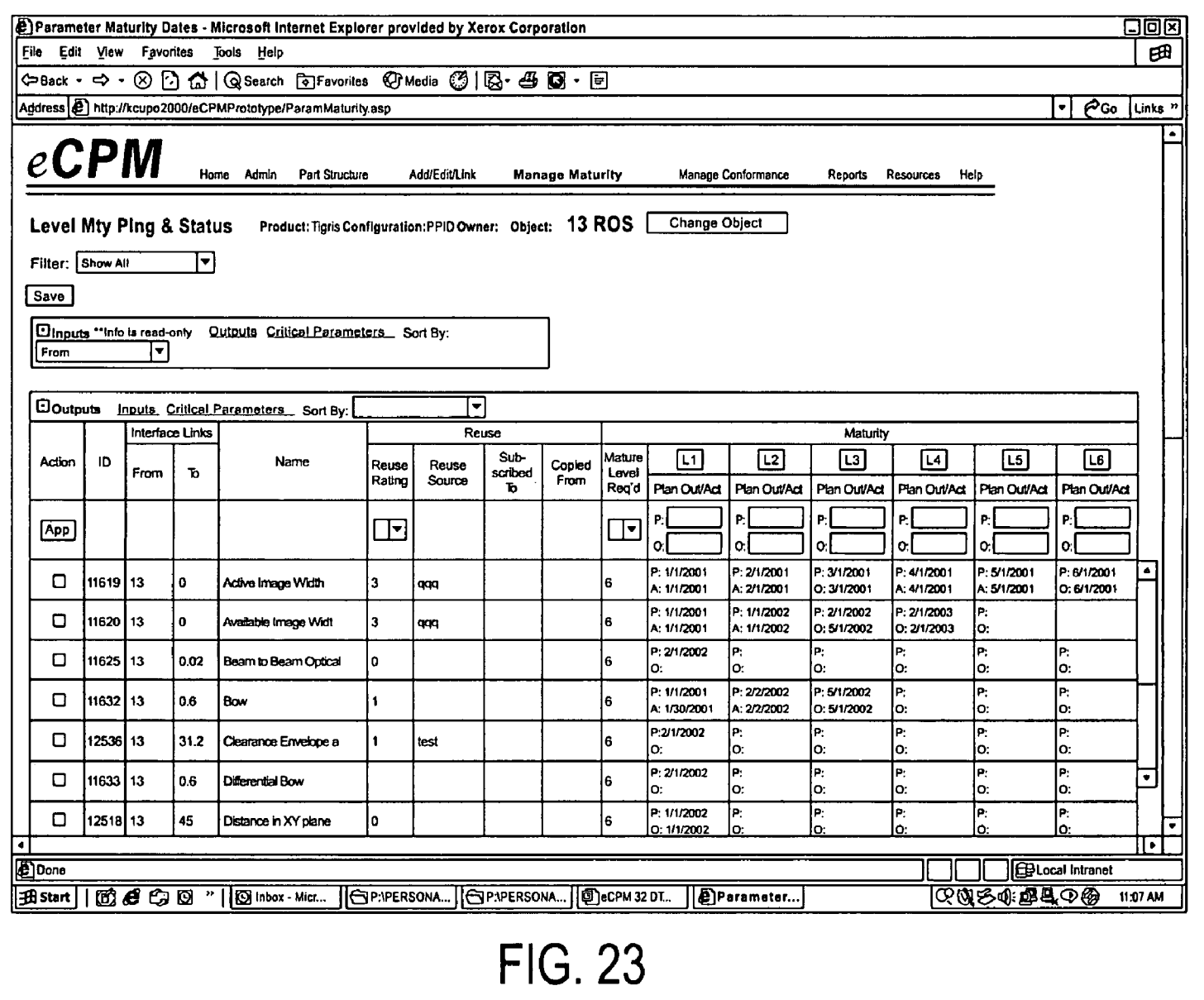
Figure 24:
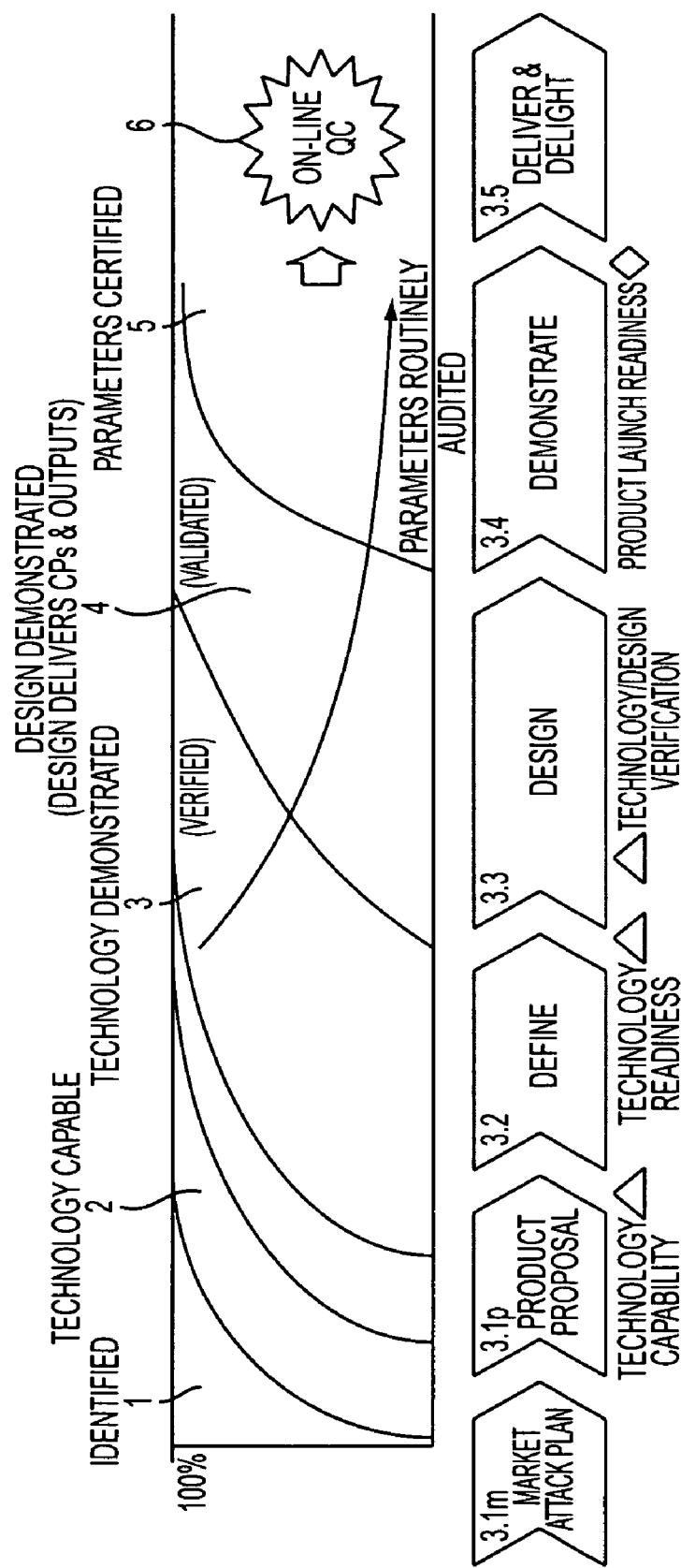
FIG. 24 is diagram of exemplary maturity level growth curves of in-process key quality indicators (KQI) and risk measures for an exemplary phased delivery process.
Figure 25:
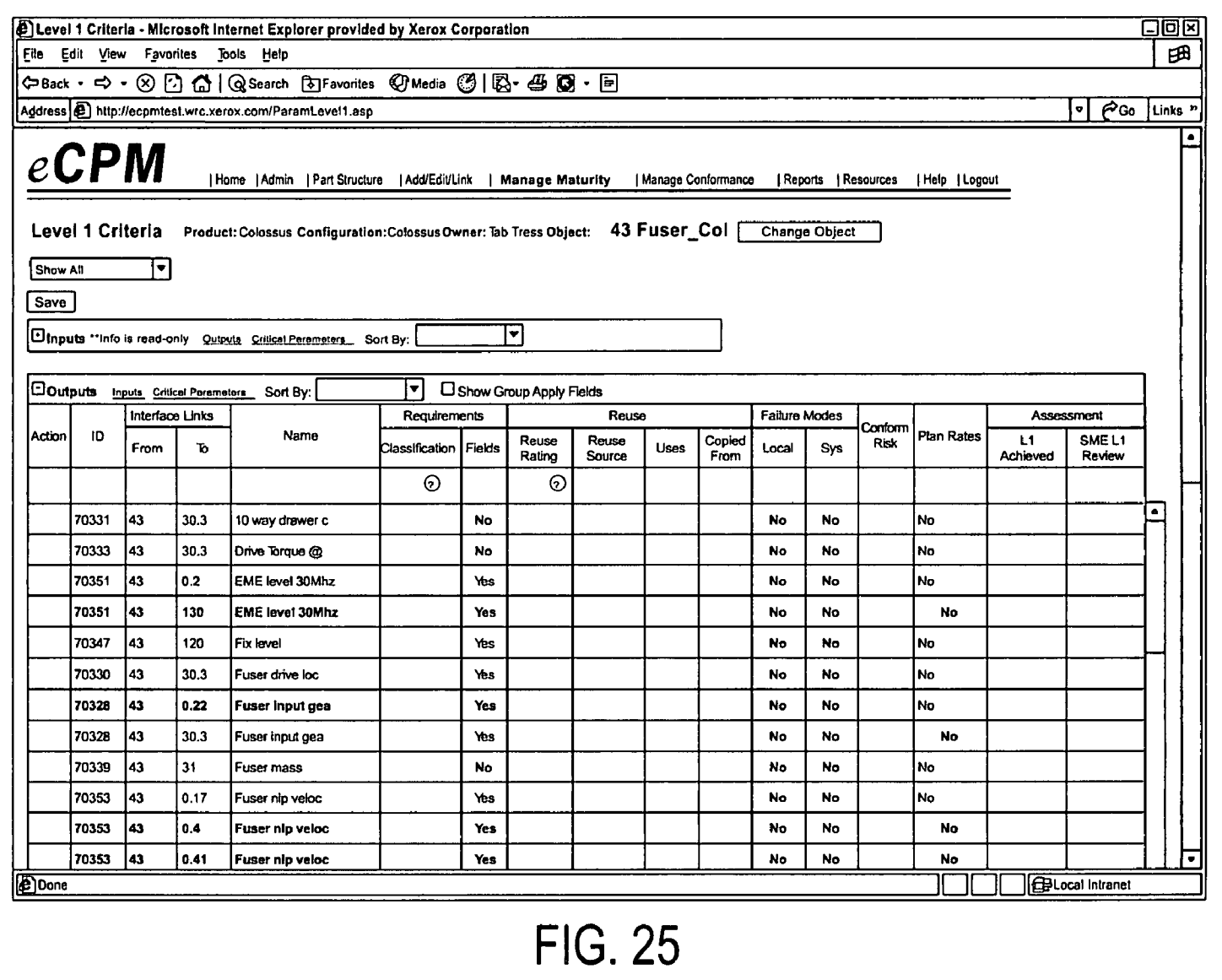
Figure 26:
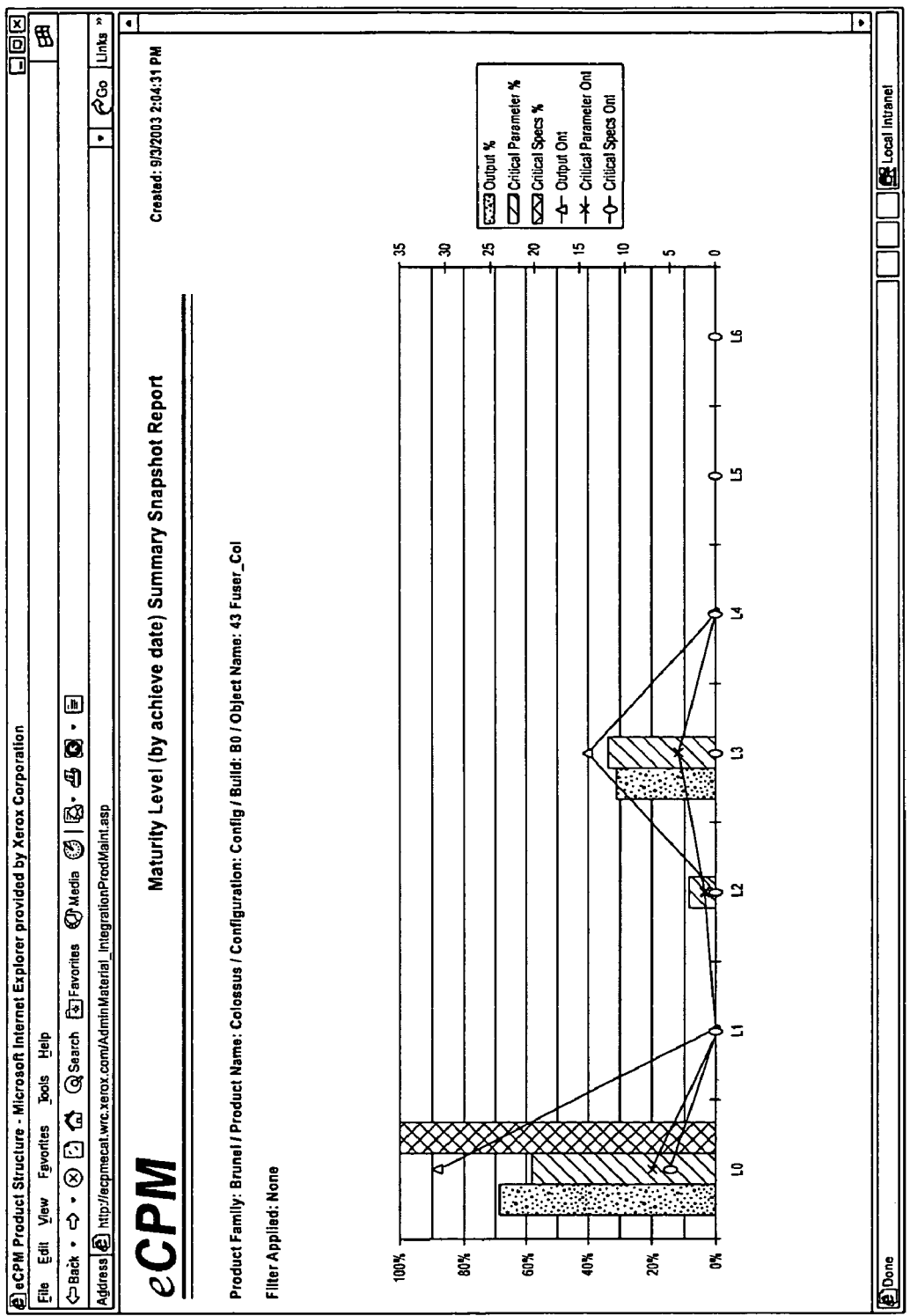
FIG. 26 is a view of an exemplary snapshot of level achievement using in-process measures in a manage maturity feature group.
Figure 27:
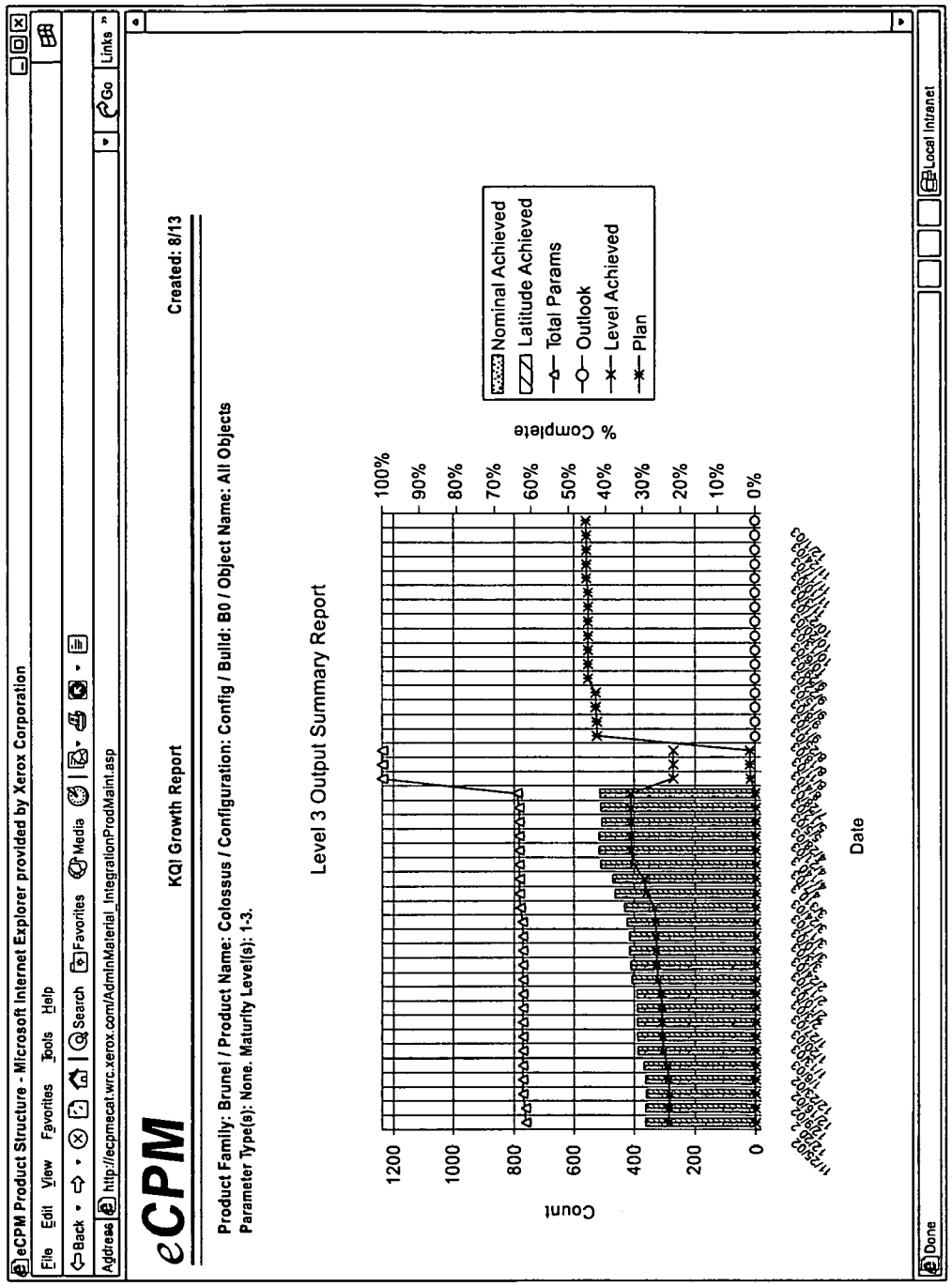
FIG. 27 is a view of exemplary level achievement growth using in-process measures in a manage maturity feature group.
Figure 37:
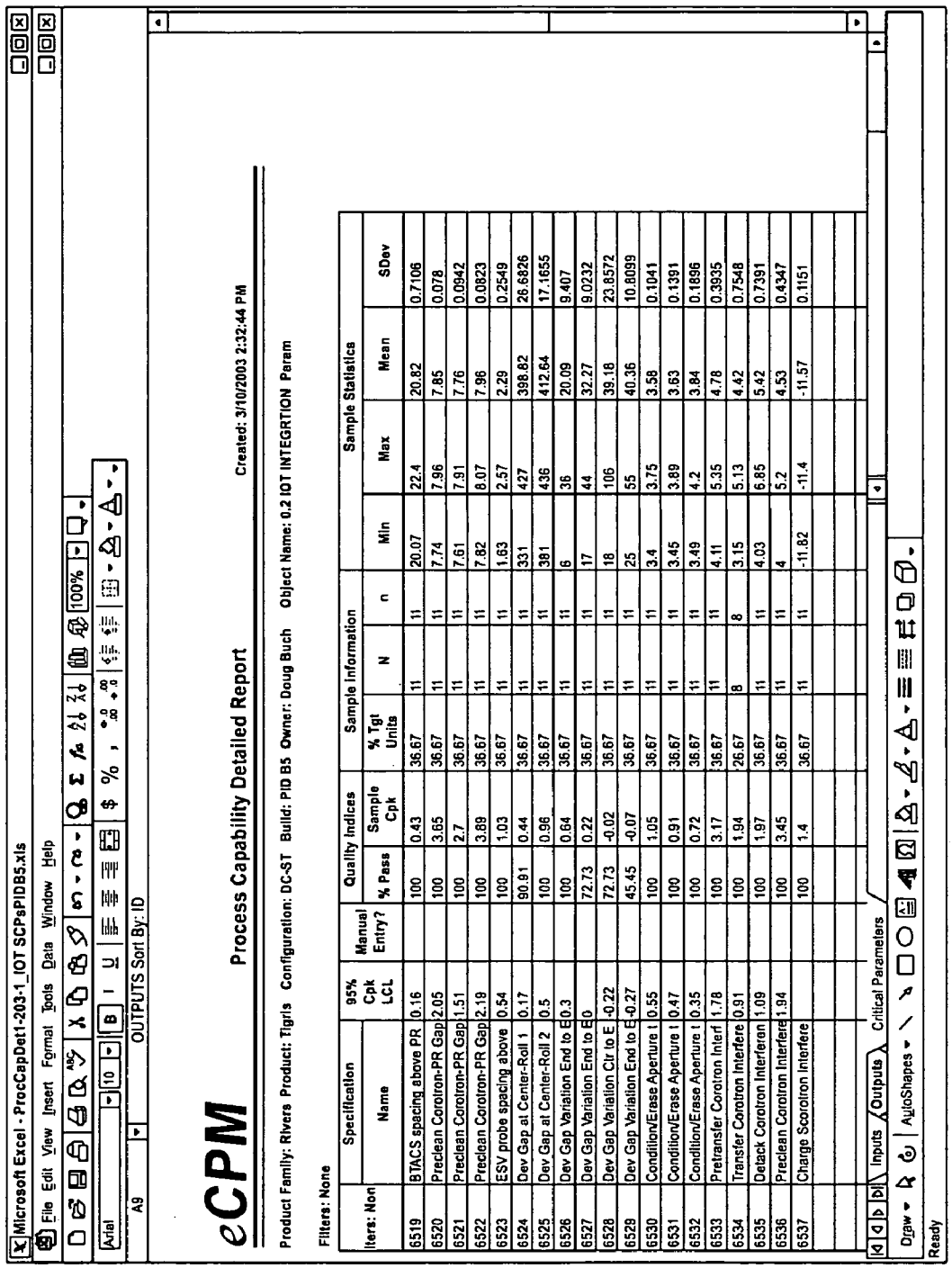
FIG. 37 is a view of an exemplary process capability detailed report showing requirements conformance across units in a manage conformance feature group.

The manage maturity feature group 52 may provide the ability to enter parameter/requirement reuse rating and source or automate reuse and obtain summary views of the quantity of reused parameters at each reuse rating as an indicator of risk and level of effort expected to mature (see FIGS. 23 and 25). This feature group may also provide the ability to obtain summary views of the quantity of reused parameters by type at each maturity level for one or more selected objects (see FIG. 26). The manage maturity feature group 52 may also provide the ability to obtain summary views of the quantity of reused parameters by type at each maturity level over time for one or more selected objects as a key in-process metric (see FIGS. 24 and 27). This feature group may also provide the ability to view all levels or one level with sub-criteria growth.

The manage maturity feature group 52 may provide an automated set of in-process risk measures to a product delivery team and may allow teams to more rigorously deploy the desired work process and improve productivity. This feature group may also allow users to set the target maturity level and status by parameter and visualize the status via color coding. This may provide a more accurate view of in-process risk and allows users to quickly see candidate areas for prioritizing effort.

Manage Conformance Feature Group Overview

The manage conformance feature group 54 may allow project teams to focus effort and prioritize risks by obtaining views of performance against the requirements for objects and systems. This feature group may also allow users to assess conformance status qualitatively, quantitatively and by linking problems observed during development to the parameters/requirements to which they are related. Assessing conformance risks qualitatively (e.g., using red, yellow, and green (RYG) color codes and/or high, medium, low (HML) impact rating to categorize risks) provides a quick and effective means of prioritizing risks early on in the development process before actual data may be available. As performance data becomes available, the manage conformance feature group 54 may also allow users to enter and track actual performance data by serial number and configuration for objects and obtain a host of valuable graphical and statistical summary reports to prioritize risk and demonstrate conformance maturity. The critical parameter/requirements management tool 27 has an integration with a problem management tool 40, such IBM/Rational's ClearQuest, whereby teams managing problems in the problem management tool 40 may be able to link problems to the parameters that control them or to the requirements that are not being met. The manage conformance feature group 54 may allow users to obtain a view of problems linked to objects or parameters/requirements as another view of conformance maturity.

Manage Conformance Feature Group Summary

The manage conformance feature group 54 provides the overall workflow, UI, and set of views to efficiently plan for audit (including measurement method maturity), qualitatively and quantitatively manage and prioritize conformance risk, and integrate problem management with the requirements conformance management process. The features and views directly support the improving management-by-fact called for in six sigma initiatives.

Figure 28:
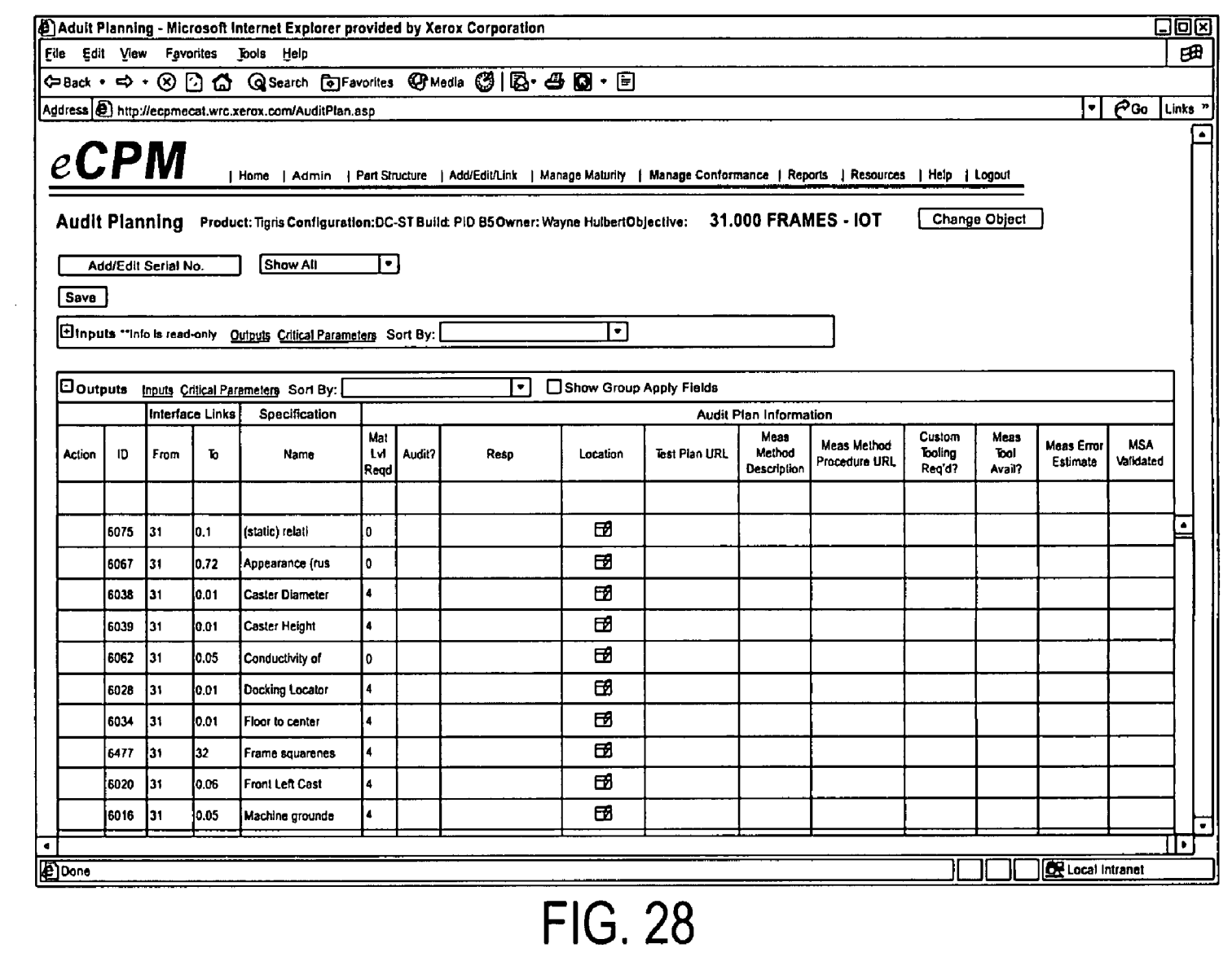

The manage conformance feature group 54 may provide the ability to capture and edit serial numbers/IDs for an object by configuration to enable unit conformance views (see FIG. 29). When the critical parameter/requirements management tool 27 is integrated with a manufacturing/production control system tool 36, such as Xerox's Production System Audit Database, the manage conformance feature group 54 may import object serial numbers automatically. This feature group may also provide the ability to tag object parameters/requirements for audit by configuration and view all parameters/requirements or only tagged parameters/requirements for audit (see FIG. 28). The manage conformance feature group may provide the ability to identify a responsible user for audit by parameter and automate access rights to input audit data. This feature group may also provide the ability to identify one or more locations for audit source (see FIG. 28). The manage conformance feature group 54 may also provide the ability to track measurement method and test equipment availability and maturity including measurement system analysis (see FIG. 28).

Figure 30:
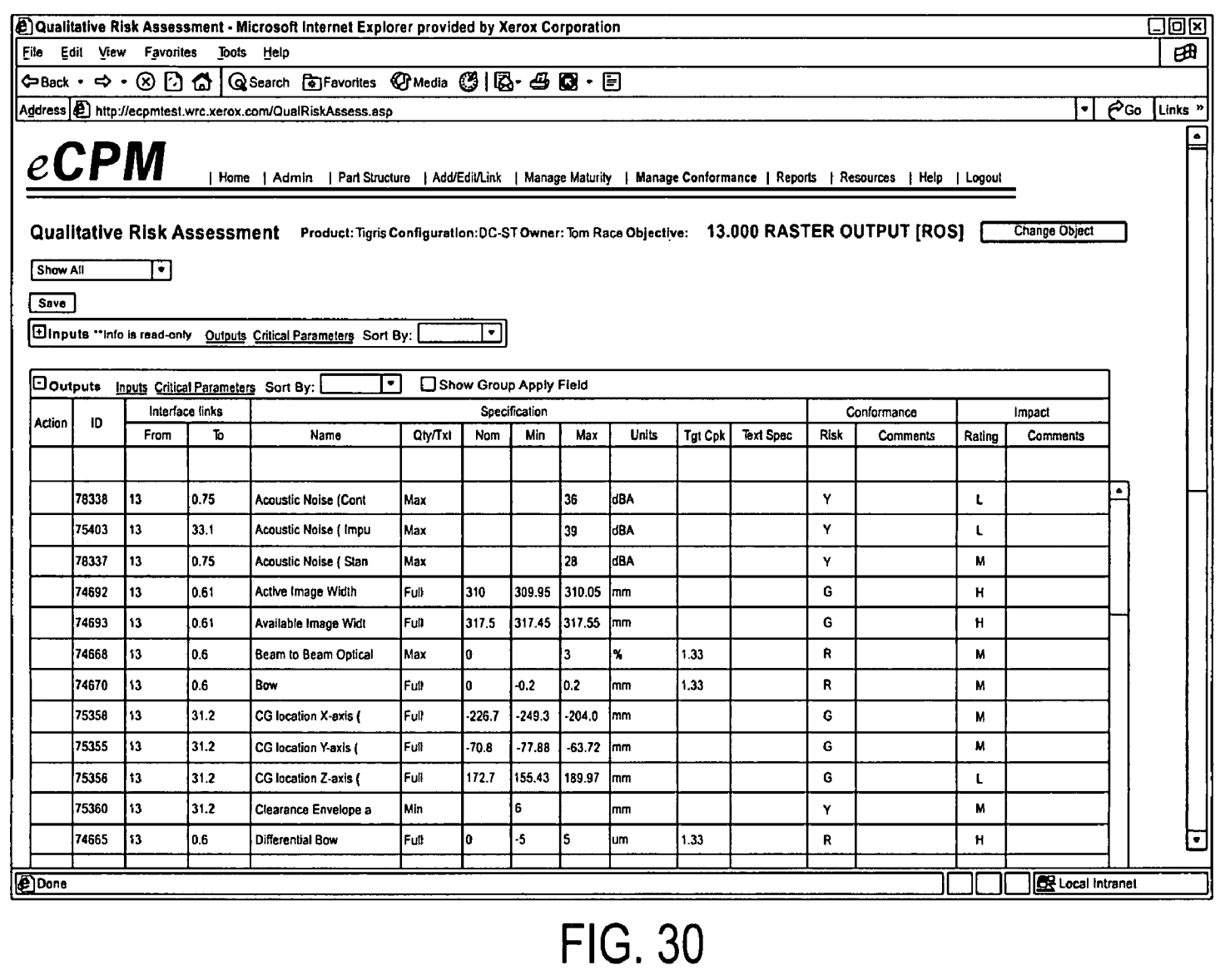

The manage conformance feature group 54 may also provide the ability to qualitatively assess conformance risk and impact through views that use color coding and through summary reports specified or arranged by object (see FIG. 30). This is useful for prioritizing risk and effort before actual audit data is available.

Figure 33:
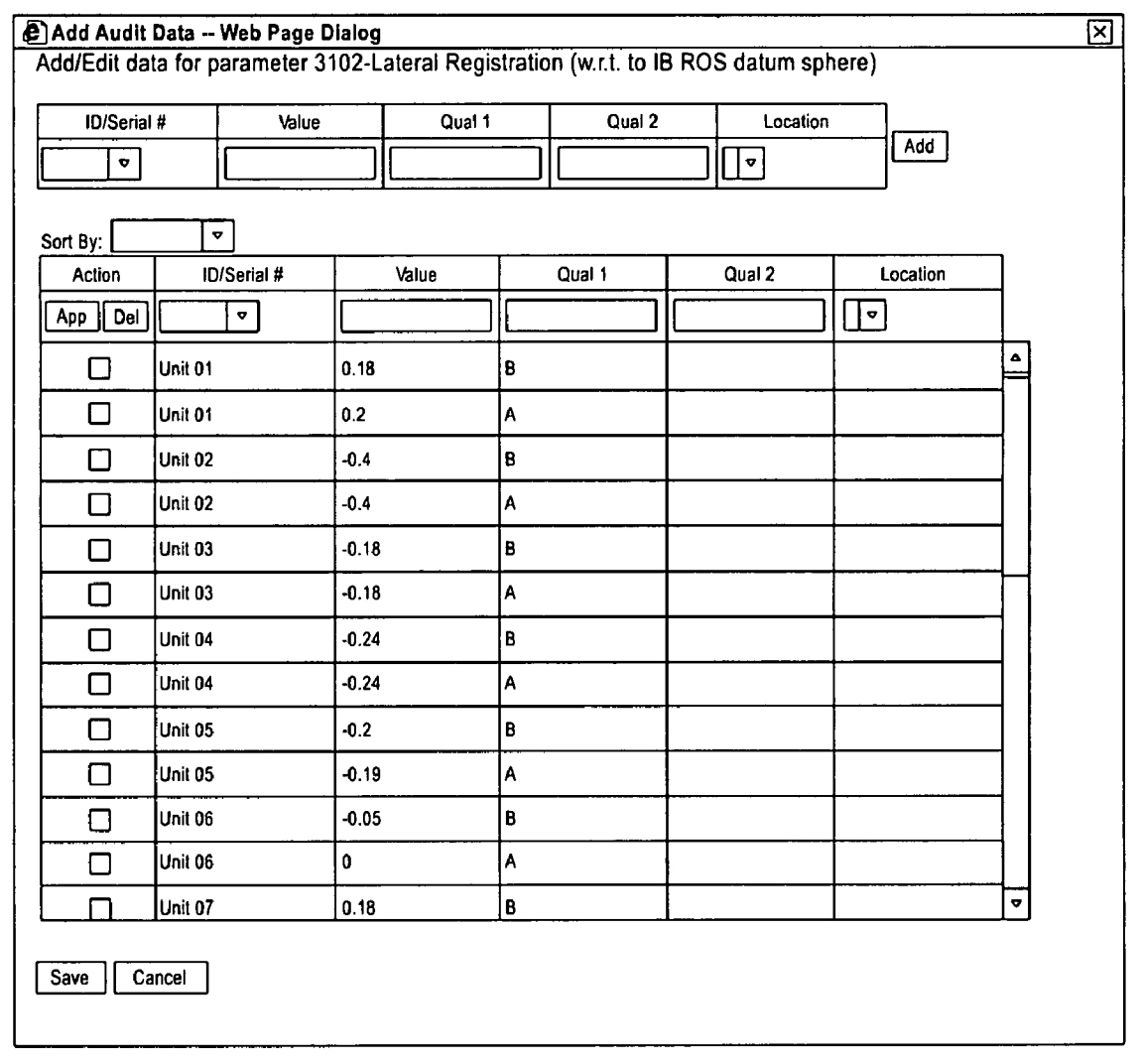
Figure 34:
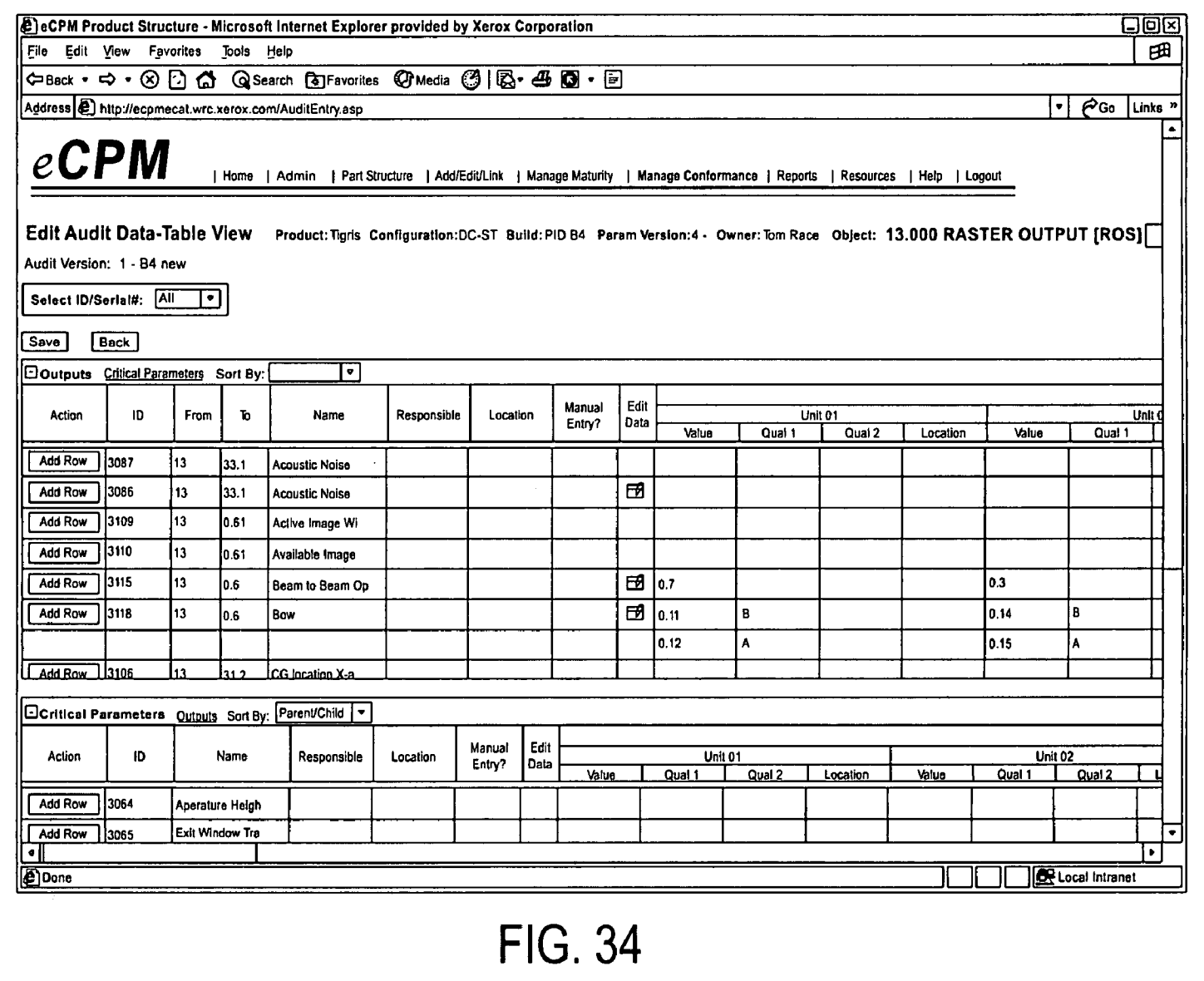

The manage conformance feature group 54 may also provide the ability to create multiple audit data versions associated with a single parameter version and add data to the same audit version over time (see FIG. 31). This feature group may also provide the ability to capture raw audit data for each serial number/unit by parameter or just enter summary statistics. The manage conformance feature group 54 may also allow audit data to be entered for one parameter at a time or for multiple parameters at a time. This feature group may also allow a url link to be inserted as a pointer to data. The manage conformance feature group 54 may also provide for pass/fail or quantitative data capture types (see FIGS. 32-34).

Figure 35:
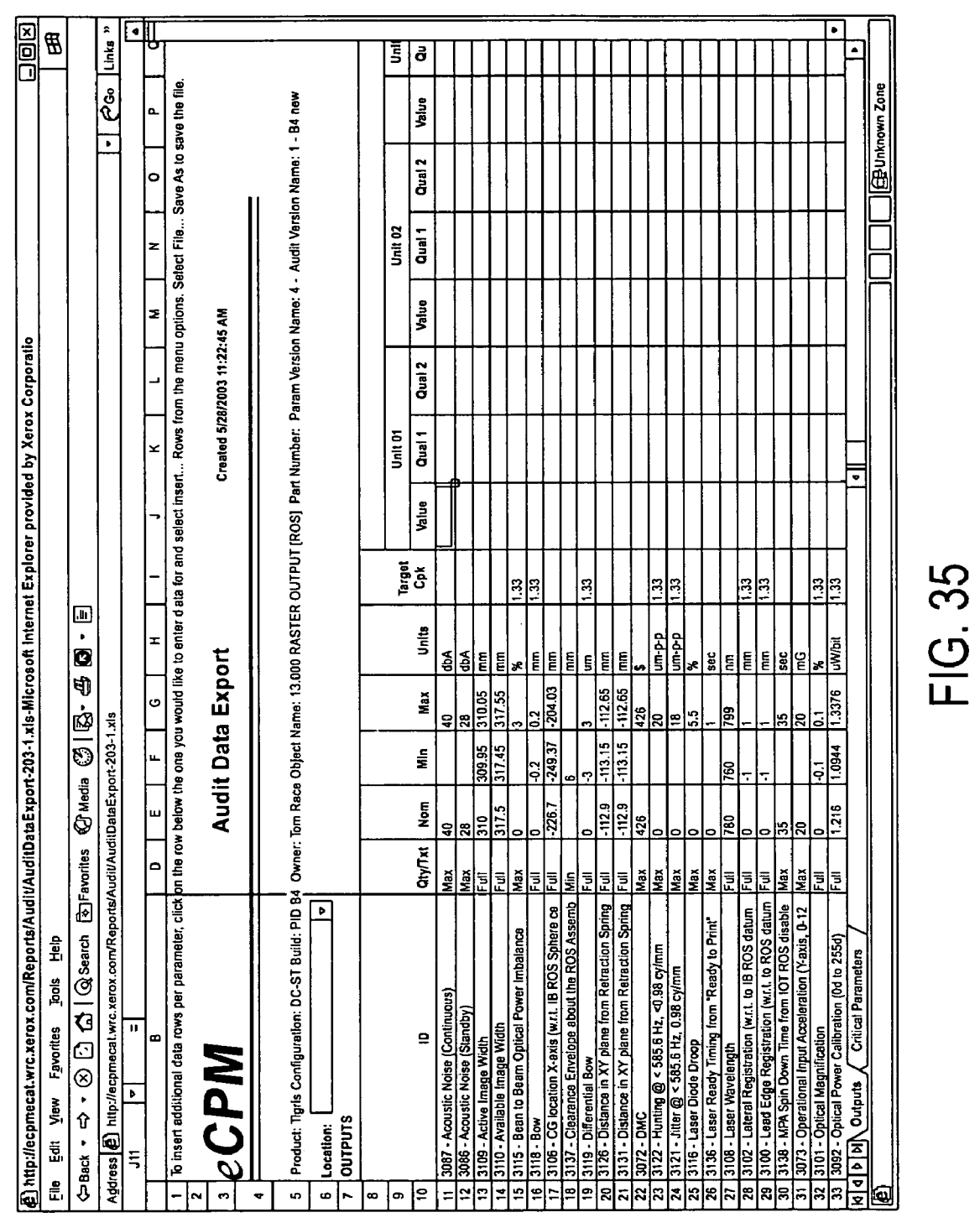

The manage conformance feature group 54 may also provide the ability to filter on requirements and generate a spreadsheet template file where users can add audit data by requirement or by serial number without using the critical parameter/requirements management tool 27. The spreadsheet template file may be compatible, for example, with Microsoft Excel. This feature group may also provide the ability to import data from the spreadsheet template file into the critical parameter/requirements management-tool 27 (see FIG. 35). The manage conformance feature group 54 may also provide the ability to interface with a manufacturing/production control system tool 36, such as Xerox's Production System Audit Database, whereby specifications are downloaded from the critical parameter/requirements management tool 27 by configuration and audit data from test equipment is uploaded into the critical parameter/requirements management tool 27 by configuration and unit/serial number. The user may be automatically presented with the data available by selected object and correct configuration for viewing prior to upload. Serial numbers may be imported automatically when the critical parameter/requirements management tool 27 is integrated with the manufacturing/production control system tool 36 since the serial number are generated in manufacturing during production (see FIG. 40).

Figure 36:
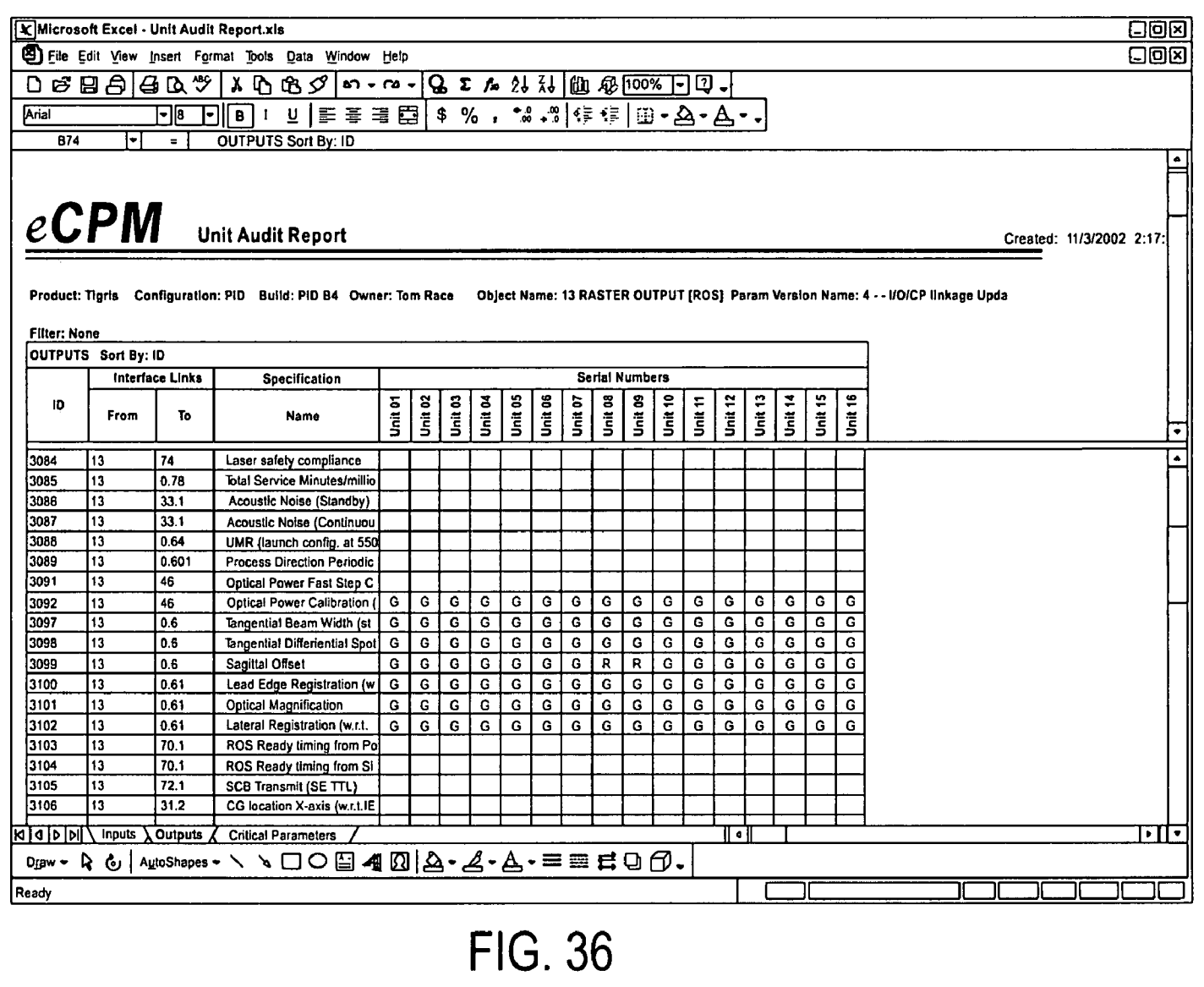
Figure 38:
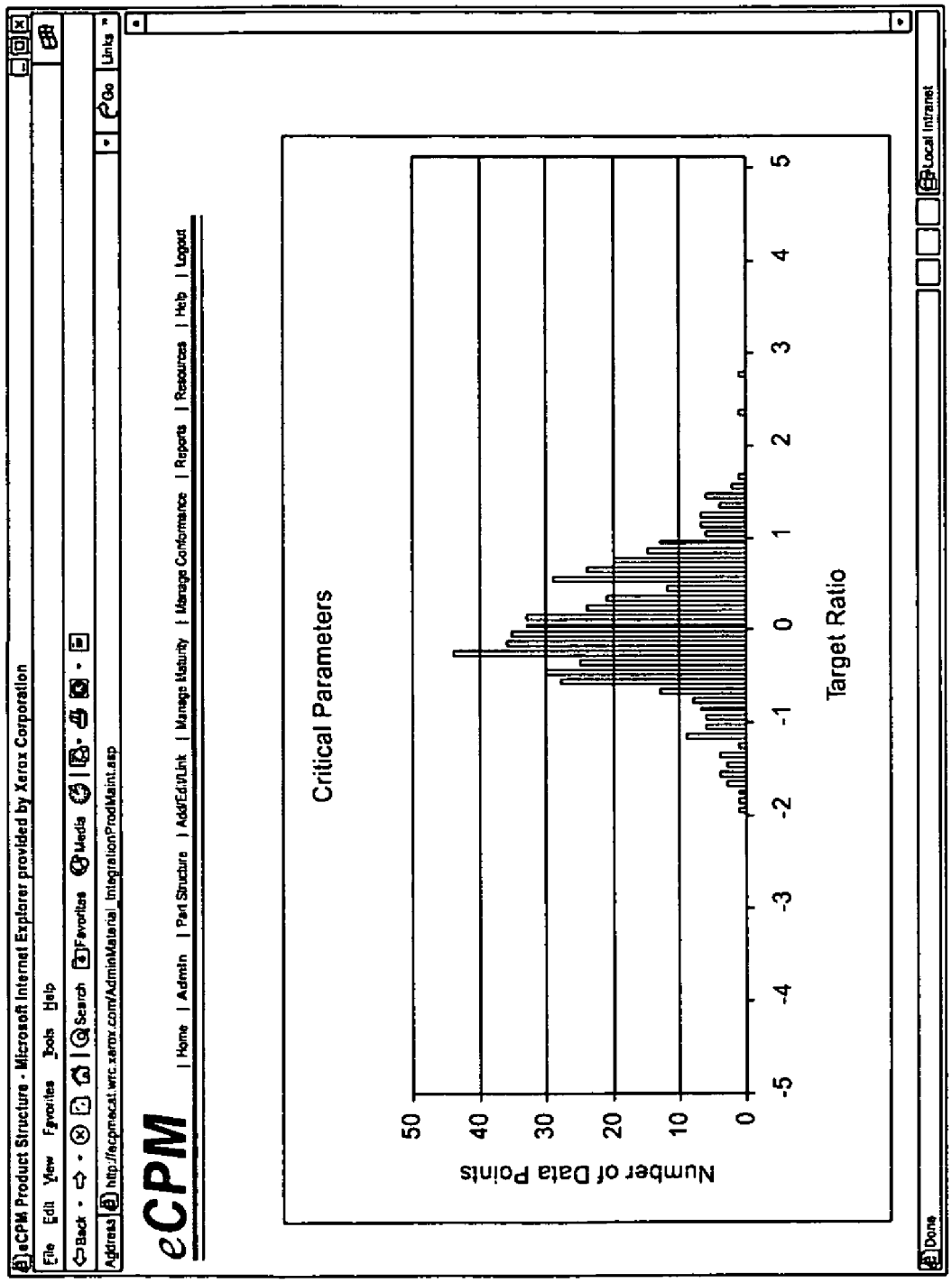
FIG. 38 is a view of an exemplary target ratio chart showing quality across multiple parameters for one or more objects in a manage conformance feature group.
Figure 39:
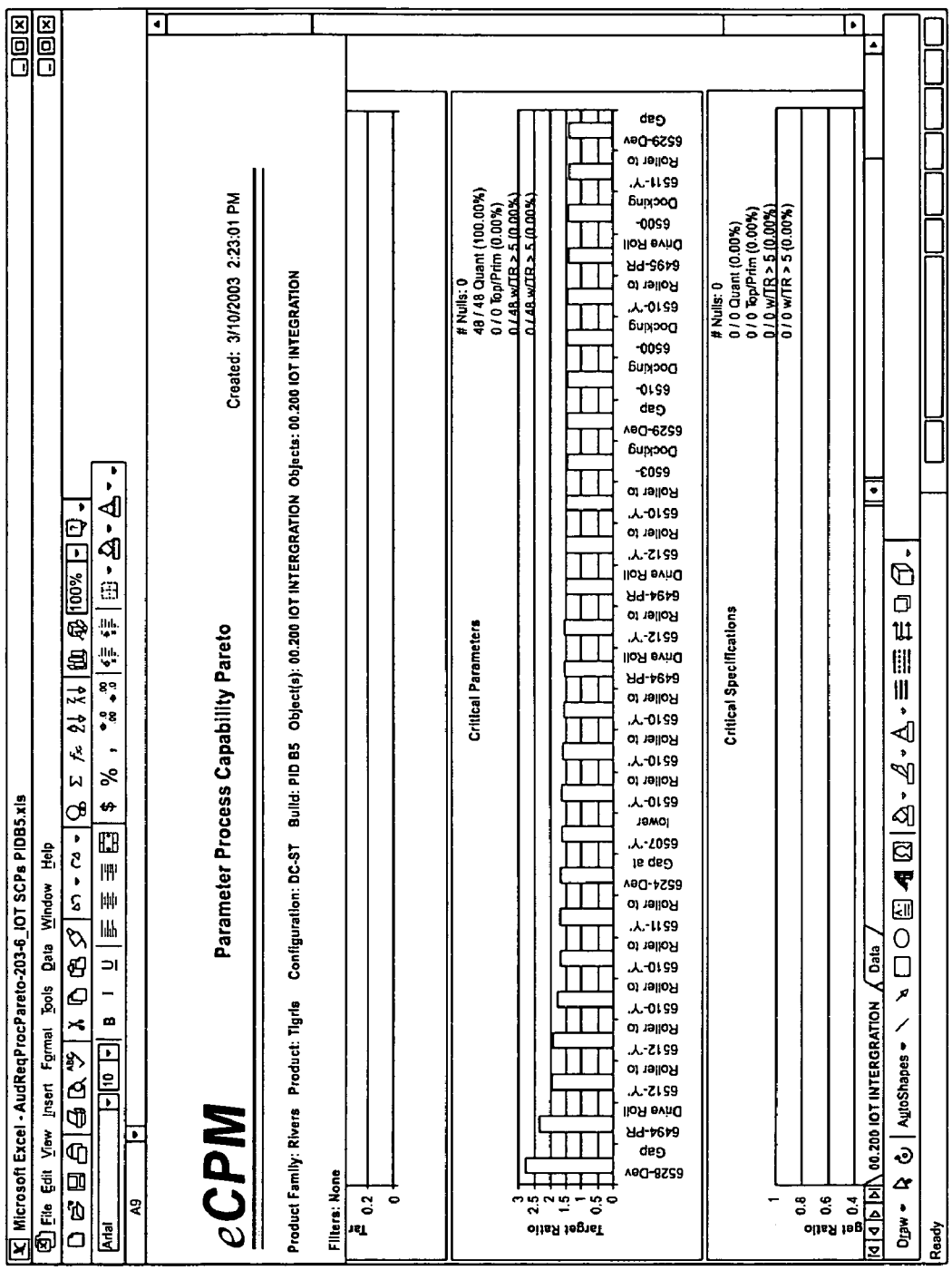
FIG. 39 is a view of an exemplary parameter process capability Pareto chart showing risk prioritization by quality index in a manage conformance feature group.

The manage conformance feature group 54 may also provide the ability to provide visual/color coded summary views of process capability/quantitative conformance by parameter and/or by configuration including sample statistics, sample information, multiple quality indices, and the 95% lower confidence limit on Cpk adjusted for the sample size (see FIG. 32). This feature group may also provide the ability to provide automated Pareto charts by any one of the quality indices available (e.g., pass percentage, Cpk, target ratio, etc.) (see FIG. 39). The manage conformance feature group 54 may also provide automated views of requirements conformance by unit/serial number for an object (e.g., units pass or fail status for corresponding requirements) which can be the basis for automatically initiating a "non-conforming material" or "change request" process (see FIG. 36). This feature group may also provide the ability to provide other summary views of conformance by object or objects. The manage conformance feature group 54 may also provide the ability to provide automated graphical views of quality over multiple parameters via the target ratio concept for one or more objects (see FIG. 38).

Figure 41:
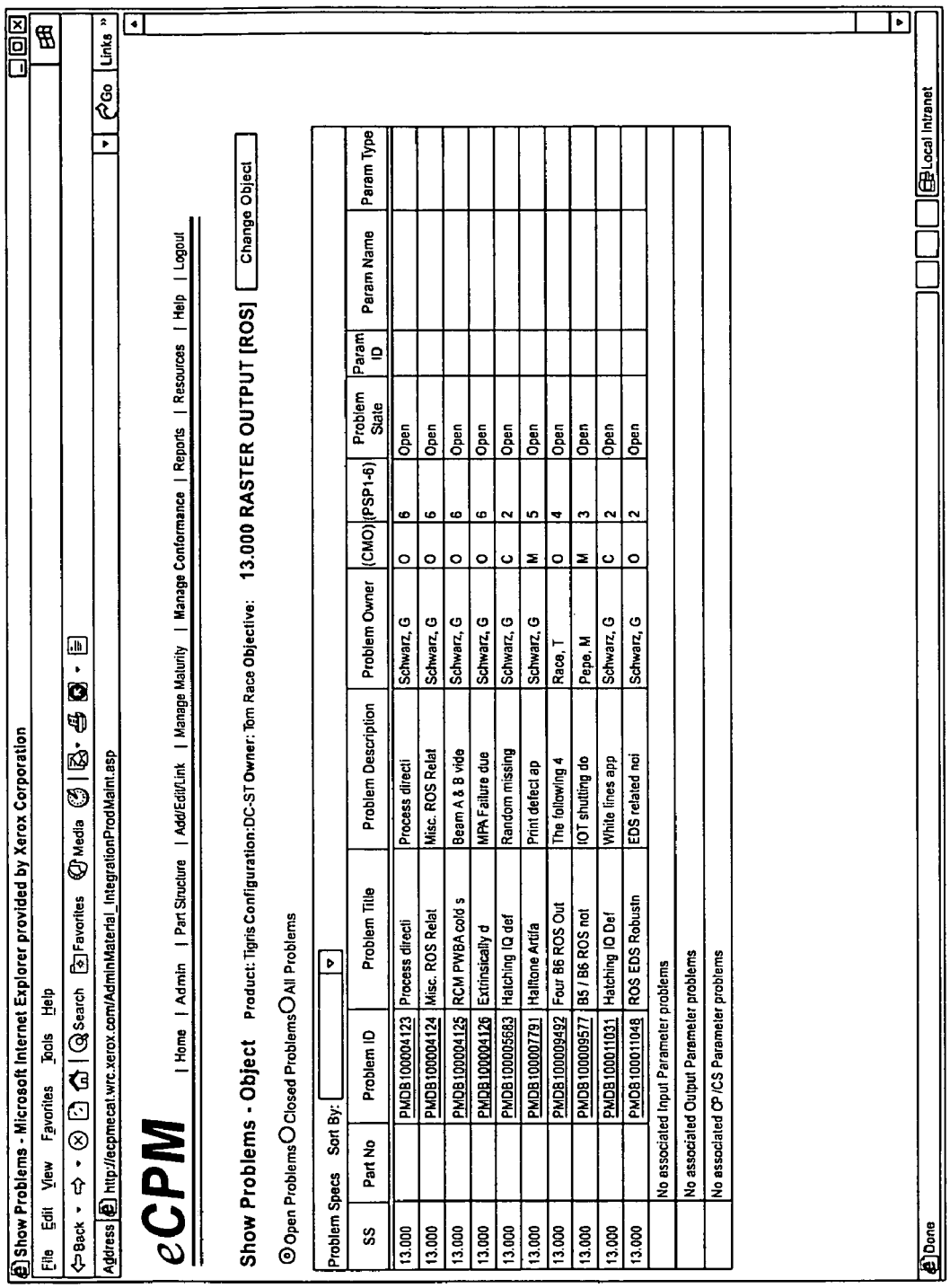
FIG. 41 is a view an exemplary show problems screen with problem data imported into the critical parameter/requirements management tool from a problem management tool and linked to objects or parameters as part of a conformance management process in a manage conformance feature group.

The manage conformance feature group 54 may also provide a real-time interface with a problem management tool, such as IBM/Rational's ClearQuest, whereby users can assign problems to objects and parameters/requirements in the critical parameter/requirements management tool 27. The critical parameter/requirements management users may then be able to obtain automated views of problems linked to objects and/or parameters and may be able to access the problem records in the problem management tool as part of the managing conformance workflow (see FIG. 41).

The manage conformance feature group 54 parallels the value proposition of the "design for six sigma"-like focus on statistical, graphical and fact-based risk management in order to concentrate effort on high-risk areas for conformance to specifications and make better decisions during the entire product development process. This translates into a more efficient product development capability and ultimately into faster phased product deliveries and higher quality products. This allows teams to "see" and manage end-to-end maturity of requirements from conception to production.

In addition to improved predictive engineering capability on complex products, structuring the performance or audit data under configuration control by object has significant benefits for an organization's ability to reuse objects and knowledge at a much higher level than is typical today. This also ultimately results in faster phased product deliveries for products and an organizational capability that can be a substantial long-term competitive advantage.

Moreover, the manage conformance feature group 54 is simple, flexible (with its multiple methods for exporting/importing raw or summary audit data or interfaces to data sources external to the critical parameter/requirements management tool 27), and fully functional via a web front end (i.e., UI 45). This translates into low implementation and deployment costs (e.g., low training costs due to ease-of-use, low software maintenance costs due to web front end).

Exemplary Critical Parameter/Requirements Management Tool

Overview

In an exemplary embodiment, the critical parameter/requirements management system 20 provides a groupware environment for capturing the functional flow of quality characteristics and other requirements for a complex project. By mapping the parameters to the product structure and adding process-driven attributes, the critical parameter/requirements management tool 27 links product objects with the key parameters that articulate object quality, produce key quality indicators (KQIs), and other quantitative metric views of product maturity and risk. This enables more efficient reuse of important product information as well as improved integration and development performance. In the embodiment being described, the critical parameter/requirements management tool 27 includes a bi-directional interface with the configuration management tool 38, such as EDS's Teamcenter Enterprise, where the master product structure and other product information may reside.

The critical parameter/requirements management tool 27 provides an authoring and management environment to articulate functional hardware requirements for product objects, including both material objects and integration functions (i.e., virtual integration objects) and to establish relationships between parameters. In the embodiment being described, the critical parameter/requirements management tool 27 provides Internet access either directly or through the configuration management tool 38 for reuse and design partner/supplier engagement. The critical parameter/requirements management tool 27 provides product development teams with the flexibility to match requirements definition to their value chain and quality plans (e.g., development teams do not have to specify everything, only what is required to efficiently manage risk and quality achievement for a project).

The critical parameter/requirements management tool 27 can automatically create metric views for project members to track realization progress against design intent and identify risk areas earlier in the development process and can automatically provide summary views of parameter maturity against product development process phase criteria. The critical parameter/requirements management tool 27 can provide parameter flow-down (e.g., traceability) views for complex systems that may improve integration capabilities via earlier risk identification and problem resolution and improved diagnostics capability.

The UI 45 for the critical parameter/requirements management tool 27 supports the process life cycle and engineering best practices for product development programs. In the embodiment being described, the UI 45 may enable users to quickly find the knowledge artifacts from the configuration management tool 38 (e.g., EDS's Teamcenter Enterprise) that support parameter understanding. This may increase the rates of learning and reuse.

In the embodiment being described, the critical parameter/requirements management tool 27 is integrated with other requirements for a product (e.g., software, systems, standards, etc) even if all domains are not on a common platform/database. This allows relational links between requirements in different engineering domains/disciplines to facilitate improved integration efficiency. In the embodiment being described, the critical parameter/requirements management tool 27 is also integrated with common life cycle services, such as change control, audit data capture, configuration management, and problem management. This may enable user to efficiently maintain control over the important product information over the life cycle, manage changes virtually, and to make an explicit link between problems observed and the quality parameters that control them.

In the embodiment being described, the critical parameter/requirements management tool 27 includes interoperability with the configuration management tool 38 (e.g., EDS's Teamcenter Enterprise) relative to master object structures, links to relevant design artifacts (e.g., CAD, CAE models, reports, etc), and integration with important workflow automation and common life cycle services. Enterprise-wide access to data is available via access over the web through the critical parameter/requirements management tool 27 or other integrated tools to facilitate reuse and transfer of knowledge outside of the immediate project development team value chain.

User Characteristics

There may be several types of users of the critical parameter/requirements management tool 27 within a project team, including a project author, product object author, material object author, virtual integration object author, system viewer, and value chain viewer. A project author is a system architect or engineer responsible for setting up decompositions per the organizational, value chain and quality plans. A project author, for example, may establish attribute definitions, access rights, and certain business rules. A product object author is a knowledge author for both material and virtual integration objects. A material object author is a knowledge author for material objects in structure and, typically, a lead design engineer. A material object author may enter and manage data and establish internal-to-object functional links. In an extended value chain model, material object owners could be external partners. A virtual integration object author is a knowledge author for virtual integration objects and, typically, a systems engineer focused on managing allocations and realization of high level outputs across multiple material objects. A virtual integration object author may enter allocation and test data, establish links to knowledge artifacts, and run reports on gaps and risk nodes to facilitate integration. A system viewer is a technical, process, or quality manager accessing rollup views of risk and quality achievement over time for the project. Value chain viewers are value chain members that require real time access to parameter data to perform their functions. Value chain viewers may author certain parameter and requirement attributes assigned to them.

Terms, Acronyms, and Abbreviations

Cpk is a single value process capability (Cpk) index used in assessing the capability of a process in achieving the desired quality level. Cpk is the smaller value of: [mean-lower spec limit]/3sigma, or [upper spec limit—mean]/3 sigma. Cpk is desirable because it take into account central tendency in addition to the distribution of the response. The higher the Cpk, the greater the process capability.

Critical parameter/requirements measurement is a general phrase that, among other things, encompasses a process and best practices for managing the maturity and reuse of key, measurable hardware quality characteristics for a product or system.

Flow-down is another name for the ability to trace quality contribution from the system level down to piece parts and/or manufacturing processes. This concept is similar to views of traceability of requirements in other requirements management tools.

A virtual integration object is a functional focus area that requires integration across two or more material objects in order to efficiently realize a system requirement. A virtual integration object may also be referred to as a functionally important topic (FIT).

A key quality indicator (KQI) is an in-process metric that indicates risk level toward quality maturity against phase requirements.

A material object is a physical part or assembly of a product as described by the bill of material decomposition.

Next higher assembly (NHA) is used in reference to the material decomposition of a product and refers to the parent in a parent-child relationship.

Next lower assembly (NLA) is also used in reference to the material decomposition of a product and refers to the child in a parent-child relationship.

A partitioned element is one or more material objects that are identified to establish a working boundary or interface to the system for the purposes of assigning organizational alignment and localizing change.

A platform element is an object that is also a partitioned element with an interface definition that is given a special tag for promoting reuse across multiple products/projects or programs.

A phased product delivery process is a multi-phase product development process, for example, consisting of a front end marketing phase, a proposal phase, a product definition phase, a design phase, a demonstrate phase, and a deliver and delight (i.e., production) phase.

A product object is an element of a given product hierarchy. A product object may be a material object or a virtual integration object.

In the context used herein, value chain refers to any member of an internal or external organization that adds value to product development.

Value analysis/value engineering (VA/VE) includes a suite of techniques, practices and tools that facilitate improved product development decision-making (e.g., F.A.S.T., FMEA, Combinex, AHP, etc.).

System Structure Authoring

Setting up the system structures in the critical parameter/requirements management tool 27 for a project includes identification and maintenance of two types of system objects: i) material objects and ii) virtual integration objects. Material objects refer to the traditional indented bill of material assembly decomposition for a project (IBOM). Objects in this structure are the physical material (parts and assemblies) that make up the product (e.g., modules, subsystems, assemblies, parts). Virtual integration objects are virtual objects that identify a related set of system requirements specifically highlighted to assign responsibility, integration models and other artifacts, and enable maturity views for the allocation and synthesis of requirements across two or more material objects. These virtual integration objects may also be referred to as functionally important topics (FITs).

Object Requirements Data across Multiple Projects

The use of object requirements data across multiple projects enables a project classification and change control scheme for the critical parameter/requirements management tool 27 that facilitates a single source of data for object requirements detail and also allows mapping this data to multiple configurations and products to build system views of multiple configurations based on reusing object detail. Product family name, product name, and configuration name are product configuration attributes that may be associated with objects and/or requirements data in the critical parameter/requirements management tool 27. The configuration name attribute denotes which options are present for a particular configuration of the product.

Combined Object Structure for Project

Using the critical parameter/requirements management tool 27, programs may develop a combined product structure that consists of both virtual integration objects and material objects. Subsystem numbers are used as structure identifiers in the critical parameter/requirements management tool 27 to establish this structure. The subsystems can have further hierarchical decompositions. This enables authoring and viewing the project structure via the UI 45 as a combined list based on an arbitrary subsystem numbering scheme. Subsystem number, name, owner, and primary object type are product object attributes that may be associated with objects and/or requirements data in the critical parameter/requirements management tool 27. The owner attribute identifies a user from a user list for the critical parameter/requirements management tool 27 that is responsible for object delivery to the program. The primary object type attribute, for example, identifies whether the object is a material object or a virtual integration object.

Material Object Structure for Project

The material object structure describes the material assembly-structure for a product in the critical parameter/requirements management tool 27. In the early stages of development, structure is driven by architecture and typically is understood only at a very high assembly level. As the product design continues, more content and structure is articulated with increasing detail through various attributes. The critical parameter/requirements management tool 27 permits a product development team to create and manage (or synchronize to a master structure in the configuration management tool 38) during the entire life cycle of the development process. The critical parameter/requirements management tool 27 make that structure available to users for authoring and finding information. Parameter information is attached to material objects at an appropriate level to efficiently manage quality and risk using the critical parameter/requirements management tool 27. The UI 45 provides means to link and maintain the association between parameter requirements and material objects over the life cycle even when part numbers change.

With reference to FIG. 42, the UI 45 provides a standard view that operates on the combined project structure (subsystem number driven) to filter out material objects and display them with the correct decomposition structure. Subsystem numbers and corresponding part numbers may be included in the standard view. It should be noted that not all material object numbers are required to have a unique subsystem number.

Part number, name, commodity type, platform element, partitioned element, QRSP status, supplier, and make/buy code are incremental material object attributes that may be associated with objects and/or requirements data in the critical parameter/requirements management tool 27. The platform element attribute identifies whether or not the object is a platform element. The partitioned element attribute identifies whether or not the object is a partitioned element. The QRSP status attribute identifies whether the corresponding object is quality sensitive, reliability sensitive, safety sensitive, and/or cost sensitive.

Virtual Integration Object Structure for Project

The virtual integration object structure in the critical parameter/requirements management tool 27 describes a functional partitioning of responsibility for a product team to facilitate cross-material object integration. The virtual integration object structure may use arbitrary subsystem numbers and also includes decomposition relationships like the material structure. The critical parameter/requirements management tool 27 may create and manage the virtual integration object structure or synch to a master structure from the configuration management tool 38.

Figure 43:
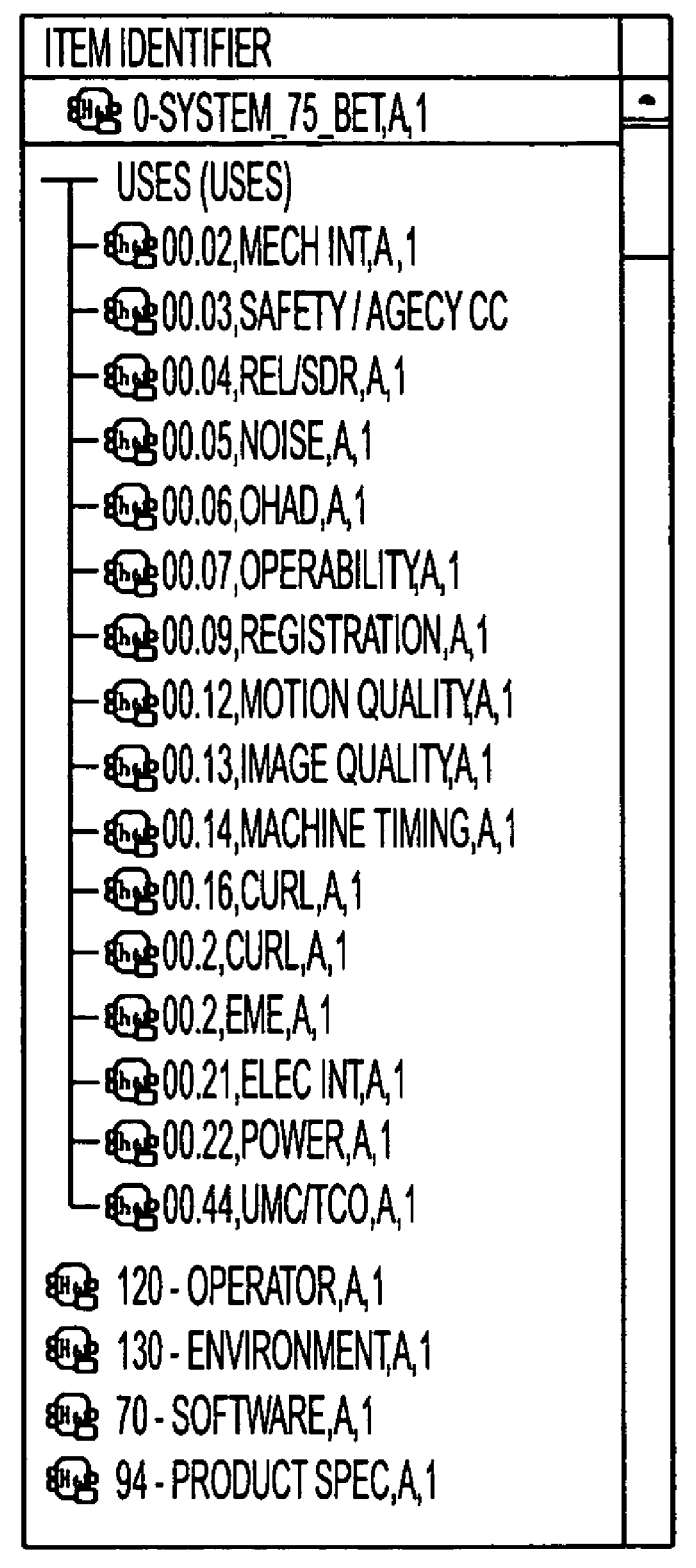

With reference to FIG. 43, the UI 45 provides a standard view that operates on the combined project structure (i.e., subsystem number driven) to filter out virtual integration objects and display them with the correct structure. Attributes associated with each virtual integration object may be displayed to the right of the virtual integration object name as shown. Subsystem numbers and decomposition relationships (e.g. indenting) may be included in the view.

Subsystem number, name, owner, and integration type are virtual integration object attributes that may be associated with objects and/or requirements data in the critical parameter/requirements management tool 27. The owner attribute identifies a user from a user list. The integration type attribute identifies a particular type of object, such as a functional, budget, or standards compliance object.

Organizational Roles into Groups

The critical parameter/requirements management tool 27 provides utilities to maintain access rights to requirement objects down to the attribute and attribute value levels. The critical parameter/requirements management tool 27 also provides utilities to align users with groups defined by roles on the program. Individual users may be associated with more than one group. The groups are used to provide pull down access rights assignment to particular objects and attribute data based on which groups are assigned to certain attributes or attribute values. Group name, group members, and access rights to attributes are group object attributes that may be associated with objects and/or requirements data in the critical parameter/requirements management tool 27. The group name attribute, for example, may identify AMEs, systems engineering, and team groups. Access rights to attributes may be individually specified by attribute.

Basic Object Authoring and Views

Material Object Requirements (Partitioned Element)

The critical parameter/requirements management tool 27 implements a material object classifications scheme. The boundary of a material object is described by its interface requirements (e.g., input and output requirements). Input and output requirements for a particular material object can be parameters with nominal and range values or text-driven requirements. Internal requirements or quality characteristics of a material object are described by its critical parameters (CPs) and critical specifications (CSs). Critical specifications contribute to critical parameters in a parent/child relationship.

Basic Material Object Parameter Classification and Attributes

Figure 44:
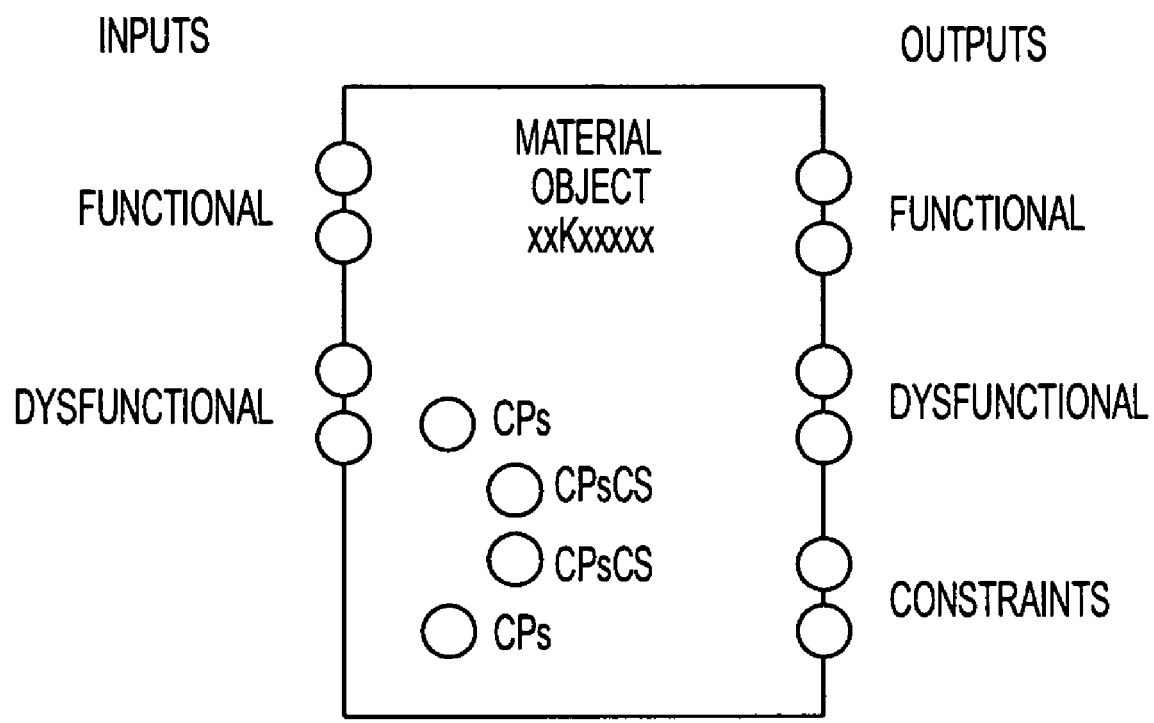
FIG. 44 is a diagram of an exemplary parameter/requirements classification scheme for a material object in an add/edit/link feature group.

As shown in FIG. 44, an each material object in the critical parameter/requirements management tool 27 may have interface requirements and internal requirements associated therewith. The interface requirements may include input requirements and output requirements. The input requirements may include functional input requirements and dysfunctional input requirements. The output requirements may include functional output requirements, dysfunctional output requirements, and constraint output requirements. The internal requirements may include critical parameter requirements and critical specification requirements.

The functional input requirements identify an action, physical object, or energy that needs to be supplied for the object to perform its intended function. The dysfunctional input requirements (i.e., noises) identify an action, physical object, energy or source of variation external to the object that may limit the intended function of the object and needs to be comprehended in certifying the object outputs. Primary output requirements identify the highest-order, measurable, quality characteristics of the object directly related to the primary function of the object (e.g. sheet arrival time for a feeder).

The functional output requirements identity the highest-order, measurable, quality characteristics of the object. The dysfunctional output requirements identify measurable byproducts or sources of variation from the object that can be dysfunctional input requirements to other objects or the system. The constraint output requirements identify other requirements allocated to the object (e.g., cost, reliability, standards, integration requirements, etc). Budget constraint output requirements identify other requirements allocated to the object that require quantifiable allocation, actual, gap, and rollup views for the project (e.g., cost, reliability, etc).

The critical parameter requirements identify measurable quality characteristics specified by the object owners that directly affect object output capability. Achieving process capability of CPs should predict process capability requirements of the object output requirements. System critical parameter requirements (SCPs) identify measurable quality characteristics that exist at object interfaces. SCPs are the critical parameters of a higher level of assembly (e.g., system). The critical specification requirements identify measurable quality characteristics specified by the object owners that directly affect object CPs and geometric outputs. Achieving process capability of CSs should predict process capability requirements of the object CPs and the output requirements.

Functional parameter requirements identify quality characteristics specified by the object owners that captures a functional requirement, but is not a concern for process capability or level maturity.

ID, name, description, nominal value, manufacturing minimum tolerance, manufacturing maximum tolerance, functional minimum tolerance, functional maximum tolerance, units, tolerance SD, audit type, active/inactive, and state/mode are basic parameter attributes that may be associated with objects and/or requirements data in the critical parameter/requirements management tool 27. The ID attribute provides an identification number for the corresponding parameter. The tolerance SD attribute identifies a standard deviation which sets a confidence interval and level on the tolerances. The audit type attribute identifies an applicable audit type for the parameter, such as subjective pass/fail, quantitative—Cpk, quantitative—no Cpk. The active/inactive attribute allows parameter knowledge to be maintained, but taken from rollups or other views if contribution is determined to be low. The state/mode identifies if parameter is only applicable in certain system states or modes.

Figure 45:
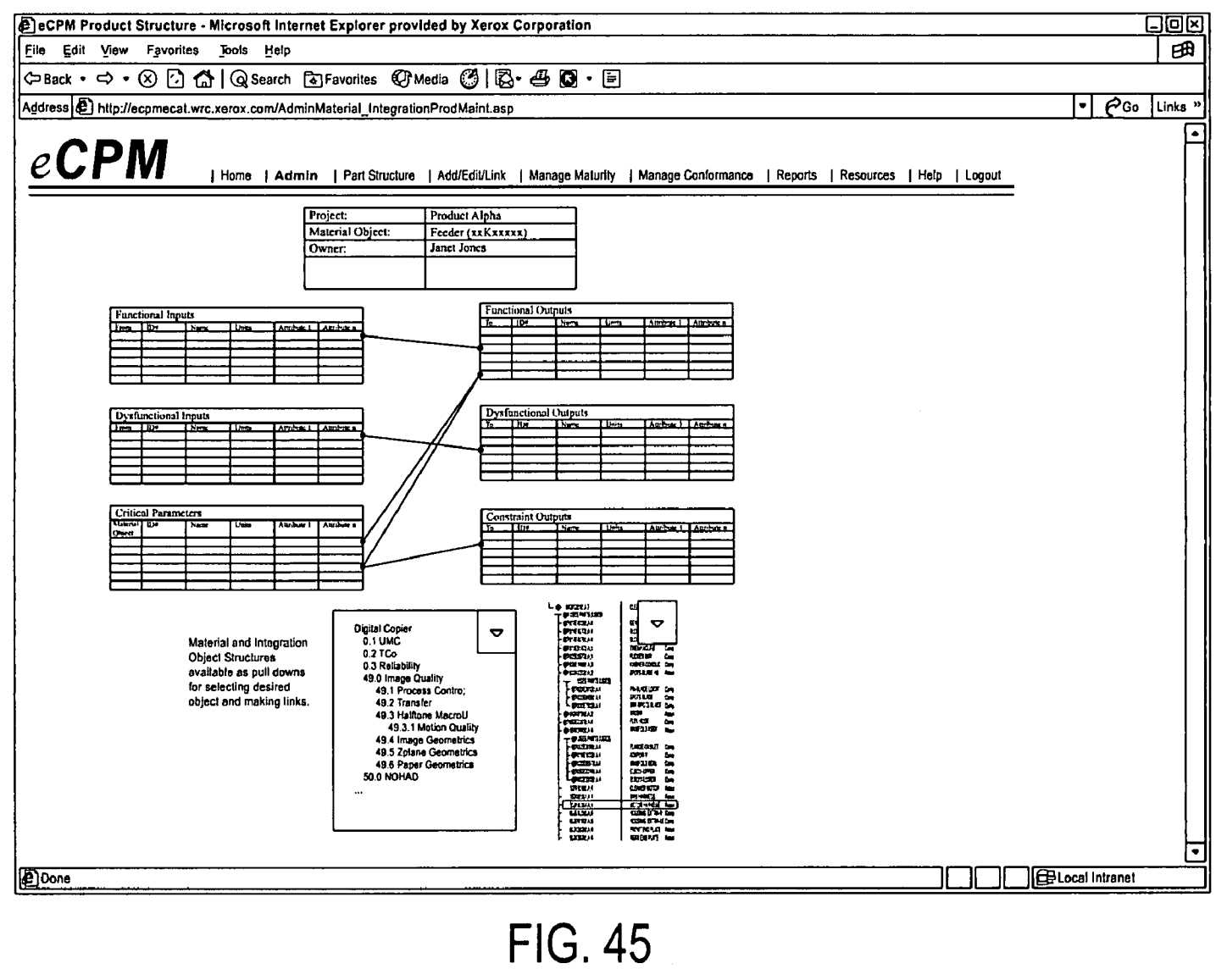

With reference to FIG. 45, an exemplary view for authoring material object requirements and attributes shows spreadsheet-like views of the various parameter types.

Material Object Interface Requirements and Relationships

The input and output requirements describe the functional boundary of a material object in the system and enable attachment of other system requirements that the object must satisfy. This interface requirement functionality articulates requirements at the boundary of an object and facilitates convergence on these requirements by creating views via the UI 45 of conformance and risk for complex systems. To reduce complexity and localize the impact of changes, interface definitions may be applied at the highest possible levels in the system subject to value chain, organizational, and quality plan constraints. The "partitioned element" tag in the critical parameter/requirements management tool 27 identifies material objects that are intended to have boundary definitions.

Material Object Internal Requirements and Relationships

For a material object, internal requirements functionality enables authors to articulate/maintain critical parameter information for an object that, by definition, are specified by and under direct control of the object owner using the critical parameter/requirements management tool 27. To facilitate quality flow understanding for the object (and system), authors can articulate relationships between CSs and CPs, between CPs and output requirements of the corresponding object that they affect, and likewise, between input requirements of the corresponding object and any output requirements of the corresponding object they may directly impact.

Figure 46:
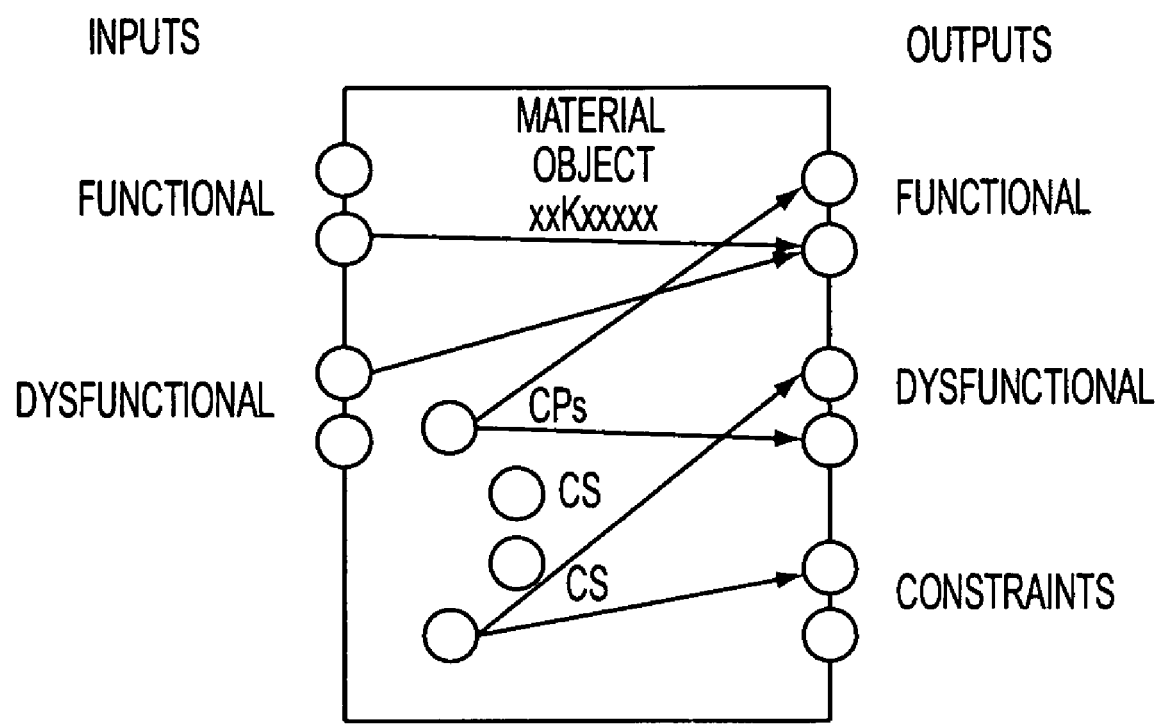
FIG. 46 is a diagram of exemplary internal parameters and functional relationships for a material object in an add/edit/link feature group.

With reference to FIG. 46, a internal requirements and relationships for a material object may include a link from a functional input requirement to a functional output requirement, a link from a dysfunctional input requirement to a functional output requirement, a link from a first CP to a functional output requirement, a link from the first CP to a dysfunctional output requirement, a link from a second CP to a dysfunctional output requirement, and a link from the second CP to a constraint output requirement.

Material Structure and Material Object Requirements Flow within Parent Assembly

The critical parameter/requirements management tool 27 provides an object oriented parameter classification structure that can be applied to any object in the material structure for a product and leverages common definitions and process rules. Common authoring, viewing/reporting, and maintenance utilities are enabled for any material object in the structure via the UI 45. The explicit material structure can then be used to automate relationships and assembly quality flow for the project. Using the critical parameter/requirements management tool 27, the level of requirements definition for a project can be matched as closely as possible with the project quality and sourcing/value chain plans (e.g., not necessarily articulating every detail, only what is necessary to efficiently manage risk and quality maturation for a project). The critical parameter/requirements management tool 27 leverages the common classification scheme and rules and the explicitly defined material structure to automate/facilitate description of the quality flow within an assembly. The level of definition and elaboration of the parameter structure may go as far as is necessary (or stop as soon as practical) to match quality parameters with the appropriate sourcing and value chain structure for the product. This classification scheme is object oriented, but flexible to match a project's specific value chain boundaries. If necessary, users can articulate as little as input and output requirements for a black box assembly, or as far down the value chain as desired (e.g., including manufacturing process parameters). The intent is NOT to over-describe the system for completeness.

Figure 47:
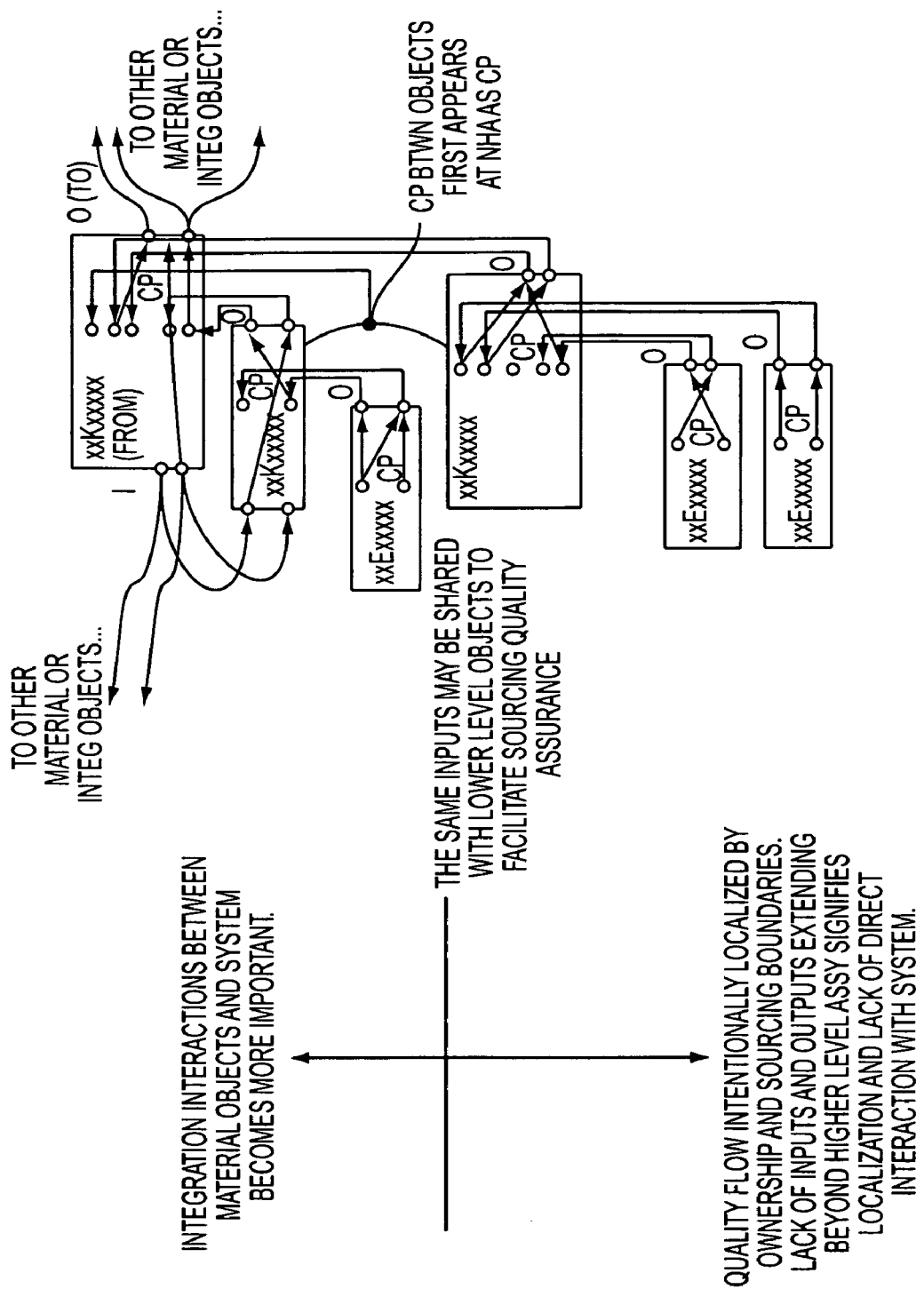
FIG. 47 is a diagram of an exemplary classification rules for requirements associated with material objects in an add/edit/link feature group.

With reference to FIG. 47, a base view of an object via the UI 45 may include input and output requirements and CPs automatically built from the material structure for that assembly, including any CPs between objects in the next lower assembly level. Users can also drill down the assembly hierarchy for an object as desired to reveal parameters at lower levels in the structure via the UI 45.

Virtual Integration Object Requirements

Figure 48:
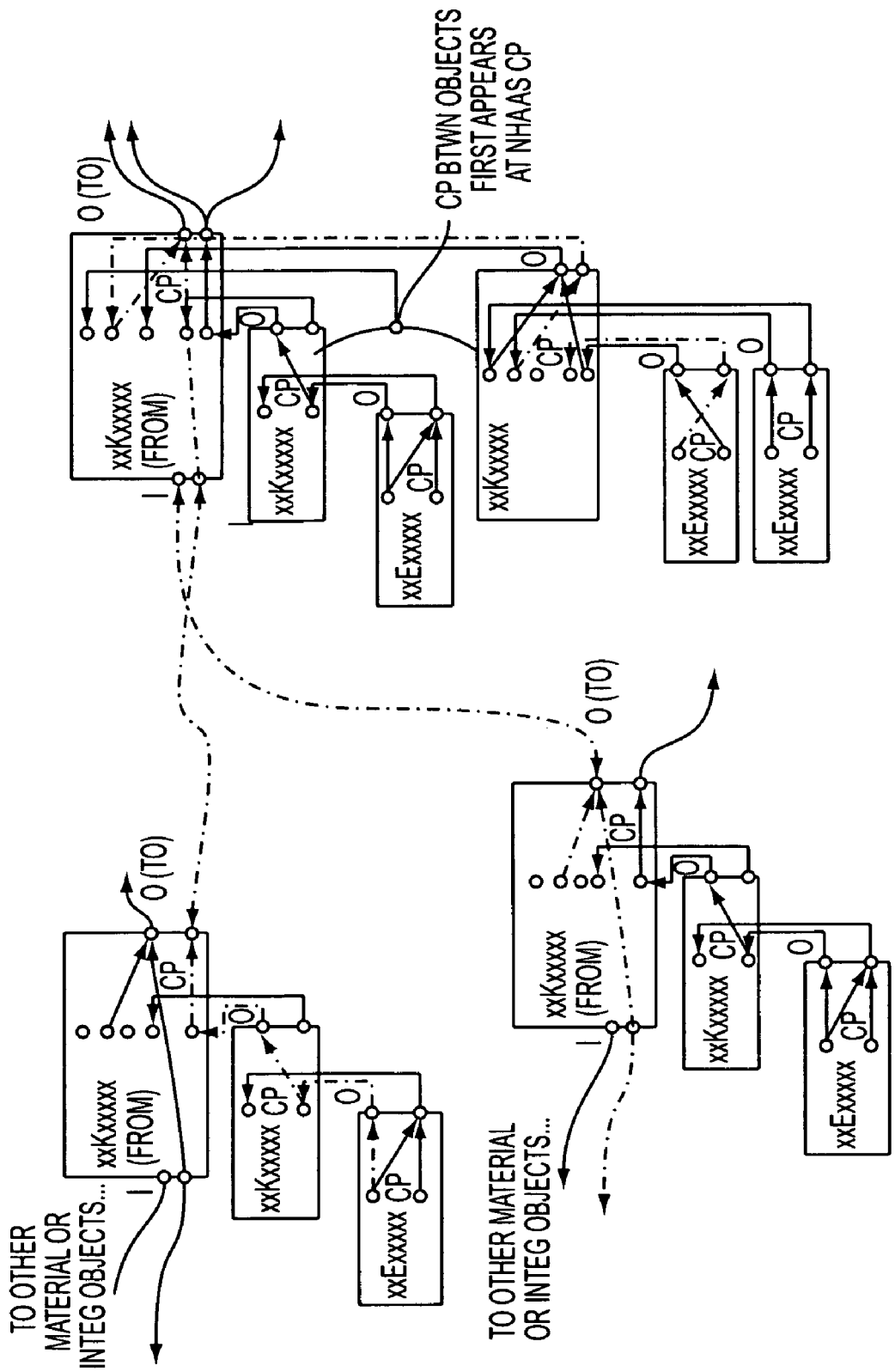
FIG. 48 is a diagram of an exemplary flow-down for virtual integration objects in an add/edit/link feature group.

The critical parameter/requirements management tool 27 allows virtual integration object owners to use authoring capabilities to identify and then view traceability of parameter flow that shows functional contribution to a higher level requirement that typically flows across more than one material assembly object. There are three main types of virtual integration objects: i) functional virtual integration objects, budget virtual integration objects, and other conformance virtual integration objects. Understanding and viewing functional virtual integration object relationships can involve a more complicated flow-down between and within material objects where interactions exist than the material structure. Budget virtual integration objects can primarily leverage the material structure to make allocations and roll up status and gaps (e.g., cost, weight, etc). An other conformance virtual integration object refers to integration efforts around conformance to related requirements for the system (e.g., safety, operability, agency compliance, etc). The UI 45 provides virtual integration object owners with views of system requirements flow-down across material objects, enables authoring of virtual integration object allocations to material objects, and views of convergence/maturity over the life cycle for the particular integration area. An example of virtual integration object flow-down is provided in FIG. 48.

Behavioral and VA/VE Descriptions

In the embodiment being described, the critical parameter/requirements management tool 27 provides a closed-loop knowledge capture process during product development with linkage between build configuration, expected failure modes, problems/failure modes observed during testing, and parameter definition. To create this linkage, the data stored in the database associated with critical parameter/requirements management tool 27 is linked to the problem management tool 40 via failure mode identification and tracking between the systems. For example, expected upper and lower failure modes are documented and linked to object outputs at the beginning of the development process. During auditing, testing and other development activities, the expected failure modes are either confirmed within the context of the specified parameter values or changes to the parameter content may be initiated if new failure modes are observed or if the expected failure modes appear while the system is thought to be under control.

Lower failure mode ID, lower failure mode name, lower failure mode description, upper failure mode ID, upper failure mode name, and upper failure mode description are output parameter attributes for behavioral description that may be associated with objects and/or requirements data in the critical parameter/requirements management tool 27. The lower failure mode reflects what is expected if the corresponding parameter exceeds its lower functional specification limit. Similarly, the upper failure mode reflects what is expected if the corresponding parameter exceeds its upper functional specification limit.

Requirement Links to Knowledge Artifacts in Configuration Management Tool

Figure 49:
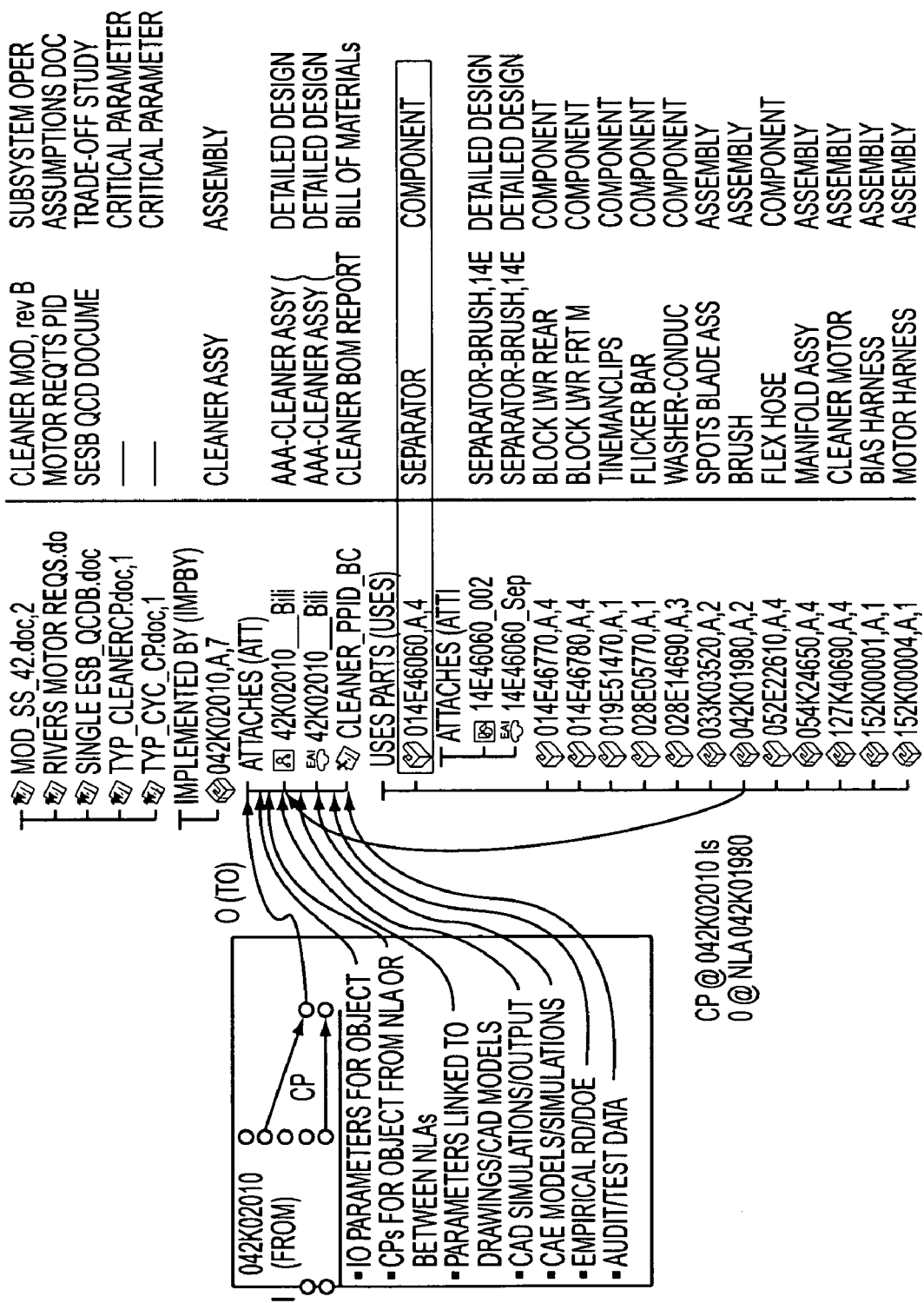
FIG. 49 is a diagram of exemplary parameter links to artifacts in a configuration management (or product data management) tool in an add/edit/link feature group where the configuration management tool is integrated with the critical parameter/requirements management tool.

In the embodiment being described, material and virtual integration object parameters in the critical parameter/requirements management tool 27 are linked to their respective objects in the configuration management tool 38 to enable relational linkage between parameter data and related product knowledge (via design and engineering artifacts). For geometric interface and CP information that may be articulated/communicated via 2D or 3D representations, the critical parameter/requirements management tool 27 may also link to CAD or VIS files for a particular object to facilitate assurance of the quality of the object. The CAD or VIS files may be associated with the configuration management tool 38 or another external source. The attribute links to specific artifacts in the configuration management tool 38 and other external sources may also be enabled (e.g., parameter measurement method reference may be hyperlinked to a corresponding document in the configuration management tool 38). An example of parameter links to artifacts in the configuration management tool 38 is provided in FIG. 49.

Critical Parameter/Requirement Management Process Management and Views

The critical parameter/requirements management process model 10 provides a hardware quality maturity process. One of the theme in the critical parameter/requirements management process model 10 is the maturity of the parameters through the product development life cycle as described by the parameter maturity levels for interface parameters (IOC) and internal parameters (CPs and CSs). In the embodiment being described, to achieve a maturity level, specific tasks must be completed and, where appropriate, an artifact supporting level achievement must be available. Additionally, appropriate sign offs from authorized users must be made electronically. The maturity process may be managed from an object level and project level via the UI 45 of the critical parameter/requirements management tool 27.

Critical Parameter/Requirement Management Process via Parameter Maturity Level Achievement The critical parameter/requirements management process model 10 provides a risk assessment method that characterizes the maturity of parameters for a project along a maturity scale that maps to the desired product development and implementation process steps. The parameter attributes, for example, may support a six level maturity scale to enable material object, virtual integration object, and system views of maturity growth. These maturity levels may also be associated with typical product development process phases (TTM). For the exemplary six level maturity model: 1) input and output requirements may be proposed, CPs may be identified, and constraints may be allocated for the first maturity level, 2) input and output requirements may be concurred, CPs may be optimized, and constraints may be concurred with design conformance projected for the first maturity level, 3) input and output requirements and CPs may have output latitude demonstrated for the third maturity level, 4) input and output requirements and CPs may have the design demonstrated and constraints may have conformance of the design demonstrated the fourth maturity level, 5) input and output requirements and CPs may be process certified and constraints may be conformance agency certified for the fifth maturity level, and 6) input and output requirements and CPs may have online QC for the sixth maturity level.

$L_n$ achievement plan, $L_n$ achievement outlook, and $L_n$ achievement actual (where $L_n$ identifies a specific maturity level) are parameter maturity level planning attributes that may be associated with objects and/or requirements data in the critical parameter/requirements tool 27.

From/to, reuse rating, reuse source, long lead status audit required, and SME level 1 review are parameter attributes that may be associated with the level 1 maturity level for objects and/or requirements data in the critical parameter/requirements tool 27. The reuse rating attribute, for example, may be an integer value from 0 to 4. Reuse rating 0 may indicate direct reuse without changes. Reuse rating 1 may indicate direct reuse with parameters scaled internally and/or at an interface. Reuse rating 2 may indicate reuse of existing components in a new embodiment. Reuse rating 3 may indicate reuse of existing technology with new components in a new embodiment. Reuse rating 4 may indicate use of new technology and new parameter work. The long lead status attribute may be based on the percentage of CPs and output requirements that are classified as reuse rating 4. The audit required attribute is a tag box that denotes CPs, CSs, and output requirements that are to audited in order to accept associated hardware for a given build of the product. The SME level 1 review attribute identifies a particular process SME user with edit rights assigned to grant final approval of quality for maturity level 1 achievement.

Measurement method, measurement method reference, nominal concurrence, functional range concurrence, manufacturing tolerance concurrence, parameter optimization completed, optimization artifacts, and FMEA status are incremental attributes that may be associated with the level 2 maturity level for objects and/or requirements data in the critical parameter/requirements tool 27. The measurement method reference attribute may be a link to a document having a measurement method description and details via url or through the configuration management tool 38. The nominal concurrence attribute may be used in conjunction with output requirements and accessed by users having ownership rights to objects receiving the corresponding output requirements for their concurrence. The nominal concurrence attribute may also be used in conjunction with requirements linked to virtual integration objects and accessed by users having ownership rights to the virtual integration objects for their concurrence. Acceptable values for the nominal concurrence attribute may be red for high risk, yellow for medium risk, and green for low risk. The manufacturing tolerance concurrence attribute may be accessed by manufacturing engineer users for their concurrence with the manufacturing tolerance specified for the corresponding requirement. Acceptable values for the manufacturing tolerance concurrence attribute may be red for high risk, yellow for medium risk, and green for low risk. The optimization artifacts attribute may be a link to a document having source artifacts (i.e., reports) for optimization via url or through the configuration management tool 38. Acceptable values for the FMEA status attribute may be null, phase I completed, phase 11 completed, and phase III completed.

Concurrence-design conformance projected is an incremental attribute for constraints that may be associated with the level 2 maturity level for objects and/or requirements data in the critical parameter/requirements tool 27. The concurrence-design conformance projected attribute may be used in conjunction with output requirements and accessed by users having ownership rights to objects receiving the corresponding output requirements for their concurrence. The concurrence-design conformance projected attribute may also be used in conjunction with requirements linked to virtual integration objects and accessed by users having ownership rights to the virtual integration objects for their concurrence. Acceptable values for the concurrence-design conformance projected attribute may be red for high risk, yellow for medium risk, and green for low risk.

S/N ratio, sensitivity, contribution, and relationship type are link attributes that may be associated with the level 2 maturity level for objects and/or requirements data in the critical parameter/requirements tool 27. The S/N ratio attribute may be used to indicate the signal-to-noise contribution of the corresponding parameter to the response. The sensitivity attribute may be used to indicate the response of an output to changes in input or CP. The contribution attribute may be used to indicate strength of contribution the input or CP has on the output. The contribution attribute may be used to filter top CPs (e.g., CP with greater than 15% contribution). Acceptable values for the relationship type attribute may be A for large affect on S/N ratio, B for small affect on S/N ratio and large affect on response, and C for small affect on S/N ratio and small affect on response.

Latitude demonstrated, latitude artifact, estimated/adjusted Cpk, source, mean, standard deviation, sample size, target Cpk, latitude ratio, measurement method, measurement method reference, and measurement method assess are incremental attributes that may be associated with the level 3 maturity level for objects and/or requirements data in the critical parameter/requirements tool 27. The latitude demonstrated attribute may be used in conjunction with output requirements and CPs and accessed by authorized users for their concurrence. The latitude demonstrated attribute may be used to denote that output latitude is preserved subject to other variation sources (e.g., manufacturing, wear, system). The latitude artifact attribute may be a link to a document having latitude demonstration artifacts (i.e., reports) via url or through the configuration management tool 38. The estimated/adjusted Cpk attribute is a quality metric that combines central tendency with capability distribution. The source attribute may be used to describe where the estimated Cpk value was derived. The target Cpk attribute may be accessed by appropriate quality/system engineers. The latitude ratio attribute may be used to represent the ratio of (range requirement—current capability)/range requirement. The manufacturing method assess attribute may be accessed by manufacturing engineer users to assess applicability and capability of the measurement method to the production environment. Acceptable values for the manufacturing method assess attribute may be red for high risk, yellow for medium risk, and green for low risk.

Design demonstrated, design demonstrated latitude artifact, process certification status, part hard tool status, online QC, SPC enabled, and PFMEAs/Pmaps are incremental attributes that may be associated with the level 4 maturity level for objects and/or requirements data in the critical parameter/requirements tool 27. The design demonstrated attribute may be used in conjunction with output requirements and CPs and accessed by authorized users for their concurrence. The latitude demonstrated attribute may be used to denote that output latitude is preserved subject to other variation sources (e.g., manufacturing, wear, system) with short run or hard tooled design intent parts. The design demonstrated latitude artifact attribute may be a link to a document having latitude demonstration artifacts (i.e., reports, simulation model, etc.) via url or through the configuration management tool 38. The part hard tool status attribute may be used to denote if the latest output requirement or CP status was from soft tooling or hard tooling. The online QC attribute may be used as a tag to denote parameters to be actively monitored in manufacturing via statistical process control or other means. The SPC enabled attribute may be used in conjunction with online QC parameters.

Concurrence-design conformance demonstrated is an incremental attribute for constraints that may be associated with the level 4 maturity level for objects and/or requirements data in the critical parameter/requirements tool 27. The concurrence-design conformance demonstrated attribute may be used in conjunction with output requirements and accessed by users having ownership rights to objects receiving the corresponding output requirements for their concurrence. The concurrence-design conformance demonstrated attribute may also be used in conjunction with requirements linked to virtual integration objects and accessed by users having ownership rights to the virtual integration objects for their concurrence. Acceptable values for the concurrence-design conformance projected attribute may be red for high risk, yellow for medium risk, and green for low risk.

Conformance agency certified is an incremental attribute for constraints that may be associated with the level 5 maturity level for objects and/or requirements data in the critical parameter/requirements tool 27. The conformance agency certified attribute may be used in conjunction with output requirements and accessed by users having ownership rights to objects receiving the corresponding output requirements for their concurrence. The conformance agency certified attribute may also be used in conjunction with requirements linked to virtual integration objects and accessed by users having ownership rights to the virtual integration objects for their concurrence. Acceptable values for the conformance agency certified attribute may be yes and no.

Online QC designation, manufacturing data, and field data are incremental attributes that may be associated with the level 6 maturity level for objects and/or requirements data in the critical parameter/requirements tool 27. The manufacturing data attribute may be used to link to the configuration management tool 38 for manufacturing parameter achievement over time. The field data attribute may be used to link to the configuration management tool 38 for field data on statistical actual performance.

Snapshot KQI Views for Objects and Project

The critical parameter/requirements tool 27 provides several views of KQI maturity by object and project. These views show maturity and risk associated with the product being developed. By following the desired process at the material and integration authoring levels, these system views can become reports output by the critical parameter/requirements tool 27 without any significant manual intervention.

The total number of inputs, outputs, CPs, and constraints for an object are attributes to support KQI quality views that may be associated with objects and/or requirements in the critical parameter/requirements tool 27. The summed total of parameter types may be used in calculating the percentage status for partitioned elements.

Snapshot Quantitative Quality and Budget-Constraint Views for Objects and Project Where KQIs are indicators of quality, the critical parameter/requirements tool 27 provides system views of actual quality and requirements conformance by object and project for certain items. Snapshot views of quantitative quality values against quantified target values are produced as well as status views based on the gap value. These views, for example, may include output requirements, CPs, and budget-type constraints that have actual and target Cpk attributes and actual and target budget-constraint values (e.g., cost, weight, reliability, etc), respectively.

Output and CP Cpk gap, O and CP Cpk gap percentage difference, budget constrains gap, and budget constraints percentage difference are attributes to support quantitative quality views that may be associated with objects and/or requirements in the critical parameter/requirements tool 27.

KQI Growth Views for Objects and Project

The critical parameter/requirements tool 27 provides growth views of parameter maturity for a complex project. The rates of growth for the KQIs are charted based on a time series of snapshot or historical data views that capture past and current maturity levels as well as plan and outlook forecasted achievement dates.

Quality and Budget Constraint Growth Views for Objects and Project

The critical parameter/requirements tool 27 provides growth views of quality and requirements conformance maturity for a complex project. The rates of growth for quantitative quality and budget-constraint conformance are charted based on a time series of snapshot views that capture the total number and percent of total parameters that are within various percentage of target values over time.

Parameter Audit Capture and Views

The manage conformance feature group 54 of the critical parameter/requirements tool 27 provides a parameter audit feature that enables object or system authors to capture actual audit data for parameters and aligns the data to specific samples, configurations, and tests/areas. With this data and corresponding relational links, the critical parameter/requirements tool 27 may calculate and display actual parameter quality achievement and stability over time (e.g., Cpk). For example, as shown in FIG. 50, the manage conformance feature group 54 may include a standard view and print-formatted report that displays the parameters tagged for audit for an object with user selected variables for test area and build/configuration. The audit data parameters are calculated from the parameter data and displayed in the view.

Build, machine identification number, date and time, test area, measured values, measurement system description, subjective pass/fail, and auditor are attributes to support audit capture and views that may be associated with objects and/or requirements in the critical parameter/requirements tool 27. The build attribute identifies the name of the build. The date and time attribute identifies the date and time for separating multiple readings for a parameter. The measurement system description may include the measurement method and equipment name and model. The subjective pass/fail attribute identifies the result for subjective measurement types. The auditor attribute identifies a user that has access rights to edit audit data for a particular parameter.

The exemplary embodiments have been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A method of managing a development program for a product, including:
   a) providing an object oriented product structure classification scheme with a hierarchical product structure of product objects that define at least one configuration of the product using a parameter/requirements management system that includes one or more application servers, one or more user workstations, and one or more database servers, the one or more application servers comprising a product structure-driven requirements management tool accessible to the one or more user workstations and the one or more database servers storing parameter/requirements management data for the product structure-driven requirements management tool;
   b) providing a requirements classification scheme, including:
      i) capturing requirements for the product using the parameter/requirements management system;
      ii) associating at least a portion of the captured requirements with one or more product objects of the product structure using the parameter/requirements management system;
      iii) classifying the requirements associated with the product objects into external requirements and internal requirements based at least in part on the hierarchical product structure of a) and the requirement/product object associations of ii) using the parameter/requirements management system, wherein the external requirements include input and output requirements and the internal requirements include critical requirements;
      iv) linking at least one output requirement associated with a first product object to at least one related input requirement associated with another product object using the parameter/requirements management system;
      v) linking at least one input requirement associated with the first product object to at least one related critical requirement using the parameter/requirements management system, wherein each linked related critical requirement is associated with the first product object; and
      vi) linking at least one critical requirement associated with the first product object to at least one related output requirement using the parameter/requirements management system, where each linked related output requirement is associated with the first product object;
   c) establishing one or more maturity levels corresponding to phases of the development program from inception through production using the parameter/requirements management system, wherein the one or more maturity levels include a first level associated with identification of initial requirements for the product, a second level associated with identification of existing technology that is capable of achieving the requirements, a third level associated with demonstration of existing technology that is capable of achieving the requirements, a fourth level associated with demonstrating a design for the product that achieves the requirements, a fifth level associated with certifying that the product achieves the requirements during initial production, and a sixth level associated with certifying that the product achieves the requirements during larger scale production;
   d) identifying planned criteria for achievement of the maturity levels for at least a portion of the requirements associated with objects of the product structure using the parameter/requirements management system; and
   e) establishing in-process measures to determine a status of achievement of one or more maturity levels for one or more requirements associated with one or more objects of the product structure with respect to the planned criteria for the corresponding requirement and maturity level using the parameter/requirements management system.

2. The method set forth in claim 1, further including:
   f) associating at least one configuration of the product with each maturity level established in c) using the parameter/requirements management system.

3. The method set forth in claim 2 wherein the product structure-driven requirements management tool is implemented via a networked computer architecture.

4. The method set forth in claim 3 wherein the networked computer architecture includes the one or more application servers, the one or more database servers, and the one or more user workstations and the product structure-driven requirements management tool is operable from the one or more user workstations via a user interface.

5. The method set forth in claim 4 wherein the one or more application servers include a web server, wherein the product structure-driven requirements management tool includes a web application installed on the web server, and wherein each user workstation is a thin client to the web application.

6. The method set forth in claim 2, further including:
   g) adding at least one requirement to the captured requirements.

7. The method set forth in claim 6, further including:
   h) associating at least one of the requirements added in g) with one or more product objects of the product structure.

8. The method set forth in claim 2, further including:
g) modifying at least one aspect of one or more of the classifying in iii), the linking in iv), the linking in v), and the linking in vi).

9. The method set forth in claim 2, further including:
g) editing at least one of the requirements associated in ii).

10. The method set forth in claim 9 wherein the editing is accomplished using a table view showing the corresponding product object and requirements associated therewith.

11. The method set forth in claim 2, further including:
g) linking at least one output requirement to at least one external data repository.

12. The method set forth in claim 11 wherein the external data repository is another requirements management tool.

13. The method set forth in claim 2, further including:
g) linking at least one input requirement to at least one external data source.

14. The method set forth in claim 13 wherein the external data source is another requirements management tool.

15. The method set forth in claim 2, further including:
g) maintaining configuration control of at least one aspect of the requirements captured in i), the associating in ii), the classifying in iii), the linking in iv), the linking in v), and the linking in vi).

16. The method set forth in claim 2, further including:
g) reversing at least one aspect of the requirements captured in i), the associating in ii), the classifying in iii), the linking in iv), the linking in v), and the linking in vi).

17. The method set forth in claim 2, further including:
g) copying requirements associated with a first product object to a second product object and thereby associating the copied requirements with the second product object.

18. The method set forth in claim 2, further including:
g) copying requirements associated with a first configuration of the product to a second configuration of the product and thereby associating the copied requirements with the second configuration of the product.

19. The method set forth in claim 2, further including:
g) subscribing to requirements associated with a first product object for a second product object, wherein the subscribing permits a user with rights to edit requirements associated with the second product object to provisionally edit one or more of the subscribed requirements and requires approval of one or more primary users with rights to edit the corresponding requirements associated with the first product object before the provisional edit is approved, after approval of the provisional edit, the corresponding requirements associated with the first product object and the corresponding subscribed requirements associated with the second product object are modified and synchronized.

20. The method set forth in claim 2, further including:
g) subscribing to requirements associated with a first product object for a second product object, wherein the subscribing permits a user with rights to edit requirements associated with the second product object to provisionally edit one or more of the subscribed requirements and requires operation of a change control process to consider the impact of the provisional edit on at least the first and second product objects before the provisional edit is approved, after approval of the provisional edit, the corresponding requirements associated with the first product object and the corresponding subscribed requirements associated with the second product object are modified and synchronized.

21. The method set forth in claim 2, further including:
g) subscribing to requirements associated with a first configuration of the product for a second configuration of the product, wherein the subscribing permits a user with rights to edit requirements associated with the second configuration of the product to provisionally edit one or more of the subscribed requirements and requires approval of one or more primary users with rights to edit the corresponding requirements associated with the first configuration of the product before the provisional edit is approved, after approval of the provisional edit, the corresponding requirements associated with the first configuration of the product and the corresponding subscribed requirements associated with the second configuration of the product are modified and synchronized.

22. The method set forth in claim 2, further including:
g) subscribing to requirements associated with a first configuration of the product for a second configuration of the product, wherein the subscribing permits a user with rights to edit requirements associated with the second configuration of the product to provisionally edit one or more of the subscribed requirements and requires operation of a change control process to consider the impact of the provisional edit on at least the first and second configurations of the product before the provisional edit is approved, after approval of the provisional edit, the corresponding requirements associated with the first configuration of the product and the corresponding subscribed requirements associated with the second configuration of the product are modified and synchronized.

23. The method set forth in claim 2, further including:
g) mapping requirements associated with at least one configuration of a product object in at least one configuration of the product to other configurations of the product object in one or more configurations of the product, wherein current mapping is visualized in a view showing requirements to configurations, wherein the view showing the current mapping of requirements to configurations permits an authorized user to change the current mapping.

24. The method set forth in claim 2, further including:
g) mapping requirements associated with at least one configuration of a product object in at least one configuration of the product to other configurations of the product object in one or more configurations of one or more products, wherein current mapping is visualized in a view showing requirements to configurations, wherein the view showing the current mapping of requirements to configurations permits an authorized user to change the current mapping.

25. The method set forth in claim 2, further including:
g) establishing a sequential series of versions of requirements associated with product objects of the product, wherein each sequential version is based at least in part on a corresponding sequential series of milestones for the development program.

26. The method set forth in claim 25, further including:
h) creating a view showing multiple versions of the requirements associated with a selected product object of the product.

27. The method set forth in claim 25, further including:
h) creating a report showing differences between sequential versions of requirements associated with product objects of the product.

28. The method set forth in claim 2, wherein the product objects include one or more virtual integration object and a plurality of material objects, the method further including:
- g) adding a virtual integration object structure comprised of the one or more virtual integration objects to the object oriented product structure classification scheme, each virtual integration object being comprised of multiple material objects that together are expected to achieve one or more captured requirement; and
- h) associating one or more captured requirements with each virtual integration object, wherein the requirements associated with each virtual integration object are expected to be achieved by the multiple material objects comprising the corresponding virtual integration object.

29. The method set forth in claim 28, further including:
- i) classifying at least one requirement associated with each virtual integration object as an internal requirement.

30. The method set forth in claim 2, further including:
- g) associating multiple object-level users with ownership rights to selected product objects, wherein the ownership rights allow the associated object-level user to propose input and output requirements with linking to other product objects for the associated product object, the proposed requirement being subject to concurrence by other object-level users having ownership rights for linked product objects supplying the corresponding input to proposed input requirements or receiving the corresponding output from proposed output requirements.

31. The method set forth in claim 30, further including:
- h) proposing an input requirement for a first product object and linking to a second product object in response to action by a first object-level user having ownership rights to the first product object, wherein ownership rights to the second product object are associated with a second object-level user; and
- i) creating a view with at least the first product object, proposed input requirement and linking, and a concurrence field, wherein the concurrence field indicates concurrence with the proposed input requirement and linking is required from the second object-level user and indicates a status for the concurrence, wherein the concurrence field is editable by the second object-level user.

32. The method set forth in claim 31 wherein the concurrence field is color-coded to at least distinguish between a concurrence required and not received status and a concurrence received status for the proposed input requirement and linking.

33. The method set forth in claim 31, further including:
- i) updating the concurrence field for the proposed input requirement and linking in response to a concurring action by the second object-level user to indicate that the required concurrence was received.

34. The method set forth in claim 33, further including:
- k) providing an e-mail notification to at least the first object-level user that the required concurrence for the proposed input requirement and linking was received or that a change was made to the proposed input requirement.

35. The method set forth in claim 31, further including:
- i) creating a report with at least the first product object, proposed input requirement and linking, and the concurrence field.

36. The method set forth in claim 30, further including:
- h) proposing an output requirement for a first product object and linking to a second product object in response to action by a first object-level user having ownership rights to the first product object, wherein ownership rights to the second product object are associated with a second object-level user;
- i) creating a view with at least the first product object, proposed output requirement and linking, and a concurrence field, wherein the concurrence field indicates concurrence with the proposed output requirement and linking is required from the second object-level user and indicates a status for the concurrence, wherein the concurrence field is editable by the second object-level user.

37. The method set forth in claim 36 wherein the concurrence field is color-coded to at least distinguish between a concurrence required and not received status and a concurrence received status for the proposed output requirement and linking.

38. The method set forth in claim 36, further including:
- i) updating the concurrence field for the proposed output requirement and linking in response to a concurring action by the second object-level user to indicate that the required concurrence was received.

39. The method set forth in claim 38, further including:
- k) providing an e-mail notification to at least the first object-level user that the required concurrence for the proposed output requirement and linking was received.

40. The method set forth in claim 36, further including:
- i) creating a report with at least the first product object, proposed output requirement and linking, and the concurrence field.

41. The method set forth in claim 2, further including:
- g) creating a view showing a requirement flow for a selected input requirement of a selected product object, the requirement flow including links for the selected input requirement and other product objects and associated requirements to which the selected input requirement is linked.

42. The method set forth in claim 41 wherein the requirement flow in the view includes links for the selected input requirement to internal requirements associated with the selected product object and the corresponding internal requirements.

43. The method set forth in claim 2, further including:
- g) creating a view showing a requirement flow for a selected output requirement of a selected product object, the requirement flow including links for the selected output requirement and other product objects and associated requirements to which the selected output requirement is linked.

44. The method set forth in claim 43 wherein the requirement flow in the view includes links for the selected output requirement to internal requirements associated with the selected product object and the corresponding internal requirements.

45. The method set forth in claim 2, further including:
- g) creating a view showing a requirement flow for a selected product object, the requirement flow including each input requirement associated with the selected product object, links for the input requirements associated with the selected product object, other product objects and associated requirements to which the input requirements are linked, each output requirement associated with the selected product object, links for the output requirements associated with the selected product object, and other product objects and associated requirements to which the output requirements are linked.

46. The method set forth in claim 45 wherein, when the selected product object is a parent to other product objects in the product structure, the requirement flow in the view includes each input requirement for other product objects within a subordinate hierarchy of the selected product object that extend outside the subordinate hierarchy of the selected product object, links for such subordinate input requirements, other product objects and associated requirements to which such subordinate input requirements are linked, each output requirement for other product objects within the subordinate hierarchy of the selected product object that extend outside the subordinate hierarchy of the selected product object, links for such subordinate output requirements, and other product objects and associated requirements to which such subordinate output requirements are linked.

47. The method set forth in claim 45 wherein the requirement flow in the view includes internal requirements associated with the selected product object and links between such internal requirements and the input and output requirements associated with the selected product object.

48. The method set forth in claim 2, further including:
   g) creating a view showing a requirement flow for a selected requirement associated with a selected product object, the requirement flow including each input requirement associated with the selected requirement and the selected product object, links for the input requirements associated with the selected requirement and the selected product object, other product objects and associated requirements to which these input requirements are linked, each output requirement associated with the selected requirement and the selected product object, links for the output requirements associated with the selected requirement and the selected product object, and other product objects and associated requirements to which these output requirements are linked.

49. The method set forth in claim 48 wherein, when the selected product object is a parent to other product objects in the product structure, the requirement flow in the view includes input requirements associated with the selected requirement and other product objects within a subordinate hierarchy of the selected product object that extend outside the subordinate hierarchy of the selected product object, links for such subordinate input requirements, other product objects and associated requirements to which such subordinate input requirements are linked, output requirements associated with the selected requirement and other product objects within the subordinate hierarchy of the selected product object that extend outside the subordinate hierarchy of the selected product object, links for such subordinate output requirements, and other product objects and associated requirements to which such subordinate output requirements are linked.

50. The method set forth in claim 48 wherein the requirement flow in the view includes internal requirements associated with the selected requirement and the selected product object and links between such internal requirements and the input and output requirements associated with the selected requirement and the selected product object.

51. The method set forth in claim 2, further including:
   g) creating a view showing a requirement flow for a selected requirement, the requirement flow including each product object with which the selected requirement is associated, each input requirement associated with the selected requirement and corresponding product objects, links for such input requirements, other product objects and associated requirements to which these input requirements are linked, each output requirement associated with the selected requirement and corresponding product objects, links for such output requirements, and other product objects and associated requirements to which these output requirements are linked.

52. The method set forth in claim 51 wherein, when the corresponding product object is a parent to other product objects in the product structure, the requirement flow in the view includes input requirements associated with the selected requirement and other product objects within a subordinate hierarchy of the selected product object that extend outside the subordinate hierarchy of the selected product object, links for such subordinate input requirements, other product objects and associated requirements to which such subordinate input requirements are linked, output requirements associated with the selected requirement and other product objects within the subordinate hierarchy of the selected product object that extend outside the subordinate hierarchy of the selected product object, links for such subordinate output requirements, and other product objects and associated requirements to which such subordinate output requirements are linked.

53. The method set forth in claim 51 wherein the requirement flow in the view includes internal requirements associated with the selected requirement and the corresponding product objects and links between such internal requirements and the input and output requirements associated with the selected requirement and the corresponding product objects.

54. The method set forth in claim 2, further including:
   g) identifying internal requirements associated with each product object that combine to achieve another internal requirement associated with the corresponding product object;
   h) classifying the internal requirements that combine to achieve the another internal requirement associated with the corresponding product object as critical specification requirements; and
   i) linking the critical specification requirements that combine to achieve the another internal requirement associated with the same product object to the corresponding internal requirement to which the critical specification requirements combine to achieve.

55. The method set forth in claim 54, further including:
   j) creating a view showing a selected product object associated with critical specification requirements, the view also including the internal requirements associated with the selected product object, the critical specification requirements associated with the product object, and links existing between these critical specification requirements and internal requirements.

56. The method set forth in claim 2, wherein each product object of the product structure is associated with a part number, the method further including:
   g) creating a view of internal requirements arranged by part number.

57. The method set forth in claim 2, further including:
   g) capturing expected failure modes for one or more output requirement.

58. The method set forth in claim 1, further including:
   f) designating a product-level user with rights to access and manage a hierarchical product structure of product objects that define at least one configuration of the product;
   g) building and managing the product objects of the hierarchical product structure;
   h) associating a first group of attributes with each product object to facilitate display of views of the product structure or portions thereof arranged by one or more of product structure, product object, attribute, and attribute group;

i) designating one or more object-level users, wherein each object-level user is granted rights to access and manage one or more product objects and corresponding subordinate levels in the hierarchical product structure; and j) defining the rights to access and manage the one or more product objects such that the rights to access and manage each product object are individually defined for each object-level user and each attribute associated with the corresponding product object with respect to the object-level user's access to the attribute and the ability of the object-level user to manage the attribute.

59. The method set forth in claim 58 wherein the product structure-driven requirements management tool is integrated with a configuration management tool such that the configuration management tool is used as a master source to build and manage the hierarchical product structure.

60. The method set forth in claim 58 wherein the product structure-driven requirements management tool is implemented via a networked computer architecture.

61. The method set forth in claim 58 wherein the individually-defined rights to access and manage one or more attributes of product objects facilitates optimal alignment of parameters and requirements for product objects to corresponding value chain roles and responsibilities for the development program.

62. The method set forth in claim 58, further including:

k) selecting and tagging one or more groups of one or more related product objects of the product structure to define corresponding requirement interface boundaries and create corresponding partitioned elements of the product structure, wherein each partitioned element is comprised of a group of the one or more groups of one or more related product objects.

63. The method set forth in claim 62, further including:

l) associating a second group of attributes with each partitioned element to facilitate display of views of the product structure or portions thereof arranged by partitioned element in addition to the views identified in h);

m) designating one or more object-level users, wherein each product object-level user is granted rights to access and manage one or more partitioned elements and the corresponding one or more related product objects; and n) defining the rights to access and manage the one or more partitioned elements such that the rights to access and manage each partitioned element is individually defined for each object-level user and each attribute associated with the corresponding partitioned element with respect to the object-level user's access to the attribute and the ability of the object-level user to manage the attribute.

64. The method set forth in claim 58, wherein the product objects include one or more virtual integration objects and a plurality of material objects, the method further including:

k) adding rights to access and manage a virtual integration object structure comprised of the one or more virtual integration objects and associated with the at least one configuration of the product to the product-level user's rights defined in f); and l) building and managing the virtual integration object structure by associating multiple material objects with each virtual integration object, wherein the multiple material objects together are expected to achieve one or more related requirements associated with the corresponding virtual integration object.

65. The method set forth in claim 64, further including:

m) associating a second group of attributes with each virtual integration object to facilitate display of views of the virtual integration object structure or portions thereof arranged by virtual integration object in addition to the views identified in h);

n) designating one or more object-level users, wherein each object-level user is granted rights to access and manage one or more virtual integration objects and the corresponding associated material objects; and o) defining the rights to access and manage the one or more virtual integration objects such that the rights to access and manage each virtual integration object is individually defined for each object-level user and each attribute associated with the corresponding virtual integration object with respect to the object-level user's access to the attribute and the ability of the object-level user to manage the attribute.

66. The method set forth in claim 58, further including:

k) selecting and tagging one or more groups of one or more related product objects of the product structure to define corresponding requirement interface boundaries and create corresponding platform elements of the product structure, wherein each platform element is comprised of a group of the one or more groups of one or more related product objects.

67. The method set forth in claim 66, further including:

l) associating a second group of attributes with each platform element to facilitate display of views of the product structure or portions thereof arranged by platform element in addition to the views identified in h), m) designating one or more object-level users, wherein each object-level user is granted rights to access and manage one or more platform elements and corresponding one or more related product objects; and n) defining the rights to access and manage the one or more platform elements such that the rights to access and manage each platform element is individually defined for each object-level user and each attribute associated with the corresponding platform element with respect to the object-level user's access to the attribute and the ability of the object-level user to manage the attribute.

68. The method set forth in claim 1 wherein the product structure-driven requirements management tool is implemented via a networked computer architecture.

69. The method set forth in claim 1, further including:

f) creating a view of a status of achievement of a selected maturity level for a selected requirement.

70. The method set forth in claim 1, further including:

f) creating a view of a status of achievement of a selected maturity level for one or more requirements associated with a selected object.

71. The method set forth in claim 1, further including:

f) creating a view of a status of achievement of a selected maturity level for one or more requirements associated with one or more objects.

72. The method set forth in claim 1, further including:

f) creating a view of a status of achievement of one or more maturity levels for a selected requirement.

73. The method set forth in claim 1, further including:

f) creating a view of a status of achievement of one or more maturity levels for one or more requirements associated with a selected object.

74. The method set forth in claim 1, further including:

f) creating a view of a status of achievement of one or more maturity levels for one or more requirements associated with one or more objects.

75. The method set forth in claim 1 wherein the planned criteria in d) includes plan dates and outlook dates, the method further including:
  f) inputting plan dates and outlook dates for achievement of one or more maturity levels for requirements associated with one or more objects of the product structure; and
  g) calculating actual achievement of a corresponding maturity level for a corresponding requirement after the planned criteria is satisfied.

76. The method set forth in claim 1 wherein the planned criteria in d) includes desired process/task criteria, the method further including:
  f) establishing desired process/task criteria for one or more maturity levels for requirements associated with one or more objects of the product structure, wherein the process/task criteria includes at least one of data elements required by tools utilized to assess achievement of the corresponding maturity level for the corresponding requirement, one or more check boxes to signify achievement of the corresponding maturity level for the corresponding requirement, and links to external sources supporting achievement of the corresponding maturity level for the corresponding requirement.

77. The method set forth in claim 76, further including:
  g) associating multiple object-level users with rights to grant achievement to one or more selected requirements associated with one or more objects of the product structure at one or more maturity levels using the check boxes provided in the desired task/process criteria provided with the planned criteria for certain requirements.

78. The method set forth in claim 1, further including:
  f) inputting a requirement reuse rating and a source for the requirements associated with one or more objects of the product structure.

79. The method set forth in claim 78, further including:
  g) creating a view showing a summary of requirements associated with each reuse rating.

80. The method set forth in claim 1, further including:
  f) determining a requirement reuse rating and a source for the requirements associated with one or more objects of the product structure based on reuse of at least one object and one or more corresponding requirements previously used in the product-structure driven requirements management tool to create the one or more objects of the product structure and corresponding requirements.

81. The method set forth in claim 80, further including:
  g) creating a view showing a summary of requirements associated with each reuse rating.

82. The method set forth in claim 1, further including:
  f) creating a view showing a summary of a quantity of at least one of input requirements, critical requirements, and output requirements associated with one or more objects of the product structure for one or more maturity levels.

83. The method set forth in claim 1, further including:
  f) planning development and maturity of the product through one or more maturity levels associated with achievement of requirements associated with objects of the product structure;
  g) establishing in-process measures to determine a status of achievement of the planned development and maturity of the product;
  h) planning for one or more audits of conformance of one or more builds of one or more configurations of the product at one or more of the maturity levels for one or more requirements associated with one or more objects of the product structure;
  i) qualitatively assessing conformance of one or more requirements associated with one or more objects of the product structure for each of the one or more builds;
  j) quantitatively assessing conformance of one or more requirements associated with one or more objects of the product structure for each of the one or more builds; and
  k) utilizing the qualitative and quantitative assessments of conformance to identify, prioritize, and manage conformance risk during the development program as development of the objects of the product structure advance through the one or more maturity levels.

84. The method set forth in claim 83 wherein the product structure-driven requirements management tool is implemented via a networked computer architecture.

85. The method set forth in claim 83 wherein the product structure-driven requirements management tool is integrated with a problem management tool used to record and monitor one or more problems associated with objects of the product structure during the development program.

86. The method set forth in claim 83, further including:
  l) tagging the requirements associated with the objects of the product structure to be included in each audit of conformance of each build of the product by at least one of a selected configuration of the product and a selected maturity level.

87. The method set forth in claim 86, further including:
  m) creating a view showing tagged requirements associated with one or more of a selected object, a selected configuration of the product, a selected maturity level, and all tagged requirements.

88. The method set forth in claim 83, further including:
  l) associating one or more object-level users with ownership rights to audit one or more selected requirements associated with the objects of the product structure and allowing such object-level users rights to access and input audit data associated with the corresponding requirements.

89. The method set forth in claim 83, further including:
  l) identifying one or more locations for an audit source for one or more selected requirements associated with the objects of the product structure at one or more maturity levels.

90. The method set forth in claim 83, further including:
  l) tracking a measurement method, availability of test equipment associated with the measurement method, and validation of a measurement system analysis associated with the measurement method for one or more selected requirements associated with the objects of the product structure at one or more maturity levels.

91. The method set forth in claim 83, further including:
  l) creating a view of a conformance risk and impact for one or more requirements associated with one or more objects of the product structure for the one or more builds with a qualitative assessment of conformance field for each of the one or more requirements; and
  m) inputting a result of each qualitative assessment from i) in the qualitative assessment of conformance field for corresponding requirements in the view.

92. The method set forth in claim 83, further including:
  l) creating one or more versions of requirements associated with objects of the product structure;
  m) creating multiple audit data versions for at least one of the one or more requirements versions; and
  n) adding audit data to at least one of the multiple audit data versions over time.

93. The method set forth in claim 83, further including:
l) capturing and editing serial numbers for objects for each build of the product to facilitate creation of views with objects and corresponding requirements showing conformance status of the corresponding requirements for each build.

94. The method set forth in claim 93, further including:
m) capturing audit data for one or more serial numbered objects of a corresponding build of the product by requirement.

95. The method set forth in claim 93, further including:
m) capturing audit data for one or more serial numbered objects of a corresponding build of the product by object.

96. The method set forth in claim 93, further including:
m) entering audit data for one or more serial numbered objects of a corresponding build of the product by requirement.

97. The method set forth in claim 93, further including:
m) entering audit data for one or more serial numbered objects of a corresponding build of the product for multiple requirements of the corresponding object.

98. The method set forth in claim 93, further including:
m) entering a uniform resource locator link as a pointer to audit data for one or more serial numbered objects of a corresponding build of the product.

99. The method set forth in claim 93, further including:
m) entering a uniform resource locator link as a pointer to audit data for each serial numbered object of a corresponding build of the product.

100. The method set forth in claim 93, further including:
m) generating a spreadsheet template identifying requirements associated with one or more objects of the product structure by serial number with fields for entry of audit data for the corresponding requirements; and
n) exporting the spreadsheet template from the product structure-driven requirements management tool as a spreadsheet file for subsequent entry of the audit data for the corresponding requirements.

101. The method set forth in claim 100, further including:
o) importing the spreadsheet file to the product structure-driven requirements management tool after entry of at least a portion of the audit data for the corresponding requirements.

102. The method set forth in claim 93, further including:
m) creating a view of requirements conformance by serial number for one or more objects of the product structure.

103. The method set forth in claim 102, further including:
n) initiating a non-conforming material process for at least one object of the product structure based on the view of requirements conformance by serial number showing that the corresponding object fails to conform to one or more associated requirement.

104. The method set forth in claim 102, further including:
n) initiating a change request process for at least one object of the product structure based on the view of requirements conformance by serial number showing that the corresponding object fails to conform to one or more associated requirement.

105. The method set forth in claim 83, further including:
l) creating a view showing the assessment of quantitative conformance for one or more requirements associated with one or more objects of the product structure and one or more builds of one or more configuration of the product.

106. The method set forth in claim 105 wherein the view includes one or more quality indices, the method further including:
m) creating a view showing one or more Pareto charts corresponding to one or more selected quality indices for one or more requirements associated with a selected object of the product structure for a selected configuration of the product.

107. The method set forth in claim 83, further including:
l) creating a view showing the assessment of conformance for requirements associated with one or more selected objects of the product structure.

108. The method set forth in claim 83, further including:
l) creating a view of a quality for the assessment of conformance for one or more requirements associated with one or more objects of the product structure, wherein the view shows a graphical representation of a target ratio for a number of data points.

109. The method set forth in claim 83 wherein the product structure-driven requirements management tool is integrated with a manufacturing/production control system tool used to control production of the one or more builds of one or more configurations of the product.

110. The method set forth in claim 109, further including:
l) capturing and editing serial numbers for objects for each build of the product using the manufacturing/production control system tool; and
m) importing the serial numbers for the objects for each build into the product structure-driven requirements management tool from the manufacturing/production control system tool.

111. The method set forth in claim 110, further including:
n) downloading one or more requirements associated with one or more objects of the product structure for at least one build of at least one configuration of the one or more objects from the product structure-driven requirements management tool to the manufacturing/production control system tool;
o) capturing audit data from test equipment used to test the one or more objects by serial number for conformance to the one or more requirements using the manufacturing/production control system tool; and
p) importing the audit data for the one or more requirements associated with the one or more objects by serial number from the manufacturing/production control system tool to the product structure-driven requirements management tool.

112. The method set forth in claim 1, further including:
f) using a product structure classification scheme to build the hierarchical product structure of product objects that define the at least one configuration of the product;
g) using a requirements classification scheme to associate the external and internal requirements with the product objects in the hierarchical product structure and to establish links between certain external and internal requirements associated with the same object, links between certain external requirements associated with certain product objects and one or more other product objects, and links between certain external requirements associated with certain product objects and one or more external sources;
h) using a maturity model to establish one or more maturity levels from inception to production of the product at which status of the external and internal requirements associated with the objects in the product structure for the development program are assessed; and i) using in-process maturity measures to establish plan dates and outlook dates for achievement of the external and internal requirements, to track actual achievement of the external and internal requirements, to assess development program risks, and to determine if corrective action should be taken.

113. The method set forth in claim 112 wherein the external requirements include input requirements, output requirements, and constraint requirements.

114. The method set forth in claim 112 wherein the internal requirements include critical requirements and critical specification requirements.

115. The method set forth in claim 112, further including:
j) performing configuration management on one or more product objects of the hierarchical product structure.

116. The method set forth in claim 112, further including:
j) performing configuration management on one or more of the external or internal requirements associated with the product objects of the hierarchical product structure.

117. The method set forth in claim 112 wherein the product structure classification scheme, requirements classification scheme, maturity model, and in-process maturity measures are implemented using one or more automated tools integrated via a networked computer architecture.

118. The method set forth in claim 117 wherein the networked computer architecture includes the one or more application servers, the one or more database servers, and the one or more user workstations and the one or more automated tools are operable from the one or more user workstations via a user interface.

119. The method set forth in claim 118 wherein the one or more application servers include a web server, the one or more automated tools include a web application installed on the web server, and each user workstation is a thin client to the web application on the web server.

120. The method set forth in claim 117 wherein the one or more automated tools include the product structure-driven requirements management tool and at least one of a document-driven requirements management tool, a configuration management tool, a problem management tool, a phased product delivery process tool, and a manufacturing/production control system tool.

121. The method set forth in claim 120 wherein the product structure-driven requirements management tool includes a product structure feature group for defining the hierarchical product structure in f), an add/edit/link feature group for associating the external and internal requirements with the product objects in the hierarchical product structure and establishing the links in g), a manage maturity feature group for establishing the one or more maturity levels in h), and a manage conformance feature group for establishing the plan dates and outlook dates, tracking the actual achievement, assessing the development program risks, and facilitating the determining if corrective action should be taken in i).

122. The method set forth in claim 117 wherein the one or more automated tools are integrated to exchange data via at least one of spreadsheet templates, filters, and reports.

* * * * *